(12) United States Patent
Carlson

(10) Patent No.: US 8,358,317 B2
(45) Date of Patent: Jan. 22, 2013

(54) SYSTEM AND METHOD FOR DISPLAYING A PLANAR IMAGE ON A CURVED SURFACE

(75) Inventor: Kenneth L. Carlson, Salt Lake City, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 825 days.

(21) Appl. No.: 12/455,028

(22) Filed: May 26, 2009

(65) Prior Publication Data

US 2009/0322740 A1 Dec. 31, 2009

Related U.S. Application Data

(60) Provisional application No. 61/055,897, filed on May 23, 2008.

(51) Int. Cl.
G09G 1/08 (2006.01)
G09G 5/36 (2006.01)
G09G 5/00 (2006.01)
G06T 15/00 (2011.01)
G03B 21/56 (2006.01)
G02B 5/126 (2006.01)
G02B 3/00 (2006.01)
G06K 9/36 (2006.01)
G06K 9/54 (2006.01)

(52) U.S. Cl. ........ 345/582; 345/419; 345/585; 345/545; 345/548; 345/15; 359/451; 359/534; 359/648; 382/276; 382/305

(58) Field of Classification Search .......... 345/418–419, 345/427, 581–582, 585, 618, 545–548, 204, 345/15, 428, 611, 644, 649, 653, 657–659, 345/442, 501, 530, 552; 359/664, 451, 534, 359/648; 715/757; 382/154, 254, 266, 276, 382/285, 293–299, 300, 305, 307

See application file for complete search history.

(56) References Cited

U.S. PATENT DOCUMENTS

| | | | |
|---|---|---|---|
| 449,435 A | 3/1891 | Brotz |
| 1,525,550 A | 2/1925 | Jenkins |
| 1,548,262 A | 8/1925 | Freedman |
| 1,702,195 A | 2/1929 | Centeno, V |
| 1,814,701 A | 7/1931 | Ives |
| 2,415,226 A | 2/1947 | Sziklai |

(Continued)

FOREIGN PATENT DOCUMENTS

| | | |
|---|---|---|
| DE | 2 325 028 | 12/1974 |
| DE | 197 21 416 | 1/1999 |

(Continued)

OTHER PUBLICATIONS

Abrash, "The Quake Graphics Engine," CGDC Quake Talk taken from Computer Game Developers Conference on Apr. 2, 1996. http://gamers.org/dEngine/quake/papers/mikeab-cgdc.html.

(Continued)

Primary Examiner — Wesner Sajous
(74) Attorney, Agent, or Firm — Clayton, Howarth & Cannon, P.C.

(57) ABSTRACT

An image display system for displaying a planar image on a curved viewing surface, such as a theater dome, with minimized image distortion. In order to display the image, a virtual surface, which is a representation of the curved viewing surface, is textured with the image using an angular distribution to thereby form a textured virtual image. The textured virtual image is then displayed onto the curved viewing surface.

48 Claims, 27 Drawing Sheets

U.S. PATENT DOCUMENTS

| | | |
|---|---|---|
| 2,688,048 A | 8/1954 | Rose |
| 2,764,628 A | 9/1956 | Bambara |
| 2,783,406 A | 2/1957 | Vanderhooft |
| 2,991,690 A | 7/1961 | Grey et al. |
| 3,201,797 A | 8/1965 | Roth |
| 3,345,462 A | 10/1967 | Good et al. |
| 3,370,505 A | 2/1968 | Bryan |
| 3,418,459 A | 12/1968 | Purdy et al. |
| 3,422,419 A | 1/1969 | Mathews et al. |
| 3,485,944 A | 12/1969 | Stephens, Jr. |
| 3,534,338 A | 10/1970 | Christensen et al. |
| 3,553,364 A | 1/1971 | Lee |
| 3,576,394 A | 4/1971 | Lee |
| 3,577,031 A | 5/1971 | Welsh et al. |
| 3,600,798 A | 8/1971 | Lee |
| 3,602,702 A | 8/1971 | Warnock |
| 3,605,083 A | 9/1971 | Kramer |
| 3,633,999 A | 1/1972 | Buckles |
| 3,656,837 A | 4/1972 | Sandbank |
| 3,659,920 A | 5/1972 | McGlasson |
| 3,668,622 A | 6/1972 | Gannett et al. |
| 3,688,298 A | 8/1972 | Miller et al. |
| 3,709,581 A | 1/1973 | McGlasson |
| 3,711,826 A | 1/1973 | La Russa |
| 3,734,602 A | 5/1973 | Deck |
| 3,734,605 A | 5/1973 | Yevick |
| 3,736,526 A | 5/1973 | Simmons |
| 3,737,573 A | 6/1973 | Kessler |
| 3,746,911 A | 7/1973 | Nathanson et al. |
| 3,757,161 A | 9/1973 | Kline |
| 3,760,222 A | 9/1973 | Smith |
| 3,764,719 A | 10/1973 | Dell |
| 3,775,760 A | 11/1973 | Strathman |
| 3,781,465 A | 12/1973 | Ernstoff et al. |
| 3,783,184 A | 1/1974 | Ernstoff et al. |
| 3,785,715 A | 1/1974 | Mecklenborg |
| 3,802,769 A | 4/1974 | Rotz et al. |
| 3,816,726 A | 6/1974 | Sutherland et al. |
| 3,818,129 A | 6/1974 | Yamamoto |
| 3,831,106 A | 8/1974 | Ward |
| 3,846,826 A | 11/1974 | Mueller |
| 3,862,360 A | 1/1975 | Dill et al. |
| 3,886,310 A | 5/1975 | Guldberg et al. |
| 3,889,107 A | 6/1975 | Sutherland |
| 3,891,889 A | 6/1975 | Fazio |
| 3,896,338 A | 7/1975 | Nathanson et al. |
| 3,899,662 A | 8/1975 | Kreeger et al. |
| 3,915,548 A | 10/1975 | Opittek et al. |
| 3,920,495 A | 11/1975 | Roberts |
| 3,922,585 A | 11/1975 | Andrews |
| 3,934,173 A | 1/1976 | Korver |
| 3,935,499 A | 1/1976 | Oess |
| 3,940,204 A | 2/1976 | Withrington |
| 3,943,281 A | 3/1976 | Keller et al. |
| 3,947,105 A | 3/1976 | Smith |
| 3,969,611 A | 7/1976 | Fonteneau |
| 3,983,452 A | 9/1976 | Bazin |
| 3,991,416 A | 11/1976 | Byles et al. |
| 4,001,663 A | 1/1977 | Bray |
| 4,009,939 A | 3/1977 | Okano |
| 4,016,658 A | 4/1977 | Porter et al. |
| 4,017,158 A | 4/1977 | Booth |
| 4,017,985 A | 4/1977 | Heartz |
| 4,021,841 A | 5/1977 | Weinger |
| 4,027,403 A | 6/1977 | Marsh et al. |
| 4,028,725 A | 6/1977 | Lewis |
| 4,048,653 A | 9/1977 | Spooner |
| 4,067,129 A | 1/1978 | Abramson et al. |
| 4,077,138 A | 3/1978 | Foerst |
| 4,093,346 A | 6/1978 | Nishino et al. |
| 4,093,347 A | 6/1978 | La Russa |
| 4,100,571 A | 7/1978 | Dykes et al. |
| 4,119,956 A | 10/1978 | Murray |
| 4,120,028 A | 10/1978 | Membrino et al. |
| 4,138,726 A | 2/1979 | Girault et al. |
| 4,139,257 A | 2/1979 | Matsumoto |
| 4,139,799 A | 2/1979 | Kureha et al. |
| 4,149,184 A | 4/1979 | Giddings et al. |
| 4,152,766 A | 5/1979 | Osofsky et al. |
| 4,163,570 A | 8/1979 | Greenaway |
| 4,170,400 A | 10/1979 | Bach et al. |
| 4,177,579 A | 12/1979 | Peters et al. |
| 4,184,700 A | 1/1980 | Greenaway |
| 4,195,911 A | 4/1980 | Bougon et al. |
| 4,197,559 A | 4/1980 | Gramling |
| 4,200,866 A | 4/1980 | Strathman |
| 4,203,051 A | 5/1980 | Hallett et al. |
| 4,211,918 A | 7/1980 | Nyfeler et al. |
| 4,222,106 A | 9/1980 | Hess et al. |
| 4,223,050 A | 9/1980 | Nyfeler et al. |
| 4,229,732 A | 10/1980 | Hartstein et al. |
| 4,234,891 A | 11/1980 | Beck et al. |
| 4,241,519 A | 12/1980 | Gilson et al. |
| 4,250,217 A | 2/1981 | Greenaway |
| 4,250,393 A | 2/1981 | Greenaway |
| 4,289,371 A | 9/1981 | Kramer |
| 4,297,723 A | 10/1981 | Whitby |
| 4,303,394 A | 12/1981 | Berke et al. |
| 4,305,057 A | 12/1981 | Rolston |
| 4,318,173 A | 3/1982 | Freedman et al. |
| 4,333,144 A | 6/1982 | Whiteside et al. |
| 4,335,402 A | 6/1982 | Holmes |
| 4,335,933 A | 6/1982 | Palmer |
| 4,338,661 A | 7/1982 | Tredennick et al. |
| 4,340,878 A | 7/1982 | Spooner et al. |
| 4,342,083 A | 7/1982 | Freedman et al. |
| 4,343,037 A | 8/1982 | Bolton |
| 4,343,532 A | 8/1982 | Palmer |
| 4,345,817 A | 8/1982 | Gwynn |
| 4,347,507 A | 8/1982 | Spooner |
| 4,348,184 A | 9/1982 | Moore |
| 4,348,185 A | 9/1982 | Breglia et al. |
| 4,348,186 A | 9/1982 | Harvey et al. |
| 4,349,815 A | 9/1982 | Spooner |
| 4,356,730 A | 11/1982 | Cade |
| 4,360,884 A | 11/1982 | Okada et al. |
| 4,375,685 A | 3/1983 | Le Goff et al. |
| 4,384,324 A | 5/1983 | Kim et al. |
| 4,390,253 A | 6/1983 | Lobb |
| 4,393,394 A | 7/1983 | McCoy |
| 4,394,727 A | 7/1983 | Hoffman et al. |
| 4,398,794 A | 8/1983 | Palmer et al. |
| 4,398,795 A | 8/1983 | Palmer |
| 4,399,861 A | 8/1983 | Carlson |
| 4,408,884 A | 10/1983 | Kleinknecht et al. |
| 4,422,019 A | 12/1983 | Meyer |
| 4,427,274 A | 1/1984 | Pund et al. |
| 4,431,260 A | 2/1984 | Palmer |
| 4,435,756 A | 3/1984 | Potash |
| 4,437,113 A | 3/1984 | Lee et al. |
| 4,439,157 A | 3/1984 | Breglia et al. |
| 4,440,839 A | 4/1984 | Mottier |
| 4,441,791 A | 4/1984 | Hornbeck |
| 4,445,197 A | 4/1984 | Lorie et al. |
| 4,446,480 A | 5/1984 | Breglia et al. |
| 4,463,372 A | 7/1984 | Bennett et al. |
| 4,466,123 A | 8/1984 | Arai et al. |
| 4,471,433 A | 9/1984 | Matsumoto et al. |
| 4,472,732 A | 9/1984 | Bennett et al. |
| 4,487,584 A | 12/1984 | Allen et al. |
| 4,492,435 A | 1/1985 | Banton et al. |
| 4,498,136 A | 2/1985 | Sproul, III |
| 4,499,457 A | 2/1985 | Hintze |
| 4,500,163 A | 2/1985 | Burns et al. |
| 4,511,337 A | 4/1985 | Fortunato et al. |
| 4,536,058 A | 8/1985 | Shaw et al. |
| 4,539,638 A | 9/1985 | Gaffney |
| 4,546,431 A | 10/1985 | Horvath |
| 4,566,935 A | 1/1986 | Hornbeck |
| 4,570,233 A | 2/1986 | Yan et al. |
| 4,582,396 A | 4/1986 | Bos et al. |
| 4,583,185 A | 4/1986 | Heartz |
| 4,586,037 A | 4/1986 | Rosener et al. |
| 4,586,038 A | 4/1986 | Sims et al. |
| 4,589,093 A | 5/1986 | Ippolito et al. |
| 4,590,555 A | 5/1986 | Bourrez |
| 4,591,844 A | 5/1986 | Hickin et al. |

| | | |
|---|---|---|
| 4,596,992 A | 6/1986 | Hornbeck |
| 4,597,633 A | 7/1986 | Fussell |
| 4,598,372 A | 7/1986 | McRoberts |
| 4,599,070 A | 7/1986 | Hladky et al. |
| 4,609,939 A | 9/1986 | Kozawa et al. |
| 4,616,217 A | 10/1986 | Nesbitt et al. |
| 4,616,262 A | 10/1986 | Toriumi et al. |
| 4,623,223 A | 11/1986 | Kempf |
| 4,623,880 A | 11/1986 | Bresenham et al. |
| 4,625,289 A | 11/1986 | Rockwood |
| 4,630,101 A | 12/1986 | Inaba et al. |
| 4,630,884 A | 12/1986 | Jubinski |
| 4,631,690 A | 12/1986 | Corthout et al. |
| 4,633,243 A | 12/1986 | Bresenham et al. |
| 4,634,384 A | 1/1987 | Neves et al. |
| 4,636,031 A | 1/1987 | Schmadel, Jr. et al. |
| 4,636,384 A | 1/1987 | Stolle et al. |
| 4,642,756 A | 2/1987 | Sherrod |
| 4,642,790 A | 2/1987 | Minshull et al. |
| 4,642,945 A | 2/1987 | Browning et al. |
| 4,645,459 A | 2/1987 | Graf et al. |
| 4,646,251 A | 2/1987 | Hayes et al. |
| 4,647,966 A | 3/1987 | Phillips et al. |
| 4,655,539 A | 4/1987 | Caulfield et al. |
| 4,656,506 A | 4/1987 | Ritchey |
| 4,656,578 A | 4/1987 | Chilinski et al. |
| 4,657,512 A | 4/1987 | Mecklenborg |
| 4,658,351 A | 4/1987 | Teng |
| 4,662,746 A | 5/1987 | Hornbeck |
| 4,663,617 A | 5/1987 | Stockwell |
| 4,671,650 A | 6/1987 | Hirzel et al. |
| 4,672,215 A | 6/1987 | Howard |
| 4,672,275 A | 6/1987 | Ando |
| 4,677,576 A | 6/1987 | Berlin, Jr. et al. |
| 4,679,040 A | 7/1987 | Yan |
| 4,684,215 A | 8/1987 | Shaw et al. |
| 4,692,880 A | 9/1987 | Merz et al. |
| 4,698,602 A | 10/1987 | Armitage |
| 4,704,605 A | 11/1987 | Edelson |
| 4,710,732 A | 12/1987 | Hornbeck |
| 4,714,428 A | 12/1987 | Bunker et al. |
| 4,715,005 A | 12/1987 | Heartz |
| 4,720,705 A | 1/1988 | Gupta et al. |
| 4,720,747 A | 1/1988 | Crowley |
| 4,725,110 A | 2/1988 | Glenn et al. |
| 4,727,365 A | 2/1988 | Bunker et al. |
| 4,730,261 A | 3/1988 | Smith |
| 4,731,859 A | 3/1988 | Holter et al. |
| 4,735,410 A | 4/1988 | Nobuta |
| 4,743,200 A | 5/1988 | Welch et al. |
| 4,744,615 A | 5/1988 | Fan et al. |
| 4,748,572 A | 5/1988 | Latham |
| 4,751,509 A | 6/1988 | Kubota et al. |
| 4,760,388 A | 7/1988 | Tatsumi et al. |
| 4,760,917 A | 8/1988 | Vitek |
| 4,761,253 A | 8/1988 | Antes |
| 4,763,280 A | 8/1988 | Robinson et al. |
| 4,766,555 A | 8/1988 | Bennett |
| 4,769,762 A | 9/1988 | Tsujido |
| 4,772,881 A | 9/1988 | Hannah |
| 4,777,620 A | 10/1988 | Shimoni et al. |
| 4,780,084 A | 10/1988 | Donovan |
| 4,780,711 A | 10/1988 | Doumas |
| 4,791,583 A | 12/1988 | Colburn |
| 4,794,386 A | 12/1988 | Bedrij et al. |
| 4,795,226 A | 1/1989 | Bennion et al. |
| 4,796,020 A | 1/1989 | Budrikis et al. |
| 4,799,106 A | 1/1989 | Moore et al. |
| 4,805,107 A | 2/1989 | Kieckhafer et al. |
| 4,807,158 A | 2/1989 | Blanton et al. |
| 4,807,183 A | 2/1989 | Kung et al. |
| 4,811,245 A | 3/1989 | Bunker et al. |
| 4,812,988 A | 3/1989 | Duthuit et al. |
| 4,821,212 A | 4/1989 | Heartz |
| 4,825,391 A | 4/1989 | Merz |
| 4,833,528 A | 5/1989 | Kobayashi |
| 4,837,740 A | 6/1989 | Sutherland |
| 4,854,669 A | 8/1989 | Birnbach et al. |
| 4,855,934 A | 8/1989 | Robinson |
| 4,855,937 A | 8/1989 | Heartz |
| 4,855,939 A | 8/1989 | Fitzgerald, Jr. et al. |
| 4,855,943 A | 8/1989 | Lewis |
| 4,856,869 A | 8/1989 | Sakata et al. |
| 4,868,766 A | 9/1989 | Oosterholt |
| 4,868,771 A | 9/1989 | Quick et al. |
| 4,873,515 A | 10/1989 | Dickson et al. |
| 4,884,275 A | 11/1989 | Simms |
| 4,885,703 A | 12/1989 | Deering |
| 4,893,353 A | 1/1990 | Iwaoka et al. |
| 4,893,515 A | 1/1990 | Uchida |
| 4,897,715 A | 1/1990 | Beamon, III |
| 4,899,293 A | 2/1990 | Dawson et al. |
| 4,907,237 A | 3/1990 | Dahmani et al. |
| 4,912,526 A | 3/1990 | Iwaoka et al. |
| 4,915,463 A | 4/1990 | Barbee, Jr. |
| 4,918,626 A | 4/1990 | Watkins et al. |
| 4,930,888 A | 6/1990 | Freisleben et al. |
| 4,935,879 A | 6/1990 | Ueda |
| 4,938,584 A | 7/1990 | Suematsu et al. |
| 4,940,972 A | 7/1990 | Mouchot et al. |
| 4,949,280 A | 8/1990 | Littlefield |
| 4,952,152 A | 8/1990 | Briggs et al. |
| 4,952,922 A | 8/1990 | Griffin et al. |
| 4,953,107 A | 8/1990 | Hedley et al. |
| 4,954,819 A | 9/1990 | Watkins |
| 4,955,034 A | 9/1990 | Scerbak |
| 4,959,541 A | 9/1990 | Boyd |
| 4,959,803 A | 9/1990 | Kiyohara et al. |
| 4,969,714 A | 11/1990 | Fournier, Jr. et al. |
| 4,970,500 A | 11/1990 | Hintze |
| 4,974,155 A | 11/1990 | Dulong et al. |
| 4,974,176 A | 11/1990 | Buchner et al. |
| 4,982,178 A | 1/1991 | Hintze |
| 4,984,824 A | 1/1991 | Antes et al. |
| 4,985,831 A | 1/1991 | Dulong et al. |
| 4,985,854 A | 1/1991 | Wittenburg |
| 4,991,955 A | 2/1991 | Vetter |
| 4,992,780 A | 2/1991 | Penna et al. |
| 4,994,794 A | 2/1991 | Price et al. |
| 5,005,005 A | 4/1991 | Brossia et al. |
| 5,007,705 A | 4/1991 | Morey et al. |
| 5,011,276 A | 4/1991 | Iwamoto |
| 5,016,643 A | 5/1991 | Applegate et al. |
| 5,022,732 A | 6/1991 | Engan et al. |
| 5,022,750 A | 6/1991 | Flasck |
| 5,023,725 A | 6/1991 | McCutchen |
| 5,023,818 A | 6/1991 | Wittensoldner et al. |
| 5,025,394 A | 6/1991 | Parke |
| 5,025,400 A | 6/1991 | Cook et al. |
| 5,035,473 A | 7/1991 | Kuwayama et al. |
| 5,038,352 A | 8/1991 | Lenth et al. |
| 5,043,924 A | 8/1991 | Hofmann |
| 5,047,626 A | 9/1991 | Bobb et al. |
| 5,053,698 A | 10/1991 | Ueda |
| 5,058,992 A | 10/1991 | Takahashi |
| 5,059,019 A | 10/1991 | McCullough |
| 5,061,075 A | 10/1991 | Alfano et al. |
| 5,061,919 A | 10/1991 | Watkins |
| 5,063,375 A | 11/1991 | Lien et al. |
| 5,077,608 A | 12/1991 | Dubner |
| 5,088,095 A | 2/1992 | Zirngibl |
| 5,089,903 A | 2/1992 | Kuwayama et al. |
| 5,095,491 A | 3/1992 | Kozlovsky et al. |
| 5,097,427 A | 3/1992 | Lathrop et al. |
| 5,101,184 A | 3/1992 | Antes |
| 5,103,306 A | 4/1992 | Weiman et al. |
| 5,103,339 A | 4/1992 | Broome |
| 5,111,468 A | 5/1992 | Kozlovsky et al. |
| 5,113,455 A | 5/1992 | Scott |
| 5,115,127 A | 5/1992 | Bobb et al. |
| 5,117,221 A | 5/1992 | Mishica, Jr. |
| RE33,973 E | 6/1992 | Kriz et al. |
| 5,121,086 A | 6/1992 | Srivastava |
| 5,123,085 A | 6/1992 | Wells et al. |
| 5,124,821 A | 6/1992 | Antier et al. |
| 5,132,812 A | 7/1992 | Takahashi et al. |
| 5,134,521 A | 7/1992 | Lacroix et al. |
| 5,136,675 A | 8/1992 | Hodson |

| | | | | | |
|---|---|---|---|---|---|
| 5,136,818 A | 8/1992 | Bramson | 5,394,516 A | 2/1995 | Winser |
| 5,142,788 A | 9/1992 | Willetts | 5,396,349 A | 3/1995 | Roberts et al. |
| 5,155,604 A | 10/1992 | Miekka et al. | 5,398,083 A | 3/1995 | Tsujihara et al. |
| 5,157,385 A | 10/1992 | Nakao et al. | 5,408,249 A | 4/1995 | Wharton et al. |
| 5,159,601 A | 10/1992 | Huber | 5,408,606 A | 4/1995 | Eckart |
| 5,161,013 A | 11/1992 | Rylander et al. | 5,410,371 A | 4/1995 | Lambert |
| 5,175,575 A | 12/1992 | Gersuk | 5,412,796 A | 5/1995 | Olive |
| 5,179,638 A | 1/1993 | Dawson et al. | 5,422,986 A | 6/1995 | Neely |
| 5,185,852 A | 2/1993 | Mayer | 5,430,888 A | 7/1995 | Witek et al. |
| 5,194,969 A | 3/1993 | DiFrancesco | 5,432,863 A | 7/1995 | Benati et al. |
| 5,196,922 A | 3/1993 | Yeomans | 5,444,839 A | 8/1995 | Silverbrook et al. |
| 5,198,661 A | 3/1993 | Anderson et al. | 5,451,765 A | 9/1995 | Gerber |
| 5,200,818 A | 4/1993 | Neta et al. | 5,459,610 A | 10/1995 | Bloom et al. |
| 5,206,868 A | 4/1993 | Deacon | 5,459,835 A | 10/1995 | Trevett |
| 5,214,757 A | 5/1993 | Mauney et al. | 5,465,121 A | 11/1995 | Blalock et al. |
| 5,222,205 A | 6/1993 | Larson et al. | 5,465,368 A | 11/1995 | Davidson et al. |
| 5,226,109 A | 7/1993 | Dawson et al. | 5,471,545 A | 11/1995 | Negami et al. |
| 5,227,863 A | 7/1993 | Bilbrey et al. | 5,471,567 A | 11/1995 | Soderberg et al. |
| 5,229,593 A | 7/1993 | Cato | 5,473,373 A | 12/1995 | Hwung et al. |
| 5,230,039 A | 7/1993 | Grossman et al. | 5,473,391 A | 12/1995 | Usui |
| 5,231,388 A | 7/1993 | Stoltz | 5,479,597 A | 12/1995 | Fellous |
| 5,239,625 A | 8/1993 | Bogart et al. | 5,480,305 A | 1/1996 | Montag et al. |
| 5,241,659 A | 8/1993 | Parulski et al. | 5,487,665 A | 1/1996 | Lechner et al. |
| 5,242,306 A | 9/1993 | Fisher | 5,488,687 A | 1/1996 | Rich |
| 5,243,448 A | 9/1993 | Banbury | 5,489,920 A | 2/1996 | Kaasila |
| 5,251,160 A | 10/1993 | Rockwood et al. | 5,490,238 A | 2/1996 | Watkins |
| 5,252,068 A | 10/1993 | Gryder | 5,490,240 A | 2/1996 | Foran et al. |
| 5,255,274 A | 10/1993 | Wysocki et al. | 5,493,439 A | 2/1996 | Engle |
| 5,266,930 A | 11/1993 | Ichikawa et al. | 5,493,629 A | 2/1996 | Stange |
| 5,267,045 A | 11/1993 | Stroomer | 5,495,563 A | 2/1996 | Winser |
| 5,272,473 A | 12/1993 | Thompson et al. | 5,499,194 A | 3/1996 | Prestidge et al. |
| 5,276,849 A | 1/1994 | Patel | 5,500,747 A | 3/1996 | Tanide et al. |
| 5,285,397 A | 2/1994 | Heier et al. | 5,500,761 A | 3/1996 | Goossen et al. |
| 5,291,317 A | 3/1994 | Newswanger | 5,502,482 A | 3/1996 | Graham |
| 5,293,233 A | 3/1994 | Billing et al. | 5,502,782 A | 3/1996 | Smith |
| 5,297,156 A | 3/1994 | Deacon | 5,504,496 A | 4/1996 | Tanaka et al. |
| 5,300,942 A | 4/1994 | Dolgoff | 5,506,949 A | 4/1996 | Perrin |
| 5,301,062 A | 4/1994 | Takahashi et al. | 5,519,518 A | 5/1996 | Watanabe et al. |
| 5,311,360 A | 5/1994 | Bloom et al. | 5,535,374 A | 7/1996 | Olive |
| 5,315,699 A | 5/1994 | Imai et al. | 5,536,085 A | 7/1996 | Li et al. |
| 5,317,576 A | 5/1994 | Leonberger et al. | 5,537,159 A | 7/1996 | Suematsu et al. |
| 5,317,689 A | 5/1994 | Nack et al. | 5,539,577 A | 7/1996 | Si et al. |
| 5,319,744 A | 6/1994 | Kelly et al. | 5,541,769 A | 7/1996 | Ansley et al. |
| 5,320,353 A | 6/1994 | Moore | 5,544,306 A | 8/1996 | Deering et al. |
| 5,320,534 A | 6/1994 | Thomas | 5,544,340 A | 8/1996 | Doi et al. |
| 5,325,133 A | 6/1994 | Adachi | 5,550,960 A | 8/1996 | Shirman et al. |
| 5,325,485 A | 6/1994 | Hochmuth et al. | 5,551,283 A | 9/1996 | Manaka et al. |
| 5,326,266 A | 7/1994 | Fisher et al. | 5,557,297 A | 9/1996 | Sharp et al. |
| 5,329,323 A | 7/1994 | Biles | 5,557,733 A | 9/1996 | Hicok et al. |
| 5,333,021 A | 7/1994 | Mitsutake et al. | 5,559,952 A | 9/1996 | Fujimoto |
| 5,333,245 A | 7/1994 | Vecchione | 5,559,954 A | 9/1996 | Sakoda et al. |
| 5,341,460 A | 8/1994 | Tam | 5,561,745 A | 10/1996 | Jackson et al. |
| 5,345,280 A | 9/1994 | Kimura et al. | 5,566,370 A | 10/1996 | Young |
| 5,347,433 A | 9/1994 | Sedlmayr | 5,572,229 A | 11/1996 | Fisher |
| 5,347,620 A | 9/1994 | Zimmer | 5,574,847 A | 11/1996 | Eckart et al. |
| 5,348,477 A | 9/1994 | Welch et al. | 5,579,456 A | 11/1996 | Cosman |
| 5,353,390 A | 10/1994 | Harrington | 5,584,696 A | 12/1996 | Walker et al. |
| 5,357,579 A | 10/1994 | Buchner et al. | 5,586,291 A | 12/1996 | Lasker et al. |
| 5,359,526 A | 10/1994 | Whittington et al. | 5,590,254 A | 12/1996 | Lippincott et al. |
| 5,359,704 A | 10/1994 | Rossignac et al. | 5,594,854 A | 1/1997 | Baldwin et al. |
| 5,360,010 A | 11/1994 | Applegate | 5,598,517 A | 1/1997 | Watkins |
| 5,361,386 A | 11/1994 | Watkins et al. | 5,604,849 A | 2/1997 | Artwick et al. |
| 5,363,220 A | 11/1994 | Kuwayama et al. | 5,610,665 A | 3/1997 | Berman et al. |
| 5,363,475 A | 11/1994 | Baker et al. | 5,612,710 A | 3/1997 | Christensen et al. |
| 5,363,476 A | 11/1994 | Kurashige et al. | 5,614,961 A | 3/1997 | Gibeau et al. |
| 5,367,585 A | 11/1994 | Ghezzo et al. | 5,625,768 A | 4/1997 | Dye |
| 5,367,615 A | 11/1994 | Economy et al. | 5,627,605 A | 5/1997 | Kim |
| 5,369,450 A | 11/1994 | Haseltine et al. | 5,629,801 A | 5/1997 | Staker et al. |
| 5,369,735 A | 11/1994 | Thier et al. | 5,630,037 A | 5/1997 | Schindler |
| 5,369,739 A | 11/1994 | Akeley | 5,633,750 A | 5/1997 | Nogiwa et al. |
| 5,377,320 A | 12/1994 | Abi-Ezzi et al. | 5,638,208 A | 6/1997 | Walker |
| 5,379,371 A | 1/1995 | Usami et al. | 5,648,860 A | 7/1997 | Ooi et al. |
| 5,380,995 A | 1/1995 | Udd et al. | 5,650,814 A | 7/1997 | Florent et al. |
| 5,381,338 A | 1/1995 | Wysocki et al. | 5,651,104 A | 7/1997 | Cosman |
| 5,381,519 A | 1/1995 | Brown et al. | 5,657,077 A | 8/1997 | DeAngelis et al. |
| 5,384,719 A | 1/1995 | Baker et al. | 5,658,060 A | 8/1997 | Dove |
| 5,388,206 A | 2/1995 | Poulton et al. | 5,659,490 A | 8/1997 | Imamura |
| 5,394,414 A | 2/1995 | Kozlovsky et al. | 5,659,671 A | 8/1997 | Tannenbaum et al. |
| 5,394,515 A | 2/1995 | Lentz et al. | 5,661,592 A | 8/1997 | Bornstein et al. |

| | | | | | | |
|---|---|---|---|---|---|---|
| 5,661,593 A | 8/1997 | Engle | | 5,999,549 A | 12/1999 | Freitag et al. |
| 5,665,942 A | 9/1997 | Williams et al. | | 6,002,454 A | 12/1999 | Kajiwara et al. |
| 5,677,783 A | 10/1997 | Bloom et al. | | 6,002,505 A | 12/1999 | Kraenert et al. |
| 5,684,939 A | 11/1997 | Foran et al. | | 6,005,580 A | 12/1999 | Donovan |
| 5,684,943 A | 11/1997 | Abraham et al. | | 6,005,611 A | 12/1999 | Gullichsen et al. |
| 5,689,437 A | 11/1997 | Nakagawa | | 6,014,144 A | 1/2000 | Nelson et al. |
| 5,691,999 A | 11/1997 | Ball et al. | | 6,014,163 A | 1/2000 | Houskeeper |
| 5,694,180 A | 12/1997 | Deter et al. | | 6,021,141 A | 2/2000 | Nam et al. |
| 5,696,892 A | 12/1997 | Redmann et al. | | 6,031,541 A | 2/2000 | Lipscomb et al. |
| 5,696,947 A | 12/1997 | Johns et al. | | 6,034,739 A | 3/2000 | Rohlfing et al. |
| 5,699,497 A | 12/1997 | Erdahl et al. | | 6,038,057 A | 3/2000 | Brazas, Jr. et al. |
| 5,703,604 A | 12/1997 | McCutchen | | 6,042,238 A | 3/2000 | Blackham et al. |
| 5,706,061 A | 1/1998 | Marshall et al. | | 6,052,125 A | 4/2000 | Gardiner et al. |
| 5,715,021 A | 2/1998 | Gibeau et al. | | 6,052,485 A | 4/2000 | Nelson et al. |
| 5,719,951 A | 2/1998 | Shackleton et al. | | 6,057,909 A | 5/2000 | Yahav et al. |
| 5,724,561 A | 3/1998 | Tarolli et al. | | 6,064,392 A | 5/2000 | Rohner |
| 5,726,785 A | 3/1998 | Chawki et al. | | 6,064,393 A | 5/2000 | Lengyel et al. |
| 5,734,386 A | 3/1998 | Cosman | | 6,069,903 A | 5/2000 | Zanger et al. |
| 5,734,521 A | 3/1998 | Fukudome et al. | | 6,072,500 A | 6/2000 | Foran et al. |
| 5,739,819 A | 4/1998 | Bar-Nahum | | 6,072,544 A | 6/2000 | Gleim et al. |
| 5,740,190 A | 4/1998 | Moulton | | 6,078,333 A | 6/2000 | Wittig et al. |
| 5,742,749 A | 4/1998 | Foran et al. | | 6,084,610 A | 7/2000 | Ozaki et al. |
| 5,748,264 A | 5/1998 | Hegg | | 6,094,226 A | 7/2000 | Ke et al. |
| 5,748,867 A | 5/1998 | Cosman et al. | | 6,094,267 A | 7/2000 | Levenson et al. |
| 5,761,709 A | 6/1998 | Kranich | | 6,094,298 A | 7/2000 | Luo et al. |
| 5,764,280 A | 6/1998 | Bloom et al. | | 6,100,906 A | 8/2000 | Asaro et al. |
| 5,764,311 A | 6/1998 | Bonde et al. | | 6,101,036 A | 8/2000 | Bloom |
| 5,768,443 A | 6/1998 | Michael et al. | | 6,108,054 A | 8/2000 | Heizmann et al. |
| 5,781,666 A | 7/1998 | Ishizawa et al. | | 6,111,616 A | 8/2000 | Chauvin et al. |
| 5,793,912 A | 8/1998 | Boord et al. | | 6,122,413 A | 9/2000 | Jiang et al. |
| 5,798,743 A | 8/1998 | Bloom | | 6,124,647 A | 9/2000 | Marcus et al. |
| 5,808,797 A | 9/1998 | Bloom et al. | | 6,124,808 A | 9/2000 | Budnovitch |
| 5,818,456 A | 10/1998 | Cosman et al. | | 6,124,922 A | 9/2000 | Sentoku |
| 5,818,998 A | 10/1998 | Harris et al. | | 6,124,989 A | 9/2000 | Oode et al. |
| 5,821,944 A | 10/1998 | Watkins | | 6,126,288 A | 10/2000 | Hewlett |
| 5,825,363 A | 10/1998 | Anderson | | 6,128,019 A | 10/2000 | Crocker, III et al. |
| 5,825,538 A | 10/1998 | Walker | | 6,128,021 A | 10/2000 | van der Meulen et al. |
| 5,835,256 A | 11/1998 | Huibers | | 6,130,770 A | 10/2000 | Bloom |
| 5,837,996 A | 11/1998 | Keydar | | 6,134,339 A | 10/2000 | Luo |
| 5,838,328 A | 11/1998 | Roller | | 6,137,565 A | 10/2000 | Ecke et al. |
| 5,838,484 A | 11/1998 | Goossen | | 6,137,932 A | 10/2000 | Kim et al. |
| 5,841,443 A | 11/1998 | Einkauf | | 6,141,013 A | 10/2000 | Nelson et al. |
| 5,841,447 A | 11/1998 | Drews | | 6,141,025 A | 10/2000 | Oka et al. |
| 5,841,579 A | 11/1998 | Bloom et al. | | 6,141,034 A * | 10/2000 | McCutchen .................. 348/36 |
| 5,850,225 A | 12/1998 | Cosman | | 6,144,481 A | 11/2000 | Kowarz et al. |
| 5,854,631 A | 12/1998 | Akeley et al. | | 6,147,690 A | 11/2000 | Cosman |
| 5,854,865 A | 12/1998 | Goldberg | | 6,147,695 A | 11/2000 | Bowen et al. |
| 5,860,721 A | 1/1999 | Bowron et al. | | 6,147,789 A | 11/2000 | Gelbart |
| 5,864,342 A | 1/1999 | Kajiya et al. | | 6,154,259 A | 11/2000 | Hargis et al. |
| 5,867,166 A | 2/1999 | Myhrvold et al. | | 6,175,579 B1 | 1/2001 | Sandford et al. |
| 5,867,301 A | 2/1999 | Engle | | 6,184,888 B1 | 2/2001 | Yuasa et al. |
| 5,870,097 A | 2/1999 | Snyder et al. | | 6,184,891 B1 | 2/2001 | Blinn |
| 5,870,098 A | 2/1999 | Gardiner | | 6,184,926 B1 | 2/2001 | Khosravi et al. |
| 5,874,967 A | 2/1999 | West et al. | | 6,188,427 B1 | 2/2001 | Anderson et al. |
| 5,889,529 A | 3/1999 | Jones et al. | | 6,188,712 B1 | 2/2001 | Jiang et al. |
| 5,900,881 A | 5/1999 | Ikedo | | 6,191,827 B1 | 2/2001 | Segman et al. |
| 5,903,272 A | 5/1999 | Otto | | 6,195,099 B1 | 2/2001 | Gardiner |
| 5,905,504 A | 5/1999 | Barkans et al. | | 6,195,484 B1 | 2/2001 | Brennan, III et al. |
| 5,908,300 A | 6/1999 | Walker et al. | | 6,195,609 B1 | 2/2001 | Pilley et al. |
| 5,909,225 A | 6/1999 | Schinnerer et al. | | 6,204,859 B1 | 3/2001 | Jouppi et al. |
| 5,912,670 A | 6/1999 | Lipscomb et al. | | 6,204,955 B1 | 3/2001 | Chao et al. |
| 5,912,740 A | 6/1999 | Zare et al. | | 6,215,579 B1 | 4/2001 | Bloom et al. |
| 5,917,495 A | 6/1999 | Doi et al. | | 6,219,015 B1 | 4/2001 | Bloom et al. |
| 5,920,361 A | 7/1999 | Gibeau et al. | | 6,222,937 B1 | 4/2001 | Cohen et al. |
| 5,923,333 A | 7/1999 | Stroyan | | 6,229,650 B1 | 5/2001 | Reznichenko et al. |
| 5,930,740 A | 7/1999 | Mathisen | | 6,229,827 B1 | 5/2001 | Fernald et al. |
| 5,943,060 A | 8/1999 | Cosman et al. | | 6,233,025 B1 | 5/2001 | Wallenstein |
| 5,946,129 A | 8/1999 | Xu et al. | | 6,236,408 B1 | 5/2001 | Watkins |
| 5,963,788 A | 10/1999 | Barron et al. | | 6,240,220 B1 | 5/2001 | Pan et al. |
| 5,969,699 A | 10/1999 | Balram et al. | | 6,262,739 B1 | 7/2001 | Migdal et al. |
| 5,969,721 A | 10/1999 | Chen et al. | | 6,262,810 B1 | 7/2001 | Bloomer |
| 5,969,726 A | 10/1999 | Rentschler et al. | | 6,263,002 B1 | 7/2001 | Hsu et al. |
| 5,974,059 A | 10/1999 | Dawson | | 6,266,068 B1 | 7/2001 | Kang et al. |
| 5,977,977 A | 11/1999 | Kajiya et al. | | 6,268,861 B1 | 7/2001 | Sanz-Pastor et al. |
| 5,980,044 A | 11/1999 | Cannon et al. | | 6,282,012 B1 | 8/2001 | Kowarz et al. |
| 5,982,553 A | 11/1999 | Bloom et al. | | 6,282,220 B1 | 8/2001 | Floyd |
| 5,987,200 A | 11/1999 | Fleming et al. | | 6,285,407 B1 | 9/2001 | Yasuki et al. |
| 5,988,814 A | 11/1999 | Rohlfing et al. | | 6,285,446 B1 | 9/2001 | Farhadiroushan |
| 5,990,935 A | 11/1999 | Rohlfing | | 6,292,165 B1 | 9/2001 | Lin et al. |

| | | | | | | |
|---|---|---|---|---|---|---|
| 6,292,268 B1 | 9/2001 | Hirota et al. | | 6,580,430 B1 | 6/2003 | Hollis et al. |
| 6,292,310 B1 | 9/2001 | Chao | | 6,591,020 B1 | 7/2003 | Klassen |
| 6,297,899 B1 | 10/2001 | Romanovsky | | 6,594,043 B1 | 7/2003 | Bloom et al. |
| 6,298,066 B1 | 10/2001 | Wettroth et al. | | 6,597,363 B1 | 7/2003 | Duluk, Jr. et al. |
| 6,301,370 B1 | 10/2001 | Steffens et al. | | 6,598,979 B2 | 7/2003 | Yoneno |
| 6,304,245 B1 | 10/2001 | Groenenboom | | 6,600,460 B1 | 7/2003 | Mays, Jr. |
| 6,307,558 B1 | 10/2001 | Mao | | 6,600,830 B1 | 7/2003 | Lin et al. |
| 6,307,663 B1 | 10/2001 | Kowarz | | 6,600,854 B2 | 7/2003 | Anderegg et al. |
| 6,308,144 B1 | 10/2001 | Bronfeld et al. | | 6,603,482 B1 | 8/2003 | Tidwell |
| 6,320,688 B1 | 11/2001 | Westbrook et al. | | 6,643,299 B1 | 11/2003 | Lin |
| 6,323,984 B1 | 11/2001 | Trisnadi | | 6,646,645 B2 | 11/2003 | Simmonds et al. |
| 6,333,792 B1 | 12/2001 | Kimura | | 6,650,326 B1 | 11/2003 | Huber et al. |
| 6,333,803 B1 | 12/2001 | Kurotori et al. | | 6,671,293 B2 | 12/2003 | Kopp et al. |
| 6,335,765 B1 | 1/2002 | Daly et al. | | 6,678,085 B2 | 1/2004 | Kowarz et al. |
| 6,335,941 B1 | 1/2002 | Grubb et al. | | 6,690,655 B1 | 2/2004 | Miner et al. |
| 6,340,806 B1 | 1/2002 | Smart et al. | | 6,692,129 B2 | 2/2004 | Gross et al. |
| 6,356,683 B1 | 3/2002 | Hu et al. | | 6,711,187 B2 | 3/2004 | Tanner et al. |
| 6,360,042 B1 | 3/2002 | Long | | 6,727,918 B1 | 4/2004 | Nason |
| 6,361,173 B1 | 3/2002 | Vlahos et al. | | 6,738,105 B1 | 5/2004 | Hannah et al. |
| 6,362,817 B1 | 3/2002 | Powers et al. | | 6,741,384 B1 | 5/2004 | Martin et al. |
| 6,362,818 B1 | 3/2002 | Gardiner et al. | | 6,747,649 B1 | 6/2004 | Sanz-Pastor et al. |
| 6,363,089 B1 | 3/2002 | Fernald et al. | | 6,747,781 B2 | 6/2004 | Trisnadi |
| 6,366,721 B1 | 4/2002 | Hu et al. | | 6,751,001 B1 | 6/2004 | Tanner et al. |
| 6,369,936 B1 | 4/2002 | Moulin | | 6,760,036 B2 | 7/2004 | Tidwell |
| 6,370,312 B1 | 4/2002 | Wagoner et al. | | 6,763,042 B2 | 7/2004 | Williams et al. |
| 6,374,011 B1 | 4/2002 | Wagoner et al. | | 6,773,142 B2 | 8/2004 | Rekow |
| 6,374,015 B1 | 4/2002 | Lin | | 6,776,045 B2 | 8/2004 | Fernald et al. |
| 6,375,366 B1 | 4/2002 | Kato et al. | | 6,782,205 B2 | 8/2004 | Trisnadi et al. |
| 6,381,072 B1 | 4/2002 | Burger | | 6,788,304 B1 | 9/2004 | Hart et al. |
| 6,381,385 B1 | 4/2002 | Watley et al. | | 6,788,307 B2 | 9/2004 | Coleman et al. |
| 6,384,828 B1 | 5/2002 | Arbeiter et al. | | 6,789,903 B2 | 9/2004 | Parker et al. |
| 6,388,241 B1 | 5/2002 | Ang | | 6,791,562 B2 | 9/2004 | Cosman et al. |
| 6,393,036 B1 | 5/2002 | Kato | | 6,793,350 B1 * | 9/2004 | Raskar et al. .................. 353/121 |
| 6,393,181 B1 | 5/2002 | Bulman et al. | | 6,798,418 B1 | 9/2004 | Sartori et al. |
| 6,396,994 B1 | 5/2002 | Philipson et al. | | 6,799,850 B2 | 10/2004 | Hong et al. |
| 6,404,425 B1 | 6/2002 | Cosman | | 6,801,205 B2 | 10/2004 | Gardiner et al. |
| 6,407,736 B1 | 6/2002 | Regan | | 6,809,731 B2 | 10/2004 | Muffler et al. |
| 6,411,425 B1 | 6/2002 | Kowarz et al. | | 6,811,267 B1 | 11/2004 | Allen et al. |
| 6,421,636 B1 | 7/2002 | Cooper et al. | | 6,816,169 B2 | 11/2004 | Cosman |
| 6,424,343 B1 | 7/2002 | Deering et al. | | 6,831,648 B2 | 12/2004 | Mukherjee et al. |
| 6,429,876 B1 | 8/2002 | Morein | | 6,840,627 B2 | 1/2005 | Olbrich |
| 6,429,877 B1 | 8/2002 | Stroyan | | 6,842,298 B1 | 1/2005 | Shafer et al. |
| 6,433,823 B1 | 8/2002 | Nakamura et al. | | 6,856,449 B2 | 2/2005 | Winkler et al. |
| 6,433,838 B1 | 8/2002 | Chen | | 6,868,212 B2 | 3/2005 | DeWitte et al. |
| 6,433,840 B1 | 8/2002 | Poppleton | | 6,871,958 B2 | 3/2005 | Streid et al. |
| 6,437,789 B1 | 8/2002 | Tidwell et al. | | 6,897,878 B2 | 5/2005 | Cosman et al. |
| 6,445,362 B1 | 9/2002 | Tegreene | | 6,943,803 B1 | 9/2005 | Cosman et al. |
| 6,445,433 B1 | 9/2002 | Levola | | 6,956,582 B2 | 10/2005 | Tidwell |
| 6,449,071 B1 | 9/2002 | Farhan et al. | | 6,956,878 B1 | 10/2005 | Trisnadi |
| 6,449,293 B1 | 9/2002 | Pedersen et al. | | 6,971,576 B2 | 12/2005 | Tsikos et al. |
| 6,452,667 B1 | 9/2002 | Fernald et al. | | 6,984,039 B2 | 1/2006 | Agostinelli |
| 6,456,288 B1 | 9/2002 | Brockway et al. | | 6,985,663 B2 | 1/2006 | Catchmark et al. |
| 6,466,206 B1 | 10/2002 | Deering | | 7,012,669 B2 | 3/2006 | Streid et al. |
| 6,466,224 B1 | 10/2002 | Nagata et al. | | 7,030,883 B2 | 4/2006 | Thompson |
| 6,470,036 B1 | 10/2002 | Bailey et al. | | 7,038,735 B2 | 5/2006 | Coleman et al. |
| 6,473,090 B1 | 10/2002 | Mayer | | 7,043,102 B2 | 5/2006 | Okamoto et al. |
| 6,476,848 B2 | 11/2002 | Kowarz et al. | | 7,053,911 B2 | 5/2006 | Cosman |
| 6,480,513 B1 | 11/2002 | Kapany et al. | | 7,053,912 B2 | 5/2006 | Cosman |
| 6,480,634 B1 | 11/2002 | Corrigan | | 7,053,913 B2 | 5/2006 | Cosman |
| 6,490,931 B1 | 12/2002 | Fernald et al. | | 7,054,051 B1 | 5/2006 | Bloom |
| 6,496,160 B1 | 12/2002 | Tanner et al. | | 7,091,980 B2 | 8/2006 | Tidwell |
| 6,507,706 B1 | 1/2003 | Brazas et al. | | 7,095,423 B2 | 8/2006 | Cosman et al. |
| 6,510,272 B1 | 1/2003 | Wiegand | | 7,110,153 B2 | 9/2006 | Sakai |
| 6,511,182 B1 | 1/2003 | Agostinelli et al. | | 7,110,624 B2 | 9/2006 | Williams et al. |
| RE37,993 E | 2/2003 | Zhang | | 7,111,943 B2 | 9/2006 | Agostinelli et al. |
| 6,519,388 B1 | 2/2003 | Fernald et al. | | 7,113,320 B2 | 9/2006 | Tanner |
| 6,522,809 B1 | 2/2003 | Takabayashi et al. | | 7,133,583 B2 | 11/2006 | Marceau et al. |
| 6,525,740 B1 | 2/2003 | Cosman | | 7,169,630 B2 | 1/2007 | Moriwaka |
| 6,529,310 B1 | 3/2003 | Huibers et al. | | 7,193,765 B2 | 3/2007 | Christensen et al. |
| 6,529,531 B1 | 3/2003 | Everage et al. | | 7,193,766 B2 | 3/2007 | Bloom |
| 6,534,248 B2 | 3/2003 | Jain et al. | | 7,197,200 B2 | 3/2007 | Marceau et al. |
| 6,538,656 B1 | 3/2003 | Cheung et al. | | 7,210,786 B2 | 5/2007 | Tamura et al. |
| 6,549,196 B1 | 4/2003 | Taguchi et al. | | 7,215,840 B2 | 5/2007 | Marceau et al. |
| 6,554,431 B1 | 4/2003 | Binsted et al. | | 7,237,916 B2 | 7/2007 | Mitomori |
| 6,556,627 B2 | 4/2003 | Kitamura et al. | | 7,257,519 B2 | 8/2007 | Cosman |
| 6,563,968 B2 | 5/2003 | Davis et al. | | 7,267,442 B2 | 9/2007 | Childers et al. |
| 6,574,352 B1 | 6/2003 | Skolmoski | | 7,277,216 B2 | 10/2007 | Bloom |
| 6,575,581 B2 | 6/2003 | Tsurushima | | 7,286,277 B2 | 10/2007 | Bloom et al. |
| 6,577,429 B1 | 6/2003 | Kurtz et al. | | 7,317,464 B2 | 1/2008 | Willis |

| | | | |
|---|---|---|---|
| 7,327,909 B2 | 2/2008 | Marceau et al. | |
| 7,334,902 B2 | 2/2008 | Streid et al. | |
| 7,354,157 B2 | 4/2008 | Takeda et al. | |
| 7,364,309 B2 | 4/2008 | Sugawara et al. | |
| 7,400,449 B2 | 7/2008 | Christensen et al. | |
| 7,420,177 B2 | 9/2008 | Williams et al. | |
| 7,594,965 B2 | 9/2009 | Tanaka | |
| 2001/0002124 A1 | 5/2001 | Mamiya et al. | |
| 2001/0027456 A1 | 10/2001 | Lancaster et al. | |
| 2001/0047251 A1 | 11/2001 | Kemp | |
| 2002/0005862 A1 | 1/2002 | Deering | |
| 2002/0021462 A1 | 2/2002 | Delfyett et al. | |
| 2002/0030769 A1* | 3/2002 | Bae | 349/43 |
| 2002/0042674 A1* | 4/2002 | Mochizuki et al. | 701/211 |
| 2002/0067467 A1 | 6/2002 | Dorval et al. | |
| 2002/0071453 A1 | 6/2002 | Lin | |
| 2002/0075202 A1 | 6/2002 | Fergason | |
| 2002/0101647 A1 | 8/2002 | Moulin | |
| 2002/0136121 A1 | 9/2002 | Salmonsen et al. | |
| 2002/0145615 A1 | 10/2002 | Moore | |
| 2002/0145806 A1 | 10/2002 | Amm | |
| 2002/0146248 A1 | 10/2002 | Herman et al. | |
| 2002/0154860 A1 | 10/2002 | Fernald et al. | |
| 2002/0176134 A1 | 11/2002 | Vohra | |
| 2002/0196414 A1 | 12/2002 | Manni et al. | |
| 2003/0035190 A1 | 2/2003 | Brown et al. | |
| 2003/0038807 A1 | 2/2003 | Demos et al. | |
| 2003/0039443 A1 | 2/2003 | Catchmark et al. | |
| 2003/0048275 A1 | 3/2003 | Ciolac | |
| 2003/0081303 A1 | 5/2003 | Sandstrom et al. | |
| 2003/0086647 A1 | 5/2003 | Willner et al. | |
| 2003/0142319 A1 | 7/2003 | Ronnekleiv et al. | |
| 2003/0160780 A1 | 8/2003 | Lefebvre et al. | |
| 2003/0174312 A1 | 9/2003 | Leblanc | |
| 2003/0214633 A1 | 11/2003 | Roddy et al. | |
| 2003/0235304 A1 | 12/2003 | Evans et al. | |
| 2004/0017518 A1 | 1/2004 | Stern et al. | |
| 2004/0017608 A1* | 1/2004 | Lantz | 359/451 |
| 2004/0085283 A1 | 5/2004 | Wang | |
| 2004/0136074 A1 | 7/2004 | Ford et al. | |
| 2004/0165154 A1 | 8/2004 | Kobori et al. | |
| 2004/0179007 A1 | 9/2004 | Bower et al. | |
| 2004/0183954 A1 | 9/2004 | Hannah et al. | |
| 2004/0184013 A1* | 9/2004 | Raskar et al. | 353/121 |
| 2004/0196660 A1 | 10/2004 | Usami | |
| 2004/0207618 A1 | 10/2004 | Williams et al. | |
| 2005/0018309 A1 | 1/2005 | McGuire, Jr. et al. | |
| 2005/0024722 A1 | 2/2005 | Agostinelli et al. | |
| 2005/0047134 A1 | 3/2005 | Mueller et al. | |
| 2005/0093854 A1 | 5/2005 | Kennedy et al. | |
| 2005/0243389 A1 | 11/2005 | Kihara | |
| 2006/0039051 A1 | 2/2006 | Baba et al. | |
| 2006/0114544 A1 | 6/2006 | Bloom et al. | |
| 2006/0176912 A1 | 8/2006 | Anikitchev | |
| 2006/0221429 A1 | 10/2006 | Christensen et al. | |
| 2006/0238851 A1 | 10/2006 | Bloom | |
| 2006/0255243 A1 | 11/2006 | Kobayashi et al. | |
| 2007/0183473 A1 | 8/2007 | Bicknell et al. | |
| 2008/0037125 A1 | 2/2008 | Takamiya | |
| 2008/0218837 A1 | 9/2008 | Yang et al. | |

FOREIGN PATENT DOCUMENTS

| | | |
|---|---|---|
| EP | 0 155 858 | 9/1985 |
| EP | 0 306 308 | 3/1989 |
| EP | 0 319 165 | 7/1989 |
| EP | 0 417 039 | 3/1991 |
| EP | 0 480 570 | 4/1992 |
| EP | 0 488 326 | 6/1992 |
| EP | 0 489 594 | 6/1992 |
| EP | 0 528 646 | 2/1993 |
| EP | 0 530 760 | 3/1993 |
| EP | 0 550 189 | 7/1993 |
| EP | 0 610 665 | 8/1994 |
| EP | 0 621 548 | 10/1994 |
| EP | 0 627 644 | 12/1994 |
| EP | 0 627 850 | 12/1994 |
| EP | 0 643 314 | 3/1995 |
| EP | 0 654 777 | 5/1995 |
| EP | 0 658 868 | 6/1995 |
| EP | 0 689 078 | 12/1995 |
| EP | 0 801 319 | 10/1997 |
| EP | 0 880 282 | 11/1998 |
| EP | 1 365 584 | 11/2003 |
| GB | 2 118 365 | 10/1983 |
| GB | 2 144 608 | 3/1985 |
| GB | 2 179 147 | 2/1987 |
| GB | 2 245 806 | 1/1992 |
| GB | 2 251 770 | 7/1992 |
| GB | 2 251 773 | 7/1992 |
| GB | 2 266 385 | 10/1993 |
| GB | 2 293 079 | 3/1996 |
| JP | 63-305323 | 12/1988 |
| JP | 2-219092 | 8/1990 |
| JP | 2000-305481 | 11/2000 |
| WO | 87/01571 | 3/1987 |
| WO | 92/12506 | 7/1992 |
| WO | 93/02269 | 2/1993 |
| WO | 93/09472 | 5/1993 |
| WO | 93/18428 | 9/1993 |
| WO | 95/11473 | 4/1995 |
| WO | 95/27267 | 10/1995 |
| WO | 96/41217 | 12/1996 |
| WO | 96/41224 | 12/1996 |
| WO | 97/26569 | 7/1997 |
| WO | 98/15127 | 4/1998 |
| WO | 01/46248 | 6/2001 |
| WO | 01/57581 | 8/2001 |
| WO | 02/12925 | 2/2002 |
| WO | 02/23824 | 3/2002 |
| WO | 02/31575 | 4/2002 |
| WO | 03/001281 | 1/2003 |

OTHER PUBLICATIONS

Akeley, "RealityEngine Graphics," Computer Graphics Proceedings, Annual Conference Series, 1993.

Allen, J. et al., "An Interactive Learning Environment for VLSI Design," Proceedings of the IEEE, Jan. 2000, pp. 96-106, vol. 88, No. 1.

Allen, W. et al., "47.4: Invited Paper: Wobulation: Doubling the Addressed Resolution of Projection Displays," SID 05 Digest, 2005, pp. 1514-1517.

Amm, et al., "5.2: Grating Light Valve™ Technology: Update and Novel Applications," Presented at Society for Information Display Symposium, May 19, 1998, Anaheim, California.

Apgar et al., "A Display System for the Stellar™ Graphics Supercomputer Model GS1000™," Computer Graphics, Aug. 1988, pp. 255-262, vol. 22, No. 4.

Baer, Computer Systems Architecture, 1980, Computer Science Press, Inc., Rockville, Maryland.

Barad et al., "Real-Time Procedural Texturing Techniques Using MMX," Gamasutra, May 1, 1998, http://www.gamasutra.com/features/19980501/mmxtexturing_01.htm.

Bass, "4K GLV Calibration," E&S Company, Jan. 8, 2008.

Becker et al., "Smooth Transitions between Bump Rendering Algorithms," Computer Graphics Proceedings, 1993, pp. 183-189.

Bishop et al., "Frameless Rendering: Double Buffering Considered Harmful," Computer Graphics Proceedings, Annual Conference Series, 1994.

Blinn, "Simulation of Wrinkled Surfaces," Siggraph '78 Proceedings, 1978, pp. 286-292.

Blinn, "A Trip Down the Graphics Pipeline: Subpixelic Particles," IEEE Computer Graphics & Applications, Sep./Oct. 1991, pp. 86-90, vol. 11, No. 5.

Blinn et al., "Texture and Reflection in Computer Generated Images," Communications of the ACM, Oct. 1976, pp. 542-547, vol. 19, No. 10.

Bloom, "The Grating Light Valve: revolutionizing display technology," Silicon Light Machines, date unknown.

Boyd et al., "Parametric Interaction of Focused Gaussian Light Beams," Journal of Applied Physics, Jul. 1968, pp. 3597-3639 vol. 39, No. 8.

Brazas et al., "High-Resolution Laser-Projection Display System Using a Grating Electromechanical System (GEMS)," MOEMS Display and Imaging Systems II, Proceedings of SPIE, 2004, pp. 65-75 vol. 5348.

Bresenham, "Algorithm for computer control of a digital plotter," IBM Systems Journal, 1965, pp. 25-30, vol. 4, No. 1.

Carlson, "An Algorithm and Data Structure for 3D Object Synthesis Using Surface Patch Intersections," Computer Graphics, Jul. 1982, pp. 255-263, vol. 16, No. 3.

Carpenter, "The A-buffer, an Antialiased Hidden Surface Method," Computer Graphics, Jul. 1984, pp. 103-108, vol. 18, No. 3.

Carter, "Re: Re seams and creaseAngle (long)," posted on the GeoVRML.org website Feb. 2, 2000, http://www.ai.sri.com/geovrml/archive/msg00560.html.

Catmull, "An Analytic Visible Surface Algorithm for Independent Pixel Processing," Computer Graphics, Jul. 1984, pp. 109-115, vol. 18, No. 3.

Chasen, Geometric Principles and Procedures for Computer Graphic Applications, 1978, pp. 11-123, Upper Saddle River, New Jersey.

Choy et al., "Single Pass Algorithm for the Generation of Chain-Coded Contours and Contours Inclusion Relationship," Communications, Computers and Signal Processing—IEEE Pac Rim '93, 1993, pp. 256-259.

Clark et al., "Photographic Texture and CIG: Modeling Strategies for Production Data Bases," 9th VITSC Proceedings, Nov. 30-Dec. 2, 1987, pp. 274-283.

Corbin et al., "Grating Light Valve™ and Vehicle Displays," Silicon Light Machines, Sunnyvale, California, date unknown.

Corrigan et al., "Grating Light Valve™ Technology for Projection Displays," Presented at the International Display Workshop—Kobe, Japan, Dec. 9, 1998.

Crow, "Shadow Algorithms for Computer Graphics," Siggraph '77, Jul. 20-22, 1977, San Jose, California, pp. 242, 248.

Deering et al., "FBRAM: A new Form of Memory Optimized for 3D Graphics," Computer Graphics Proceedings, Annual Conference Series, 1994.

Drever et al., "Laser Phase and Frequency Stabilization Using an Optical Resonator," Applied Physics B: Photophysics and Laser Chemistry, 1983, pp. 97-105, vol. 31.

Duchaineau et al., "ROAMing Terrain: Real-time Optimally Adapting Meshes," Los Alamos National Laboratory and Lawrence Livermore National Laboratory, 1997.

Duff, "Compositing 3-D Rendered Images," Siggraph '85, Jul. 22-26, 1985, San Francisco, California, pp. 41-44.

Faux et al., Computational Geometry for Design and Manufacture, 1979, Ellis Horwood, Chicester, United Kingdom.

Feiner et al., "Dial: A Diagrammatic Animation Language," IEEE Computer Graphics & Applications, Sep. 1982, pp. 43-54, vol. 2, No. 7.

Fiume et al., "A Parallel Scan Conversion Algorithm with Anti-Aliasing for a General-Purpose Ultracomputer," Computer Graphics, Jul. 1983, pp. 141-150, vol. 17, No. 3.

Foley et al., Computer Graphics: Principles and Practice, 2nd ed., 1990, Addison-Wesley Publishing Co., Inc., Menlo Park, California.

Foley et al., Fundamentals of Interactive Computer Graphics, 1982, Addison-Wesley Publishing Co., Inc., Menlo Park, California.

Fox et al., "Development of Computer-Generated Imagery for a Low-Cost Real-Time Terrain Imaging System," IEEE 1986 National Aerospace and Electronic Conference, May 19-23, 1986, pp. 986-991.

Gambotto, "Combining Image Analysis and Thermal Models for Infrared Scene Simulations," Image Processing Proceedings, ICIP-94, IEEE International Conference, 1994, vol. 1, pp. 710-714.

Gardiner, "A Method for Rendering Shadows," E&S Company, Sep. 25, 1996.

Gardiner, "Shadows in Harmony," E&S Company, Sep. 20, 1996.

Gardner, "Simulation of Natural Scenes Using Textured Quadric Surfaces," Computer Graphics, Jul. 1984, pp. 11-20, vol. 18, No. 3.

Gardner, "Visual Simulation of Clouds," Siggraph '85, Jul. 22-26, 1985, San Francisco, California, pp. 297-303.

Giloi, Interactive Computer Graphics: Data Structures, Algorithms, Languages, 1978, Prentice-Hall, Inc., Englewood Cliffs, New Jersey.

Glaskowsky, "Intel Displays 740 Graphics Chip: Auburn Sets New Standard for Quality—But Not Speed," Microprocessor Report, Feb. 16, 1998, pp. 5-9, vol. 12, No. 2.

Goshtasby, "Registration of Images with Geometric Distortions," IEEE Transactions on Geoscience and Remote Sensing, Jan. 1988, pp. 60-64, vol. 26, No. 1.

Great Britain Health & Safety Executive, The Radiation Safety of Lasers Used for Display Purposes, Oct. 1996.

Gupta et al., "Filtering Edges for Gray-Scale Displays," Computer Graphics, Aug. 1981, pp. 1-5, vol. 15, No. 3.

Gupta et al., "A VLSI Architecture for Updating Raster-Scan Displays," Computer Graphics, Aug. 1981, pp. 71-78, vol. 15, No. 3.

Stevens et al., "The National Simulation Laboratory: The Unifying Tool for Air Traffic Control System Development," Proceedings of the 1991 Winter Simulation Conference, 1991, pp. 741-746.

Stone, High-Performance Computer Architecture, 1987, pp. 278-330, Addison-Wesley Publishing Company, Menlo Park, California.

Tanner et al., "The Clipmap: A Virtual Mipmap," Silicon Graphics Computer Systems; Proceedings of the 25th Annual Conference on Computer Graphics and Interactive Techniques, Jul. 1998.

Tanriverdi et al., "Interacting with Eye Movements in Virtual Environments," CHI Letters, Apr. 2000, pp. 265-272, vol. 2, No. 1.

Texas Instruments, DLP® 3-D HDTV Technology, 2007.

Torborg et al., "Talisman: Commodity Realtime 3D Graphics for the PC," Computer Graphics Proceedings, Annual Conference Series, 1996, pp. 353-363.

Trisnadi, "Hadamard speckle contrast reduction," Optics Letters, 2004, vol. 29, pp. 11-13.

Trisnadi et al., "Overview and applications of Grating Light Valve™ based optical write engines for high-speed digital imaging," proceedings of conference "MOEMS Display and Imaging SYstems II," Jan. 2004, vol. 5328, 13 pages.

Whitton, "Memory Design for Raster Graphics Displays," IEEE Computer Graphics & Applications, Mar. 1984, pp. 48-65.

Williams, "Casting Curved Shadows on Curved Surfaces," Computer Graphics Lab, New York Institute of Technology, 1978, pp. 270-274.

Williams, "Pyramidal Parametrics," Computer Graphics, Jul. 1983, pp. 1-11, vol. 17, No. 3.

Willis et al., "A Method for Continuous Adaptive Terrain," Presented at the 1996 IMAGE Conference, Jun. 23-28, 1996.

Woo et al., "A Survey of Shadow Algorithms," IEEE Computer Graphics & Applications, Nov. 1990, pp. 13-32, vol. 10, No. 6.

Wu et al., "A Differential Method for Simultaneous Estimation of Rotation, Change of Scale and Translation," Signal Processing: Image Communication, 1990, pp. 69-80, vol. 2, No. 1.

Youbing et al., "A Fast Algorithm for Large Scale Terrain Walkthrough," CAD/Graphics, Aug. 22-24, 2001, 6 pages.

Hanbury, "The Taming of the Hue, Saturation and Brightness Colour Space," Centre de Morphologie Mathematique, Ecole des Mines de Paris, date unknown, pp. 234-243.

Sollberger et al., "Frequency Stabilization of Semiconductor Lasers for Applications in Coherent Communication Systems," Journal of Lightwave Technology, Apr. 1987, pp. 485-491, vol. LT-5, No. 4.

Apte, "Grating Light Valves for High-Resolution Displays," Ph.D. Dissertation—Stanford University, 1994 (abstract only).

Ellis, "Lo-cost Bimorph Mirrors in Adaptive Optics," Ph.D. Thesis, Imperial College of Science, Technology and Medicine—University of London, 1999.

Halevi, "Bimorph piezoelectric flexible mirror: graphical solution and comparison with experiment," J. Opt. Soc. Am., Jan. 1983, pp. 110-113, vol. 73, No. 1.

Kudryashov et al., "Adaptive Optics for High Power Laser ZBeam Control," Springer Proceedings in Physics, 2005, pp. 237-248, vol. 102.

Safronov, "Bimorph adaptive optics: elements, technology and design principles," SPIE, 1996, pp. 494-504, vol. 2774.

Solgaard, "Integrated Semiconductor Light Modulators for Fiber-Optic and Display Applications," Ph.D. Dissertation submitted to the Deparatment of Electrical Engineering and the Committee on Graduate Studies of Stanford University, Feb. 1992.

Steinhaus et al., "Bimorph piezoelectric flexible mirror," J. Opt. Soc. Am., Mar. 1979, pp. 478-481, vol. 69, No. 3.

Tseng et al., "Development of an Aspherical Bimorph PZT Mirror Bender with Thin Film Resistor Electrode," Advanced Photo Source, Argonne National Laboratory, Sep. 2002, pp. 271-278.

Vinevich et al., "Cooled and uncooled single-channel deformable mirrors for industrial laser systems," Quantum Electronics, 1998, pp. 366-369, vol. 28, No. 4.

Hearn et al., Computer Graphics, 2nd ed., 1994, pp. 143-183.

Heckbert, "Survey of Texture Mapping," IEEE Computer Graphics and Applications, Nov. 1986, pp. 56-67.

Heckbert, "Texture Mapping Polygons in Perspective," New York Institute of Technology, Computer Graphics Lab, Technical Memo No. 13, Apr. 28, 1983.

Heidrich et al., "Applications of Pixel Textures in Visualization and Realistic Image Synthesis," Symposium on INteractive 3D Graphics, 1990, pp. 127-135, Atlanta, Georgia.

Holten-Lund, Design for Scalability in 3D Computer Graphics Architectures, Ph.D. thesis, Computer Science sand Technology Informatics and Mathematical Modelling, Technical University of Denmark, Jul. 2001.

Integrating Sphere, www.crowntech.-inc.com, 010-82781750/82782352/68910917, date unknown.

INTEL740 Graphics Accelerator Datasheet, Apr. 1998.

INTEL470 Graphics Accelerator Datasheet, Architectural Overview, at least as early as Apr. 30, 1998.

Jacob, "Eye Tracking in Advanced Interface Design," ACM, 1995.

Kelley et al., "Hardware Accelerated Rendering of CSG and Transparency," SIGGRAPH '94, in Computer Graphics Proceedings, Annual Conference Series, 1994, pp. 177-184.

Klassen, "Modeling the Effect of the Atmosphere on Light," ACM Transactions on Graphics, Jul. 1987, pp. 215-237, vol. 6, No. 3.

Kleiss, "Tradeoffs Among Types of Scene Detail for Simulating Low-Altitude Flight," University of Dayton Research Institute, Aug. 1, 1992, pp. 1141-1146.

Lewis, "Algorithms for Solid Noise Synthesis," SIGGRAPH '89, Computer Graphics, Jul. 1989, pp. 263-270, vol. 23, No. 3.

Lindstrom et al., "Real-Time, Continuous Level of Detail Rendering of Height Fields," SIGGRAPH '96, Aug. 1996.

McCarty et al., "A Virtual Cockpit for a Distributed Interactive Simulation," IEEE Computer Graphics & Applications, Jan. 1994, pp. 49-54.

Microsoft Flight Simulator 2004, Aug. 9, 2000. http://www.microsoft.com/games/flightsimulator/fs2000_devdesk.sdk.asp.

Miller et al., "Illumination and Reflection Maps: Simulated Objects in Simulated and Real Environments," SIGGRAPH '84, Course Notes for Advances Computer Graphics Animation, Jul. 23, 1984.

Mitchell, "Spectrally Optimal Sampling for Distribution Ray Tracing," SIGGRAPH '91, Computer Graphics, Jul. 1991, pp. 157-165, vol. 25, No. 4.

Mitsubishi Electronic Device Group, "Overview of 3D-RAM and Its Functional Blocks," 1995.

Montrym et al., "InfiniteReality: A Real-Time Graphics System," Computer Graphics Proceedings, Annual Conferecen Series, 1997.

Mooradian et al., "High Power Extended Vertical Cavity Surface Emitting Diode Lasers and Arrays and Their Applications," Micro-Optics Conference, Tokyo, Nov. 2, 2005.

Musgrave et al., "The Synthesis and Rendering of Eroded Fractal Terrains," SIGGRAPH '89, Computer Graphics, Jul. 1989, pp. 41-50, vol. 23, No. 3.

Nakamae et al., "Compositing 3D Images with Antialiasing and Various Shading Effects," IEEE Computer Graphics & Applications, Mar. 1989, pp. 21-29, vol. 9, No. 2.

Newman et al., Principles of Interactive Computer Graphics, 2nd ed., 1979, McGraw-Hill Book Company, San Francisco, California.

Niven, "Trends in Laser Light Sources for Projection Display," Novalux International Display Workshop, Session LAD2-2, Dec. 2006.

Oshima et al., "An Animation Design Tool Utilizing Texture," International Workshop on Industrial Applications of Machine Intelligence and Vision, Tokyo, Apr. 10-12, 1989, pp. 337-342.

Parke, "Simulation and Expected Performance Analysis of Multiple Processor Z-Buffer Systems," Computer Graphics, 1980, pp. 48-56.

Peachey, "Solid Texturing of Complex Surfaces," SIGGRAPH '85, 1985, pp. 279-286, vol. 19, No. 3.

Peercy et al., "Efficient Bump Mapping Hardware," Computer Graphics Proceedings, 1997.

Perlin, "An Image Synthesizer," SIGGRAPH '85, 1985, pp. 287-296, vol. 19, No. 3.

Pineda, "A Parallel Algorithm for Polygon Rasterization," SIGGRAPH '88, Aug. 1988, pp. 17-20, vol. 22, No. 4.

Polis et al., "Automating the Construction of Large Scale Virtual Worlds," Digital Mapping Laboratory, School of Computer Science, Carnegie Mellon University, date unknown.

Porter et al., "Compositing Digital Images," SIGGRAPH '84, Computer Graphics, Jul. 1984, pp. 253-259, vol. 18, No. 3.

Poulton et al., "Breaking the Frame-Buffer Bottleneck with Logic-Enhanced Memories," IEEE Computer Graphics & Applications, Nov. 1992, pp. 65-74.

Rabinovich et al., "Visualization of Large Terrains in Resource-Limited Computing Environments," Computer Science Department, Technion—Israel Institute of Technology, pp. 95-102, date unknown.

Reeves et al., "Rendering Antialiased Shadows with Depth Maps," SIGGRAPH '87, Computer Graphics, Jul. 1987, pp. 283-291, vol. 21, No. 4.

Regan et al., "Priority Rendering with a Virtual Reality Address Recalculation Pipeline," Computer Graphics Proceedings, Annual Conference Series, 1994.

Rhoades et al., "Real-Time Procedural Textures," ACM, Jun. 1992, pp. 95-100, 225.

Rockwood et al., "Blending Surfaces in Solid Modeling," Geometric Modeling: Algorithms and New Trends, 1987, pp. 367-383, Society for Industrial and Applied Mathematics, Philadelphia, Pennsylvania.

Röttger et al., "Real-Time Generation of Continuous Levels of Detail for Height Fields," WSCG '98, 1998.

Saha et al., "Web-based Distributed VLSI Design," IEEE, 1997, pp. 449-454.

Salzman et al., "VR's Frames of Reference: A Visualization Technique for Mastering Abstract Multidimensional Information," CHI 99 Papers, May 1999, pp. 489-495.

Sandejas, Silicon Microfabrication of Grating Light Valves, Doctor of Philosophy Dissertation, Stanford University, Jul. 1995.

Scarlatos, "A Refined Triangulation Hierarchy for Multiple Levels of Terrain Detail," presented at the Image V Conference, Phoenix, Arizona, Jun. 19-22, 1990, pp. 114-122.

Schilling, "A New Simple and Efficient Antialiasing with Subpixel Masks," SIGGRAPH '91, Computer Graphics, Jul. 1991, pp. 133-141, vol. 25, No. 4.

Schumacker, "A New Visual System Architecture," Proceedings of the Second Interservices/Industry Training Equipment Conference, Nov. 18-20, 1990, Salt Lake City, Utah.

Segal et al., "Fast Shadows and Lighting Effects Using Texture Mapping," SIGGRAPH '92, Computer Graphics, Jul. 1992, pp. 249-252, vol. 26, No. 2.

Sick AG, S3000 Safety Laser Scanner Operating Instructions, Aug. 25, 2005.

Silicon Light Machines, "White Paper: Calculating Response Characteristics for the 'Janis' GLV Module, Revision 2.0," Oct. 1999.

* cited by examiner

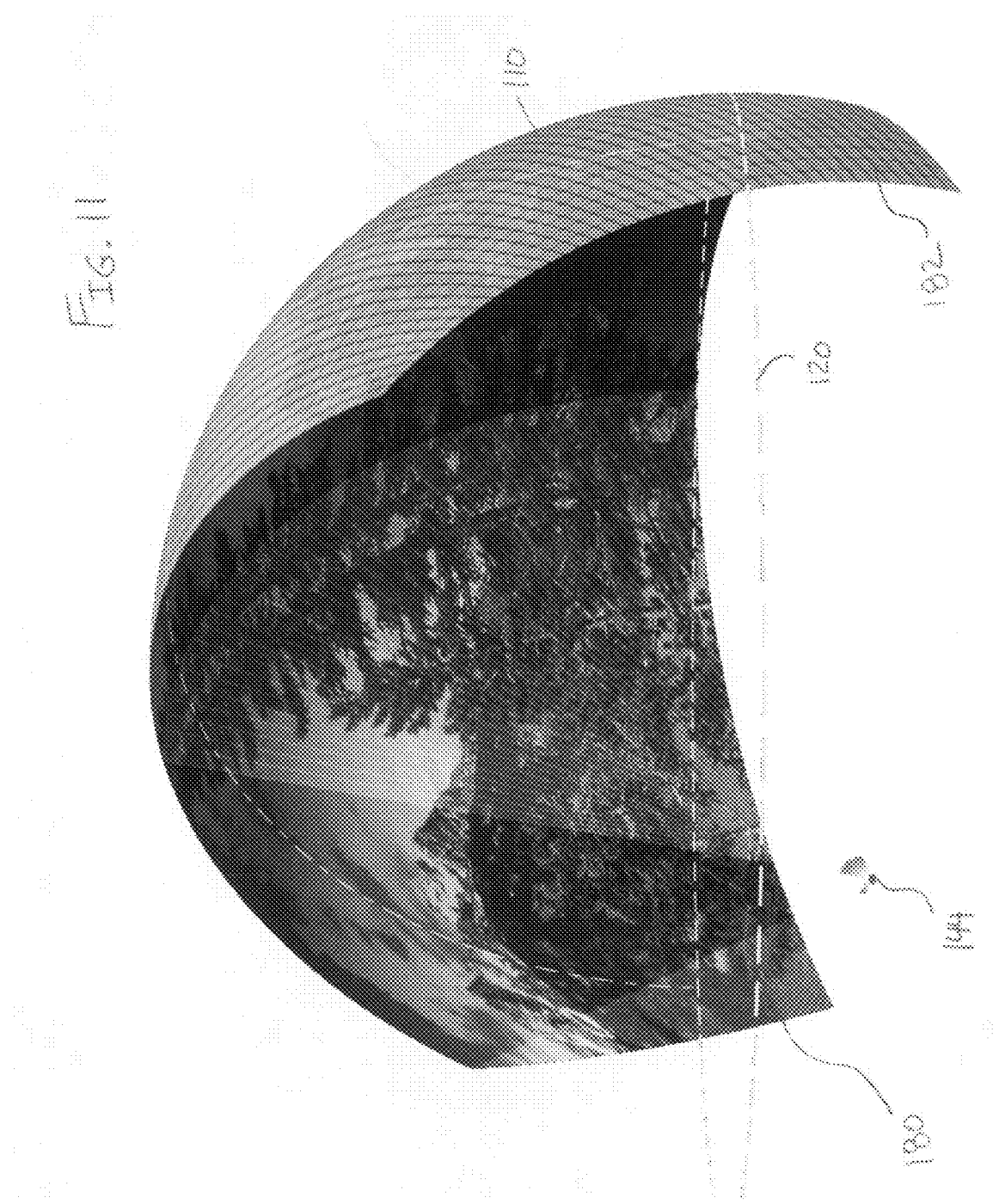

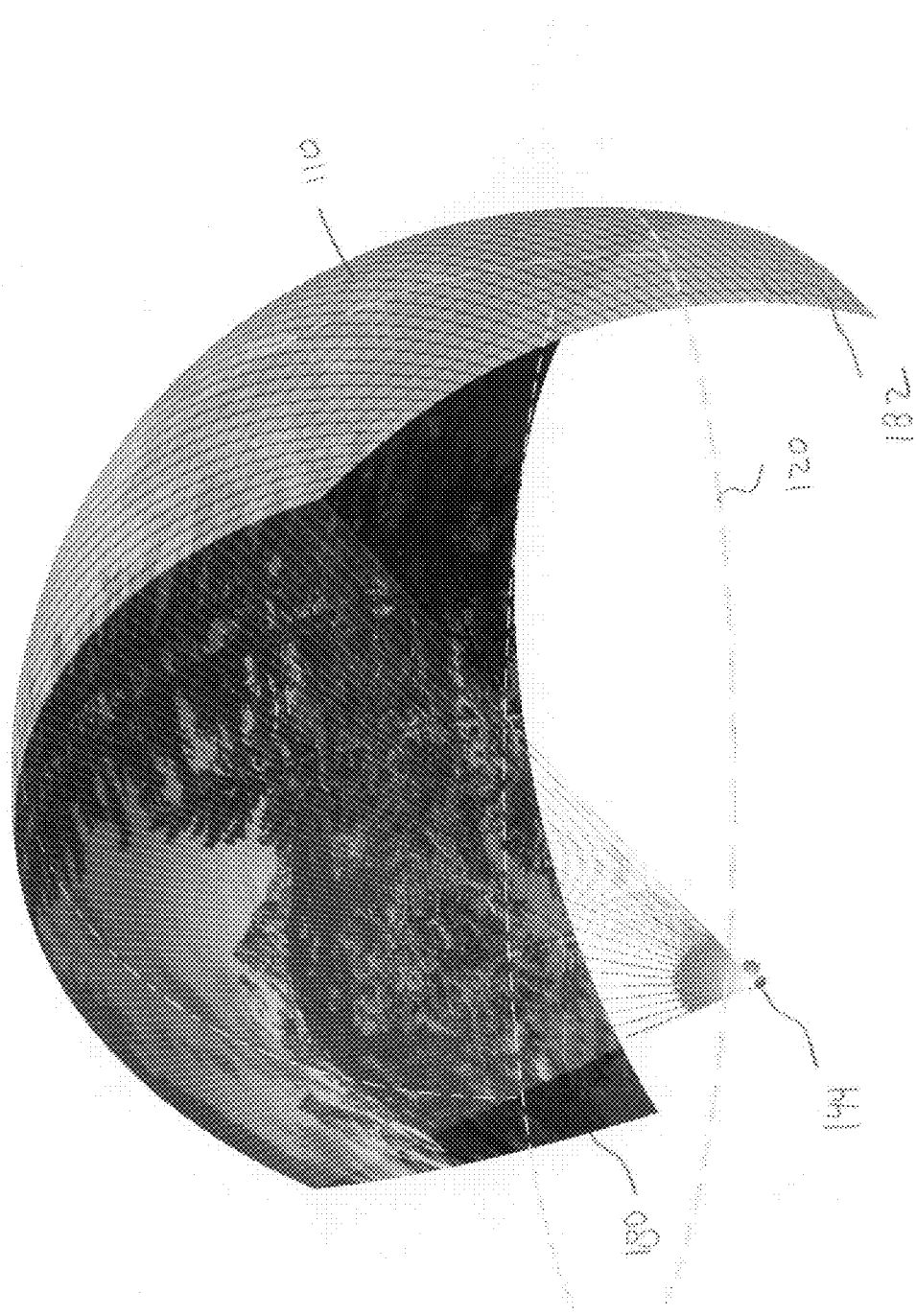

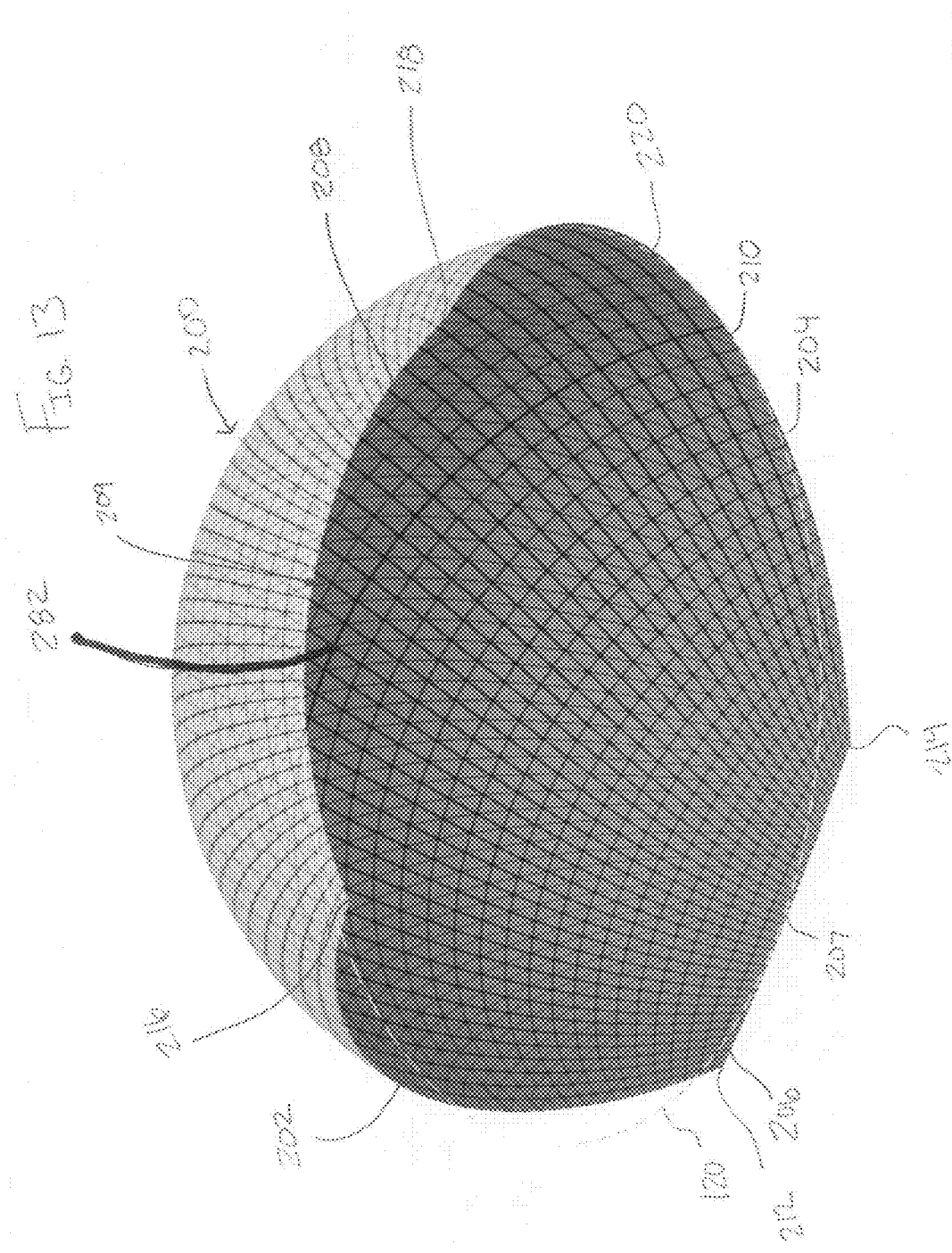

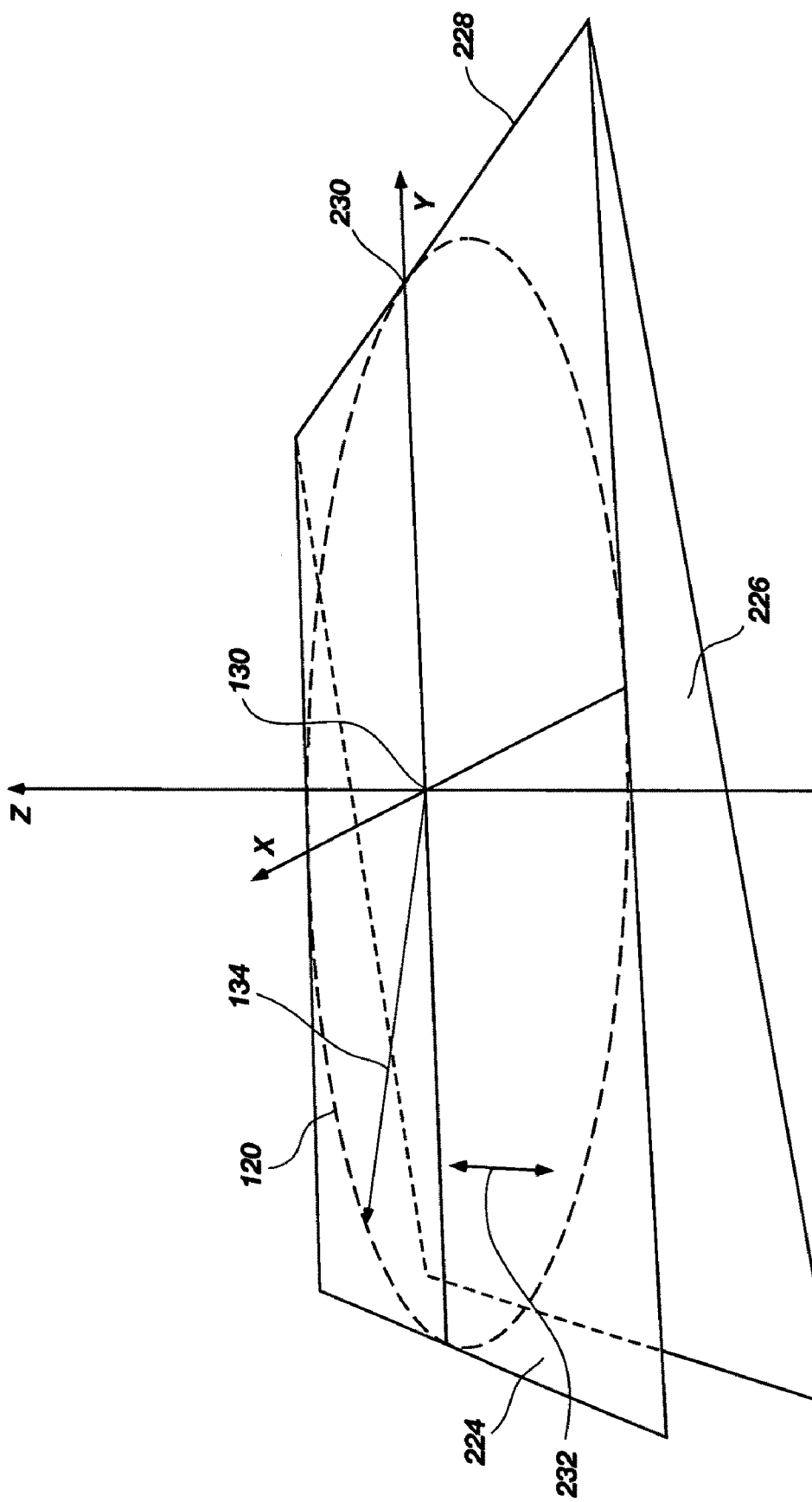

SYSTEM AND METHOD FOR DISPLAYING A PLANAR IMAGE ON A CURVED SURFACE

CROSS-REFERENCE TO RELATED APPLICATIONS

This application claims the benefit of U.S. Provisional Application No. 61/055,897, filed May 23, 2008, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates to image display systems, and more particularly, but not necessarily entirely, to image display systems that form images on non-planar surfaces.

2. Description of Background Art

With recent advances in technology, curved projection screens, such as those in planetariums and other "domed theaters," have seen a resurgence in popularity among viewers. Large curved projection screens are typically formed on the inner surface of a spherical or hemispherical dome, such as those found in planetariums. In some instances, curved projection screens may be many times larger than a conventional theater screen and may provide a sensation to the audience members that they are experiencing the images in real life.

One drawback to the use of curved projection screens is the inability to show images created for conventional "flat" movie screens without objectionable distortions. In particular, displaying a rectangular image on a curved surface, e.g., a curved projection screen, causes the image to be distorted as the center of the image appears to bulge outward towards the audience, while the outer edges of the image appear to bend away. In this case, the center of the image appears disproportionately large, while the outer edges appear disproportionately small and compacted. Thus, in the past, planetariums have generally been unable to show images intended for viewing on a conventional movie screen. Instead, planetariums have been limited to shows particularly created for viewing on curved projection screens.

Some solutions have been employed to show rectangular images on a curved projection screen. One previously available solution for displaying a rectangular image on a curved surface is to use a specially adapted projector with a fisheye lens. For example, IMAX Corporation has developed a motion-picture format that involves filming through a fisheye lens and projecting through the same type of fisheye lens onto a curved screen or projecting a rectangular image through a fisheye lens onto a curved screen. One drawback, however, to this type of solution is the need for specialized equipment for both capturing the image and projecting the image.

In addition, currently available video compositing software can distort rectangular pre-rendered digital images to conform to a curved projection screen. However, the "distorted" images must remain relatively small in comparison to the overall size of a curved projection screen. If for example, the "distorted" image is projected on more than one quarter of a dome, the distortion becomes extremely objectionable. Moreover, the existing video compositing software does not adequately compensate for the complexity of a three-dimensional shape and the curvature of a dome surface.

The features and advantages of the present disclosure will be set forth in the description that follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 11 depicts an angular distribution of an image textured onto the virtual surface shown in FIG. 2 in the vertical direction;

FIG. 12 depicts an angular distribution of an image textured onto the virtual surface shown in FIG. 2 in the horizontal direction;

FIG. 13 is a perspective view of another exemplary embodiment of a virtual surface;

FIG. 14 is a diagram of an XYZ coordinate axis system and a bottom plane for defining a bottom edge of the virtual surface shown in FIG. 13;

DETAILED DESCRIPTION

Figure 1:
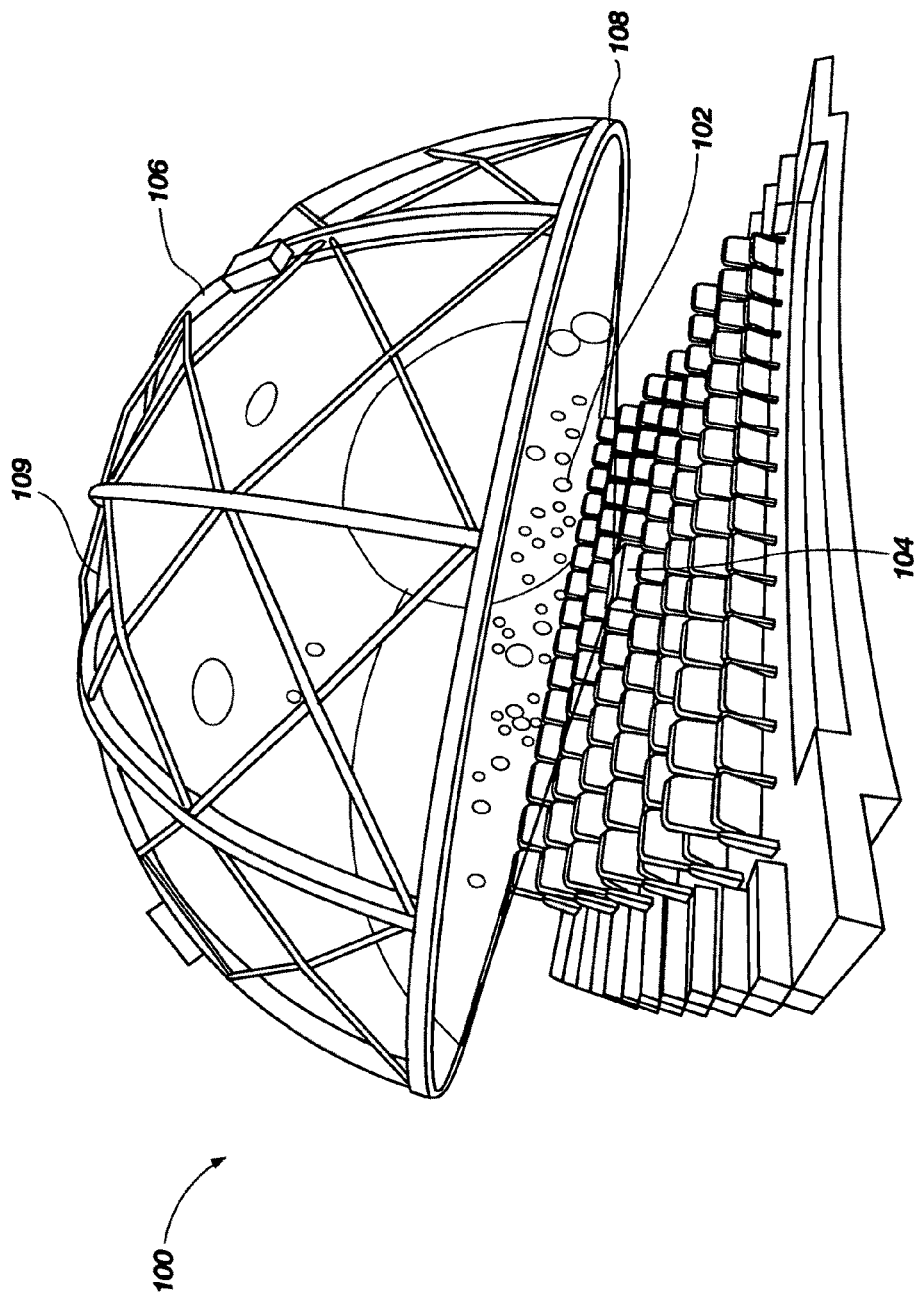
FIG. 1 is a perspective view of a domed theater.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "having," "containing," "characterized by," and grammatical equivalents thereof are inclusive or open-ended terms that do not exclude additional, unrecited elements or method steps.

Reference throughout this specification to "one embodiment," "an embodiment" or "illustrative embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

It will be appreciated that many of the functional units described in this specification have been labeled as a "module" in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer hardware, such as a processor able to execute computer-readable instructions stored in a memory coupled to the processor. Instructions executable by the processor may, for instance, comprise one or more physical or logical blocks of computer instructions or executable code that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, executable code may be a single instruction, or many instructions, and may even be distributed over several different code segments, among different programs, and across several computer memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Referring now to FIG. 1, there is depicted a domed theater 100 having a curved viewing surface 102 and a projector 104. The curved viewing surface 102 may have a concave shape whose distinguishing characteristic is that the concavity faces downward and toward the viewing audience. The projector 104 is able to project an image onto the curved viewing surface 102. As shown in FIG. 1, the projector 104 may be located at approximately the center of the theater 100. However, it will be noted that in other embodiments, the projector 104 may be located anywhere within the theater 100. In still other illustrative applications of the present embodiments, the projector 104 may comprise of multiple projectors in different locations within the theater 100. In other illustrative applications of the present embodiments, the display system may be a self-luminant dome surface.

The curved viewing surface 102 is formed on the inner surface of a hemispherical dome 106 and resides above an audience. The hemispherical dome 106 may be oriented horizontally or tilted upwardly to 30 degrees or more. It will be noted that the dome 106 comprises a spring line 108 and a zenith 109 as is known to one having ordinary skill in the art. The size of the dome 106 may vary and need not be perfectly spherical.

In operation, the projector 104 is able to display images on the curved viewing surface 102. Prior to the present disclosure, the images displayed by the projector 104 were typically created with the intention that they be displayed on the curved viewing surface 102. Exemplary images include star shows and other computer generated images. As previously discussed, images, such as motion pictures, that were intended for display on planar movie screens have not typically been shown in domed theaters due to objectionable distortion caused by the curved viewing surface 102. For example, images with a 16×9 or a 3×4 aspect ratio would appear too distorted for pleasurable viewing if directly projected onto the curved viewing surface 102 by the projector 104. As will be explained in more detail below, the illustrative embodiments of the present disclosure are able to display images intended for display on a planar projection screen, or rectangular images, with minimized distortion by use of image processing.

Figure 2:
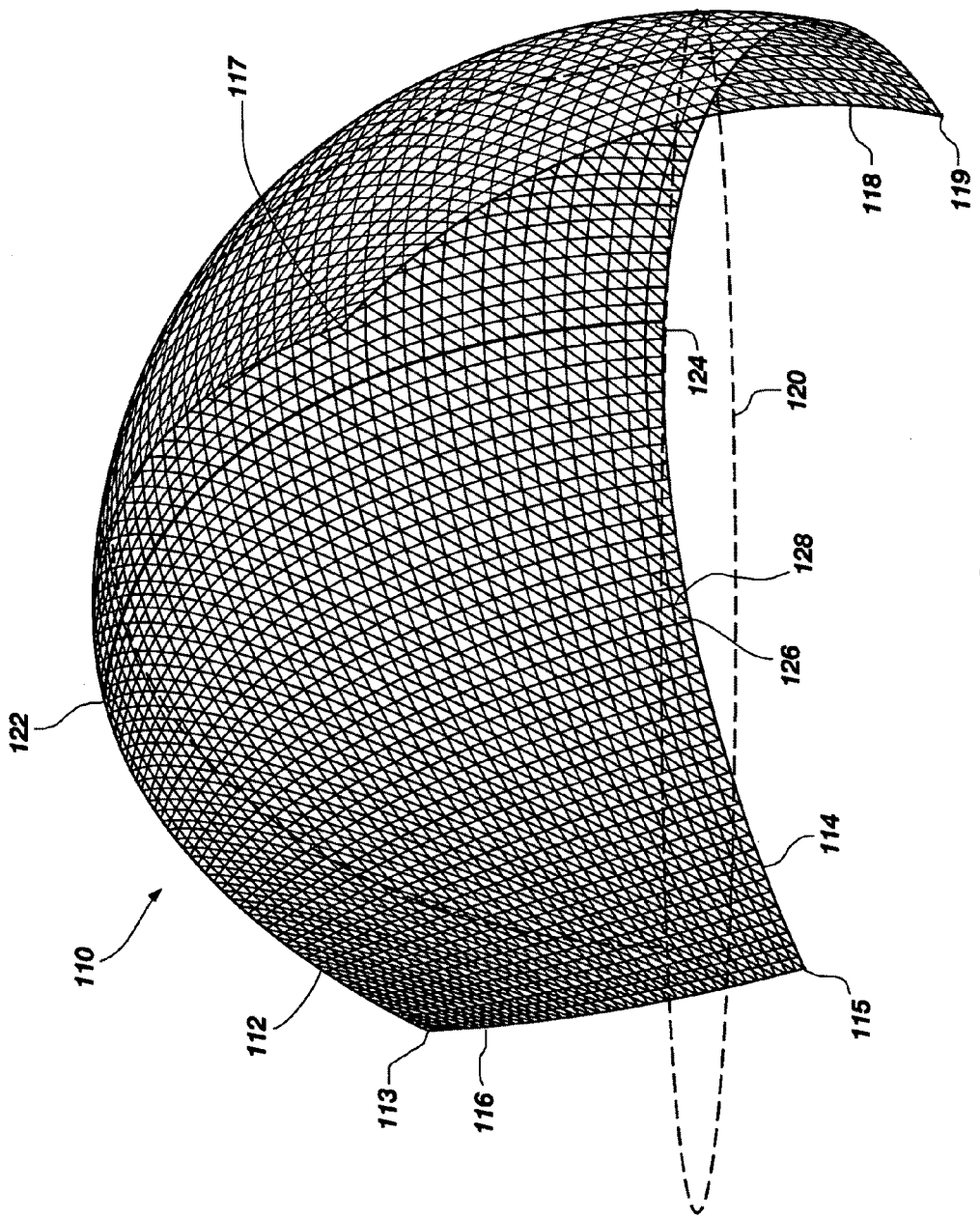
FIG. 2 is a perspective view of an exemplary embodiment of a virtual surface.

Referring now to FIG. 2, in one illustrative embodiment of the present invention, the first step for displaying a rectangular image on the curved viewing surface 102, as shown in FIG. 1, is to define, in a computer environment, a virtual surface 110 that is a representation or model of a portion of the curved viewing surface 102. The virtual surface 110 may comprise a polygonal mesh formed from a collection of vertices, edges and faces that define the shape of the virtual surface 110. The virtual surface 110 may be defined using a 3-D modeling computer.

Figure 23:
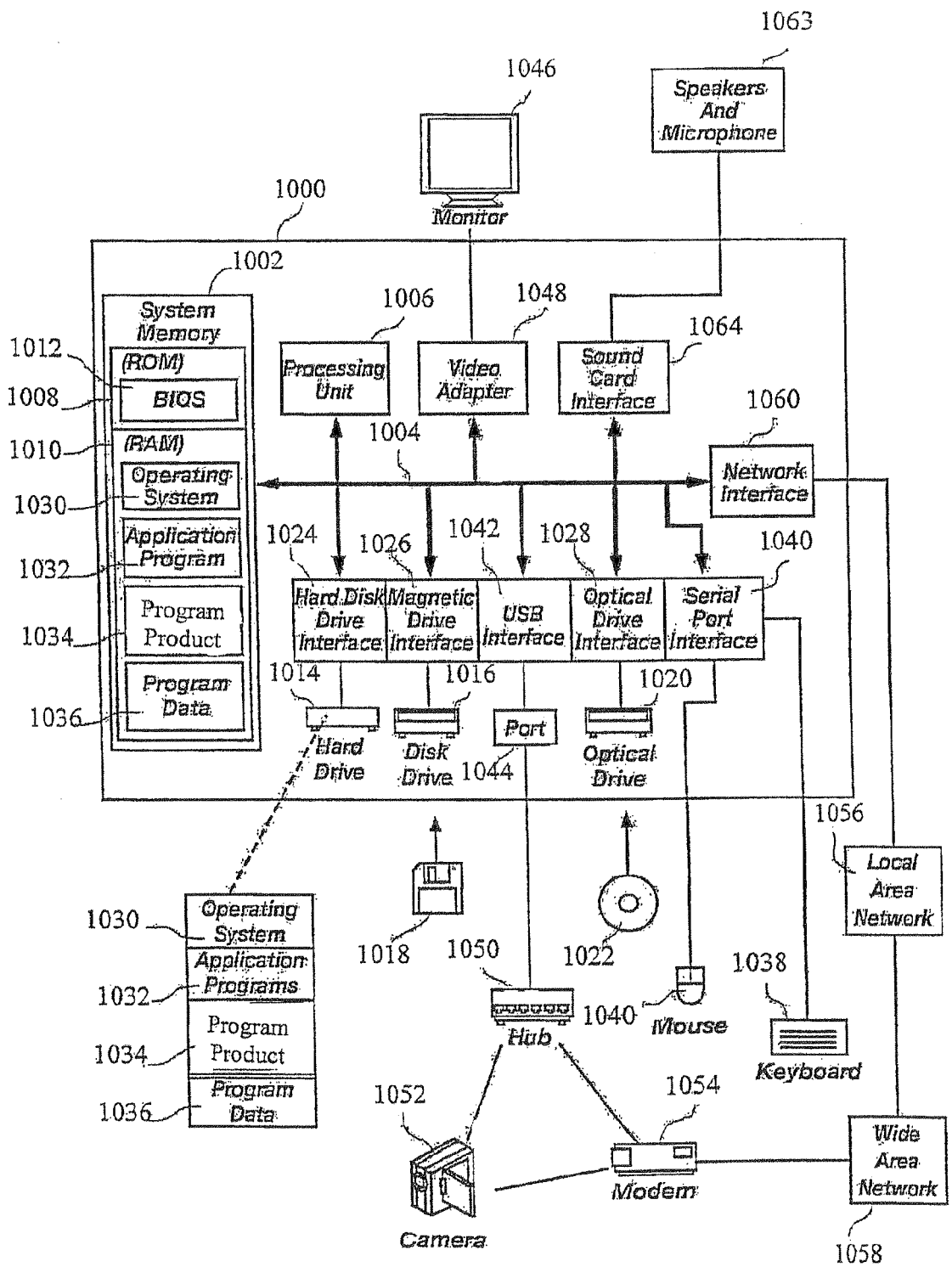
FIG. 23 depicts a suitable 3-D modeling computer for creating a virtual surface pursuant to an embodiment of the present invention.

Referring to FIG. 23, there is shown an architecture of a suitable 3-D modeling computer for creating the virtual surface 110 pursuant to an embodiment of the present disclosure. It will be appreciated that the 3-D modeling computer 1000 may have more or fewer features than shown in FIG. 23 as the individual circumstances require. Further, the 3-D modeling computer 1000 shown in FIG. 23 may have various forms, including a dedicated computer, a server, a desktop PC, a laptop or a portable tablet form, or a hand held form. The features shown in FIG. 23 may be integrated or separable from the 3-D modeling computer 1000. For example, while a monitor 1046 is shown in FIG. 23 as being separate, it may be integrated into the 3-D modeling computer 1000, such as the case of a laptop or tablet type computer.

The 3-D modeling computer 1000 may include a system memory 1002, and a system bus 1004 that interconnects various system components including the system memory 1002 to a processing unit 1006. The processing unit 1006 may comprise one processor or an array of processors. The processing unit 1006 may be able to engage in parallel processing. The system bus 1004 may be any of several types of bus structures including a memory bus or memory controller, a peripheral bus, and a local bus using any of a variety of bus architectures as is known to those skilled in the relevant art. The system memory may include read only memory (ROM) 1008 and random access memory (RAM) 1010. A basic input/output system (BIOS) 1012, containing the basic routines that help to transfer information between elements within the 3-D modeling computer 1000, such as during start-up, is stored in ROM 1008.

The 3-D modeling computer 1000 may further include a hard disk drive 1014 for reading and writing information to a hard disk (not shown), a magnetic disk drive 1016 for reading from or writing to a removable magnetic disk 1018, and an optical disk drive 1020 for reading from or writing to a removable optical disk 1022 such as a CD ROM, DVD, or other optical media. It will be appreciated that the hard disk drive 1014, magnetic disk drive 1016, and optical disk drive 1020 may be connected to the system bus 1004 by a hard disk drive interface 1024, a magnetic disk drive interface 1026, and an optical disk drive interface 1028, respectively. The drives and their associated computer-readable media provide nonvolatile storage of computer readable instructions, data structures, program modules and other data for the 3-D modeling computer 1000. Although the exemplary environment described herein employs a hard disk, a removable magnetic disk 1018, and a removable optical disk 1022, it will be appreciated by those skilled in the relevant art that other types of computer readable media which can store data that is accessible by a computer, such as magnetic cassettes, flash memory cards, digital video disks, Bernoulli cartridges, random access memories, read only memories, and the like may also be used in the exemplary operating environment. The hard disk drive 1014 may store databases and data sets. For example, the hard disk drive 1014 may store one or more of the live database 20, the warehouse database 24, and the analytics database 26 shown in FIG. 1.

A number of programs and program products may be stored on the hard disk 1014, magnetic disk 1018, optical disk 1022, ROM 1008 or RAM 1010, including an operating system 1030, one or more applications programs 1032, program product 1034, and program data 1036. It will be appreciated that the program product 1034 may comprise one or more set of computer-readable instructions for allowing the creation of 3-D models based upon user input. In particular, a user may enter commands and information into the 3-D modeling computer 1000 through input devices such as a keyboard 1038 and a pointing device 1040, such as a mouse, to thereby define a 3-D model, such as a virtual surface, and a texture mapping for the virtual surface. The input devices are often connected to the processing unit 1006 through a serial port interface 1040 that is coupled to the system bus 1004. Increasingly, such input devices are being connected by the next generation of interfaces, such as a universal serial bus (USB) interface 1042 with a USB port 1044, and to which other hubs and devices may be connected.

An output device 1046, such as a computer monitor or other type of display device, is also connected to the system bus 1004 via an interface, such as a video adapter 1048. The output device 1046 may display virtual surfaces and textured virtual surfaces. In addition to the output device 1046, the 3-D modeling computer 1000 may include other peripheral output or input devices. For example, an ultra slim XGA touch panel may be used. A resistive finger touch screen may also be used. A USB hub 1500 is shown connected to the USB port 1044. The hub 1050 may in turn be connected to other devices such as a digital camera 1052 and modem 1054. Although not shown, it is well understood by those having the relevant skill in the art that a keyboard, scanner, printer, external drives (e.g., hard, disk and optical) and a pointing device may be connected to the USB port 1044 or the hub 1050. Thus, it should be understood that additional cameras and devices may be directly connected to the computer through the USB port 1044. Thus, the system depicted is capable of communicating with a network and sending/receiving audio, video and data.

The 3-D modeling computer 1000 may operate in a networked environment using logical connections to one or more remote computers. The types of connections between networked devices include dial up modems, e.g., modem 1054 may be directly used to connect to another modem, ISDN, DSL, cable modems, wireless and include connections spanning users connected to the Internet. The logical connections depicted in FIG. 23 include a local area network (LAN) 1056 and a wide area network (WAN) 1058. Such networking environments are commonplace in offices, enterprise-wide computer networks, intranets and the Internet.

When used in a LAN networking environment, the 3-D modeling computer 1000 is connected to the local network 1056 through a network interface or adapter 1060. The 3-D modeling computer 1000 may also connect to the LAN via through any wireless communication standard, such as the 802.11 wireless standard. When used in a WAN networking environment, the 3-D modeling computer 1000 typically uses modem 1054 or other means for establishing communications over the wide area network 1058. It should be noted that modem 1054 may be internal or external and is connected to the system bus 1004 through USB port 1044. A modem may optionally be connected to system bus 1004 through the serial port interface 1040. It will be appreciated that the network connections shown are exemplary and other means of establishing a communications link between the computers may be used, e.g., from a LAN gateway to WAN.

The 3-D modeling computer 1000 may also receive audio input from a microphone and output audio sounds through speakers as illustratively shown by the box marked with the reference numeral 1062 in FIG. 23. A sound card interface 1064 processes the sounds to a sound card and the system bus 1064. Further, the 3-D modeling computer 1000 may take many forms as is known to those having relevant skill in the art, including a desk top personal computer, a lap top computer, a hand held computer, and the like. Further, the computer compatibility of the 3-D modeling computer 1000 may include, without limitation, IBM PC/XT/AT, or compatibles, or Apple Macintosh.

Generally, the processing unit 1006 of the 3-D modeling computer 1000 are programmed by means of instructions stored at different times in the various computer-readable storage media of the computer. Programs, operating systems and program products are typically distributed, on computer-readable mediums, for example, on floppy disks or CD-ROMs. From there, they are installed or loaded into the secondary memory of a computer. At execution, they are loaded at least partially into the system memory 1002. The disclosure described herein includes these and other various types of computer-readable storage media when such media contain instructions or programs for implementing the steps described herein in conjunction with a microprocessor or other data processor.

Once a virtual surface and a related texture mapping have been created, the virtual surface and texture mapping may be stored on a computer-readable medium or memory associated the 3-D modeling computer 1000, such as the hard disk 1014, magnetic disk 1018, and optical disk 1022. The virtual surface and a related texture mapping may also be transmitted to another device over a network. The 3-D modeling computer 1000 may be further operable to texture the virtual surface with an image.

Referring back to FIG. 2, once defined, the virtual surface 110, a three dimensional image, may be textured with the desired two dimensional image using any suitable texture mapping technique, such as UV mapping. As will be appreciated by those having skill in the art, UV mapping is a process whereby a two-dimensional image texture is "wrapped" or "mapped" onto a three-dimensional object. In UV mapping, the "U" coordinate is typically a horizontal texture mapping coordinate while the "V" coordinate is typically a vertical texture mapping coordinate. The UV mapping controls which points (pixels) on the texture correspond to which points (vertices) on the virtual surface 110, i.e., the polygonal mesh, so that the steps taken to apply the texture can discern where on the virtual surface 110 to "pin" the texture. In the case of the present disclosure, the texture is the image desired to be shown, e.g., a frame of a movie. Thus, it will be appreciated that the UV mapping defines how a planar image is applied onto the virtual surface 110.

It will be appreciated that the virtual surface 110 need not correspond exactly in size or shape with the curved viewing surface 102 and may only be proportionately related to the curved viewing surface 102. The virtual surface 110 may lie within or extend beyond the curved viewing surface 102. A circle 120 is a representation of the spring line 108 of the dome 106 while semicircle 122 is a horizontal centerline of the dome 106 that passes through the zenith 109 of the dome 106.

The virtual surface 110 is defined to include a top edge 112, a bottom edge 114, a left edge 116, a right edge 118 and a centerline 124. In addition, the virtual surface 110 may comprise a top left corner 113, a bottom left corner 115, a top right corner 117, and a bottom right corner 119.

The virtual surface 110 may be formed from a plurality of polygons 126 that form a mesh-like structure. Thus, while the virtual surface 110 may conform generally to the spherical shape of the dome 106, the virtual surface 110 itself is formed from a plurality of planar elements, i.e., polygons one of which is indicated at 126. Each of the polygons 126 are formed from a plurality of vertices 128 on the virtual surface 110. Further, the polygons 126 are triangular in shape, with a vertex 128 at each of their corners. It will be appreciated, however, that the polygons 126 may have any polygonal shape and any number of vertices 128. They may also be constructed of non-polygonal elements such as nurbs or splines. A desirable novel feature of the present disclosure is the manner in which the polygons 126 are distributed across the virtual surface 110. As will be explained in more detail below, the polygons 126, and any image mapped to the polygons 126, are distributed pursuant to an angular distribution onto the virtual surface 110.

Figure 3:
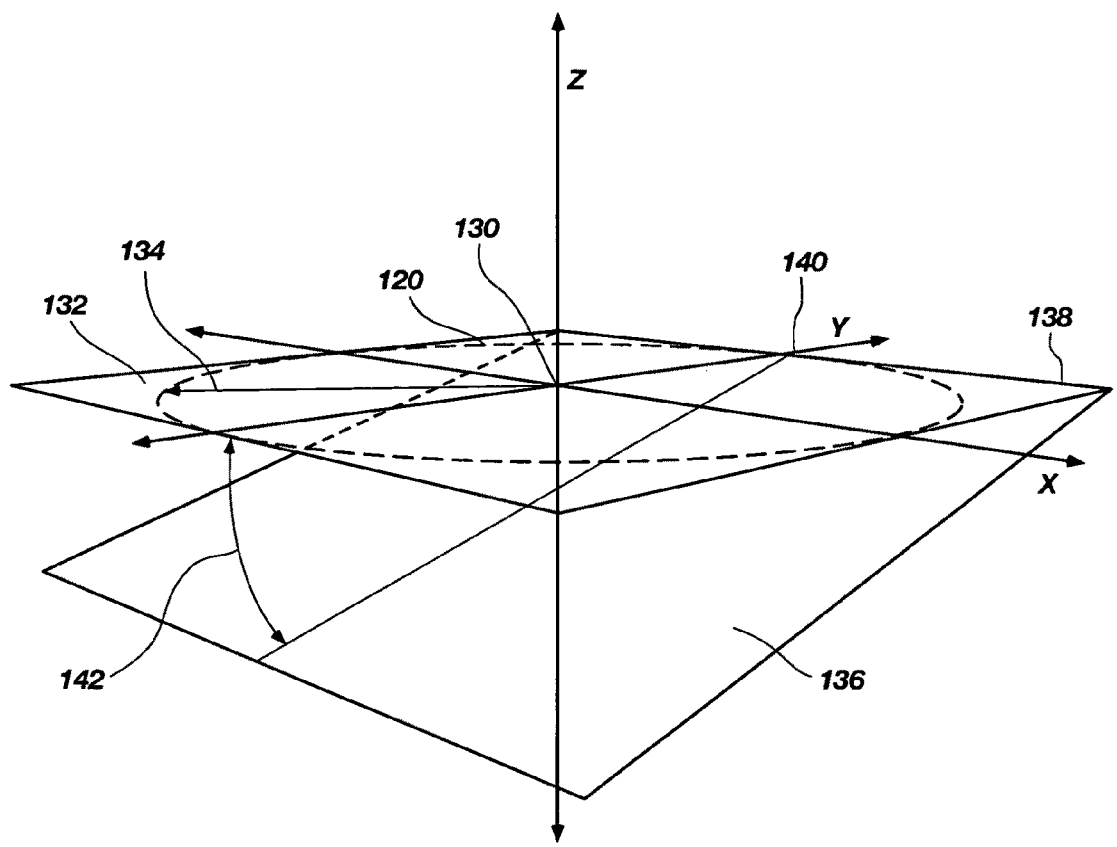
FIG. 3 is a diagram of an XYZ coordinate axis system and a bottom plane for defining a bottom edge of the virtual surface shown in FIG. 2.

Referring now to FIGS. 3-12, where like reference numerals indicate like components, the manner in which the parameters of the virtual surface 110 are defined according to one embodiment of the present invention will now be explained. In regard to defining the bottom edge 114 of the virtual surface 110, as shown in FIG. 3, an origin of an XYZ coordinate axis is located at a center 130 of the circle 120, with the circle 120 lying on a plane 132 corresponding to the XY plane. The circle 120 may be arbitrarily defined to have a radius 134 of 1000 units from the center 130.

A bottom plane 136 is rotated downwards from the plane 132 along a line 138 that is a tangent to a point 140 that lies at the intersection of the circle 120 and the Y-axis. It will be appreciated that the point 140 corresponds to the front center of the dome 106 (see FIG. 1) and the front center of the virtual surface 110 (see FIG. 2). The intersection of the plane 132 and the bottom plane 136 forms an angle 142. In one illustrative embodiment, the angle 142 is in the range from about 0 degrees to about 30 degrees. In another illustrative embodiment, the angle 142 is about 15 degrees. As will be shown hereinafter, the bottom edge 114 of the virtual surface 110 will lie on the intersection of the bottom plane 136 and a sphere centered at the center 130, where the sphere has a radius equal to the radius 134 of the circle 120, i.e., 1000 units.

Figure 4:
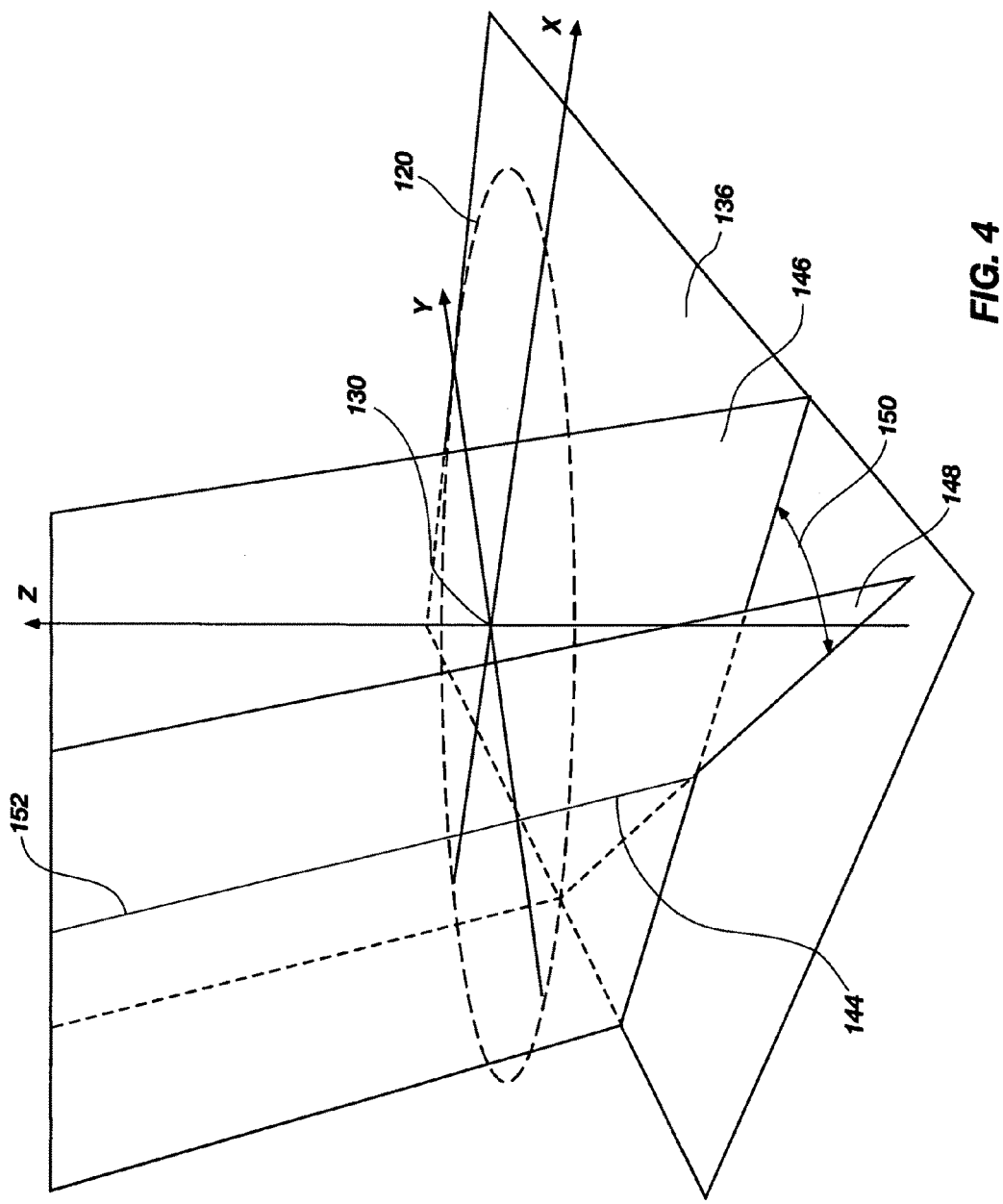
FIG. 4 is a diagram of the XYZ coordinate axis system and a left plane for defining a left edge of the virtual surface shown in FIG. 2.

Referring now to FIG. 4, the manner in which the left edge 116 of the virtual surface 110 is defined will now be explained. An arbitrary audience viewpoint is first defined as a fixed virtual point 144. The fixed virtual point 144 may define the most optimal viewing location in the theater 100, and can be chosen uniquely for each individual theater. The fixed virtual point 144 may be located anywhere within the theater 100. In one illustrative embodiment, the fixed virtual point 144 is defined at the XYZ coordinates (0,−500,−222). A first reference plane 146 is defined to pass through the fixed virtual point 144 and to intersect the bottom plane 136 perpendicularly. In addition, the first reference plane 146 is defined to be parallel to the X-axis. A left plane 148 that defines the left edge 116 of the virtual surface 110 is defined to pass through the fixed virtual point 144 and to also intersect the bottom plane 136 perpendicularly. An angle 150 is formed along an intersection 152 of the left plane 148 and the first reference plane 146.

In one illustrative embodiment represented in FIG. 4, the angle 150 is in the range from about 5 degrees to about 40 degrees. In another illustrative embodiment, the angle 150 is about 22 degrees. As will be shown hereinafter, the left edge 116 of the virtual surface 110 will lie on an intersection of the left plane 148 and a sphere centered at the center 130, where the sphere has a radius equal to the radius 134, i.e., 1000 units.

Figure 5:
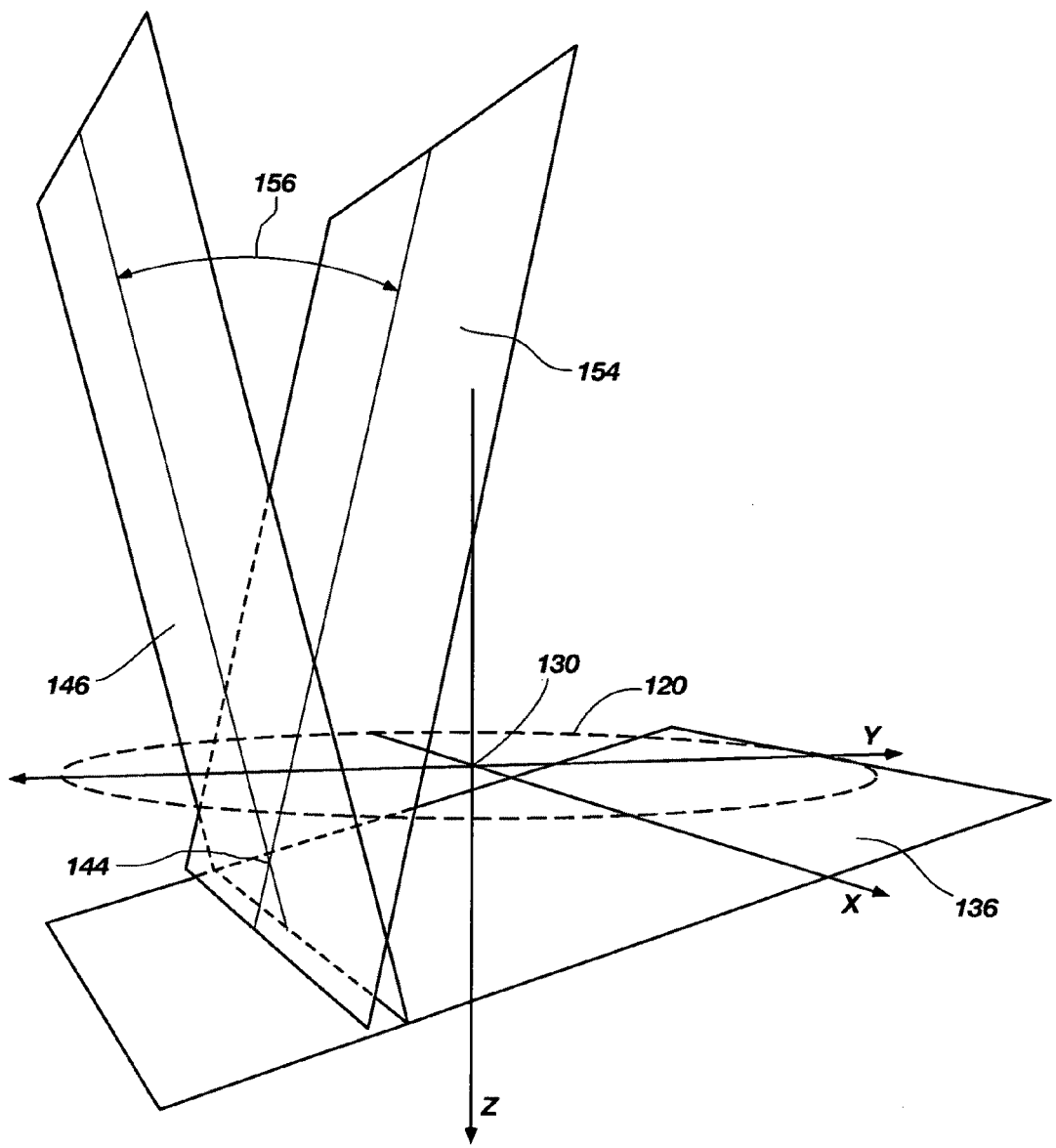
FIG. 5 is a diagram of the XYZ coordinate axis system and a top plane for defining a top edge of the virtual surface shown in FIG. 2.

Referring now to FIG. 5, the manner in which the top edge 112 of the virtual surface 110 is defined will now be explained. A top plane 154 is defined to pass through the fixed virtual point 144 and is rotated at an angle 156 in the YZ plane with respect to the first reference plane 146. In one illustrative embodiment, the angle 156 is in the range from about 5 degrees to about 45 degrees. In another illustrative embodiment, the angle 156 is about 27 degrees. As will be shown hereinafter, the top edge 112 of the virtual surface 110 (see FIG. 2) will lie on the intersection of the top plane 154 and a sphere centered at the center 130, where the sphere has a radius equal to the radius 134 of the circle 120, i.e., 1000 units.

Figure 6:
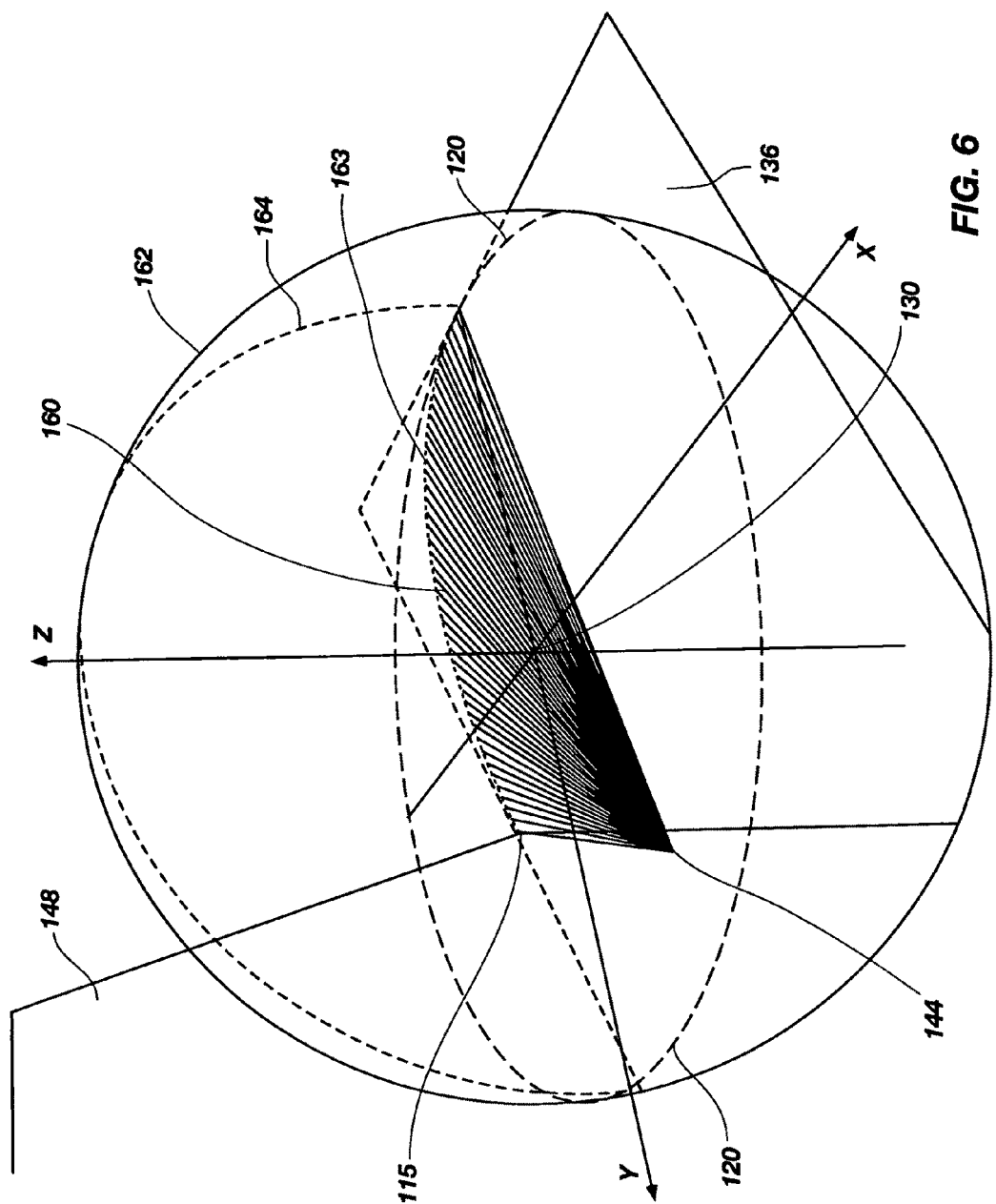
FIG. 6 is a diagram of the XYZ coordinate axis system and of a distribution of vertices on a left side of the bottom edge of the virtual surface shown in FIG. 2.

Referring now to FIG. 6, a left side 160 of the bottom edge 114 of the virtual surface 110 is formed at the intersection of a sphere 162 centered at the center 130 of the XYZ axis and the bottom plane 136. As previously mentioned, the sphere 162 has a radius equal to the radius 134 of the circle 120, i.e., 1000 units. The bottom left corner 115 of the virtual surface 110 is formed at the intersections of the left plane 148, the bottom plane 136 and the sphere 162. A first group of vertices 163 is angularly distributed along the left side 160 of the bottom edge 114 of the virtual surface 110 from the fixed virtual point 144. In one illustrative embodiment, the first group of vertices 163 comprises forty-one (41) vertices. The vertices in the first group of vertices 163 are evenly spaced along the left side 160 of the bottom edge 114 by angle from the fixed virtual point 144. Thus, it will be noted that the vertices in the first group of vertices 163 are not evenly spaced from each other by distance. A centerline 164 is formed at the intersection of the YZ plane and the sphere 162. The centerline 164 will correspond to the centerline 124 of the virtual surface 110 shown in FIG. 2.

Figure 7:
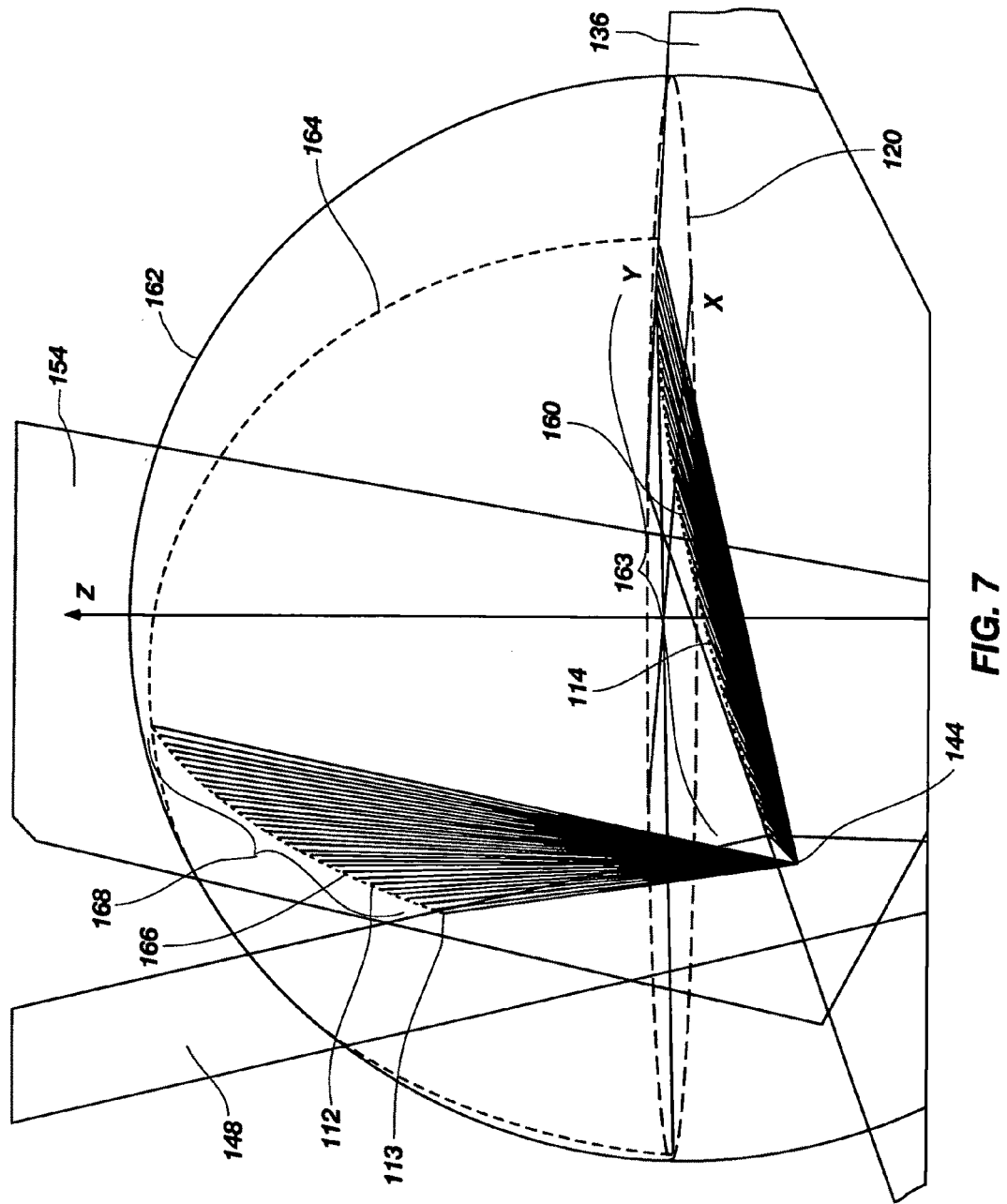
FIG. 7 is a diagram of the XYZ coordinate axis system and of a distribution of vertices on a left side of the top edge of the virtual surface shown in FIG. 2.

Referring now to FIG. 7, a left side 166 of the top edge 112 of the virtual surface 110 is formed at the intersection of the sphere 162 and the top plane 154. The top left corner 113 of the virtual surface 110 is formed at the intersections of the left plane 148, the top plane 154 and the sphere 162. The left side 166 of the top edge 112 ends at the intersection of the top plane 154, the YZ plane, and the sphere 162. Similar to the left side 160 of the bottom edge 114, a second group of vertices 168 is angularly distributed along the left side 166 of the top edge 112 of the virtual surface 110. In one embodiment, the second group of vertices 168 comprises forty-one (41) vertices. The vertices in the second group of vertices 168 are evenly spaced along the left side 166 of the top edge 112 by angle from the fixed virtual point 144. Thus, it will be noted that the vertices in the second group of vertices 168 are not evenly spaced from each other by distance. It will be noted that the top edge 112 and the bottom edge 114 are non-parallel on sphere 162.

The number of vertices in the first group of vertices 163 (FIG. 6) and the second group of vertices 168 (FIG. 7) should illustratively be equal such that each vertex in the first group of vertices 163 may be paired with a corresponding vertex in the second group of vertices 168. In particular, the vertices in the first group 163 and the second group 168 that lie in the YZ plane are first paired together. The next vertices in the first group 163 and the second group 168 to the left of the YZ plane are then paired together and so on until each of the vertices in the first group 163 has been paired with a corresponding vertex in the second group 168. Thus, the last of the vertices in the first group 163 and the second group 168 that will be paired together are those vertices that define the top left corner 113 and the bottom left corner 115 of the virtual surface 110.

Figure 8:
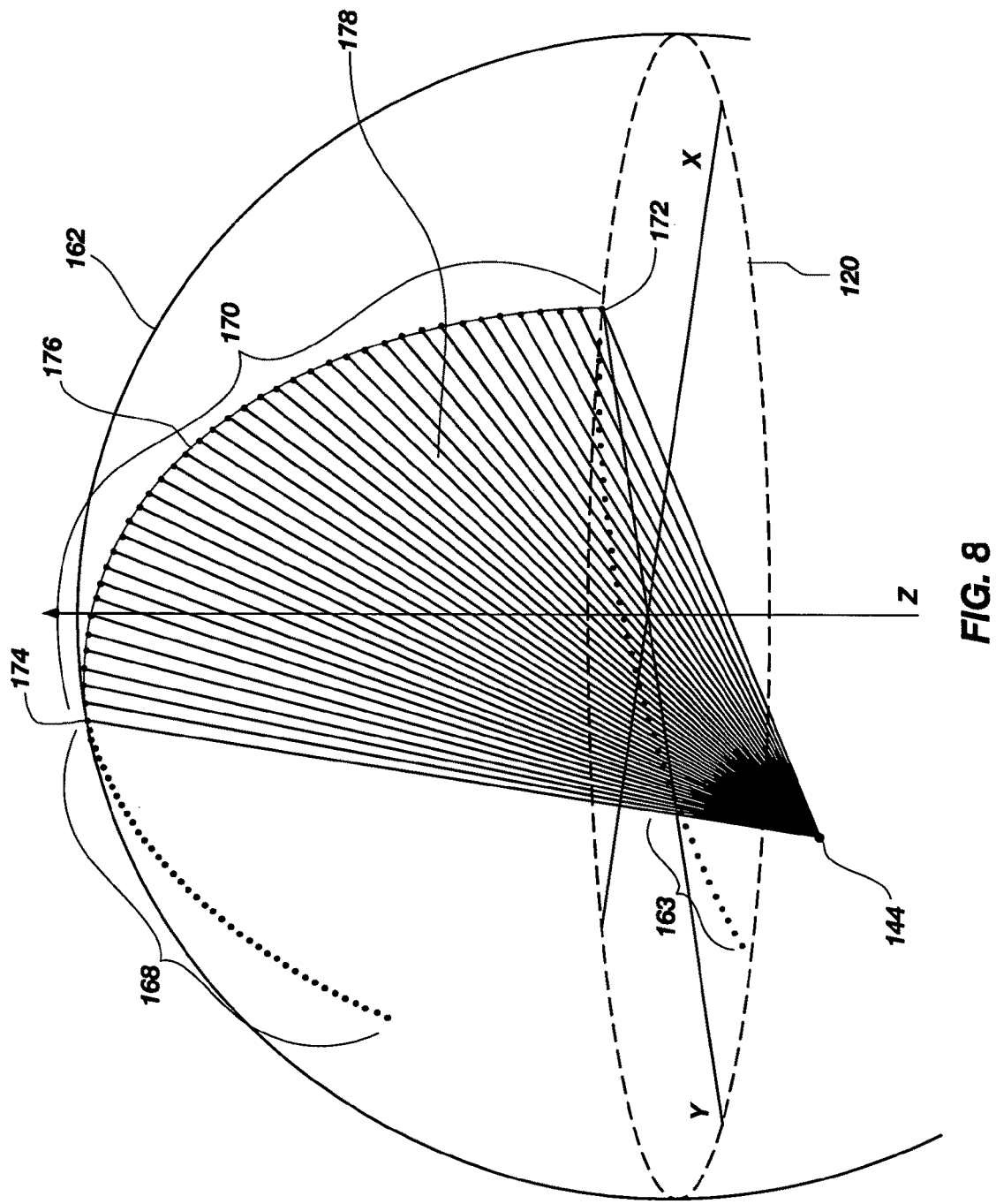
FIG. 8 is a diagram of the XYZ coordinate axis system and the formation of a vertical column of vertices between the top edge and the bottom edge of the virtual surface shown in FIG. 2.
Figure 9:
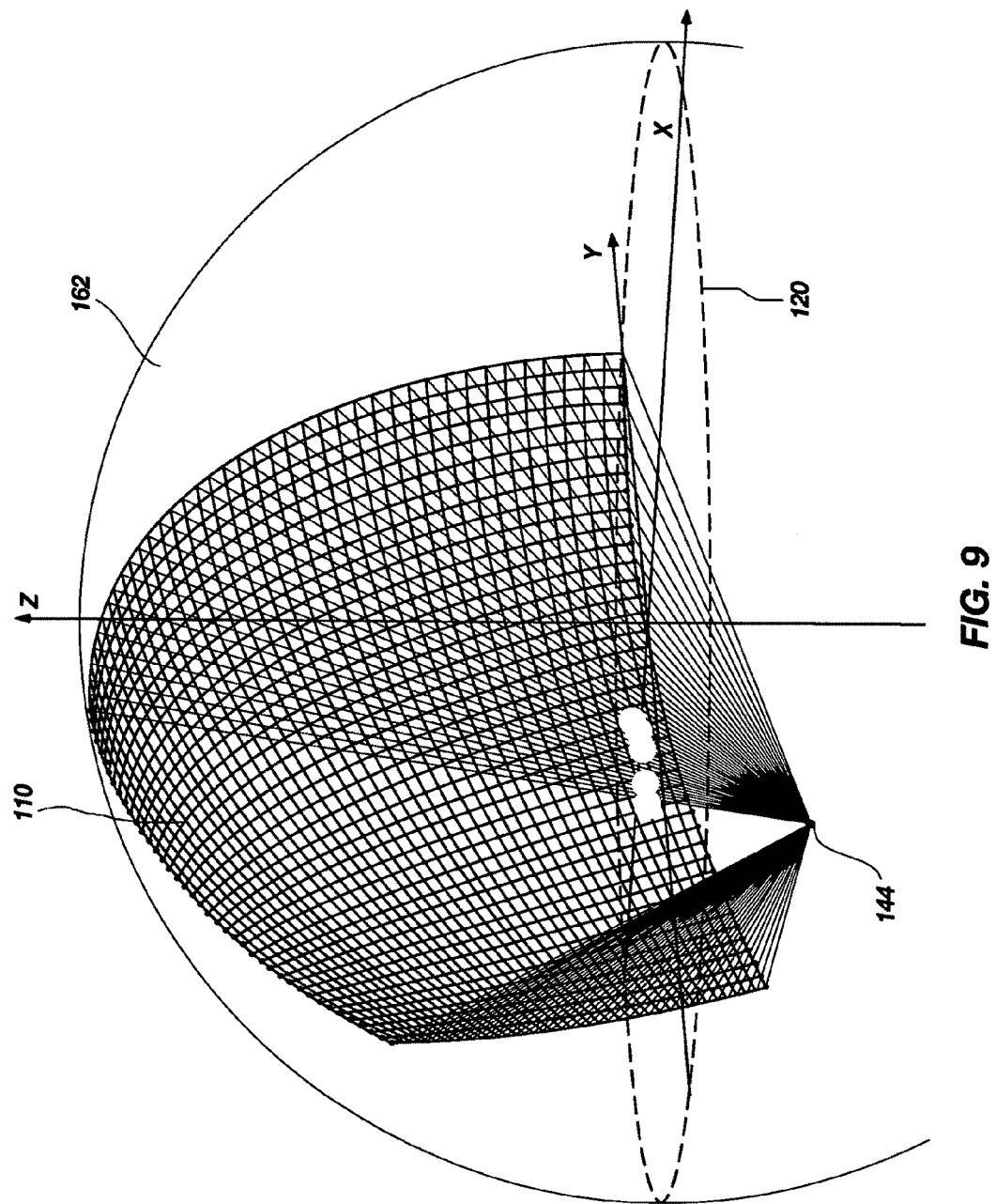
FIG. 9 is a diagram of the XYZ coordinate axis system and the formation of a left side of the virtual surface shown in FIG. 2.

Referring now to FIG. 8, between each of the pairs of vertices formed between the first group 163 and the second group 168 of vertices, a third group of vertices 170 is angularly distributed in a manner that will now be described. As previously alluded, a vertex 172 in the first group of vertices 163 and a vertex 174 in the second group of vertices 168 both lie in the YZ plane and have conceptually been paired together. The third group of vertices 170 is angularly distributed between the vertices 172 and 174 along an intersection 176 of a second reference plane 178 with the sphere 162, where the second reference plane 178 contains vertices 172 and 174 and the fixed virtual point 144, from the fixed virtual point 144. In one illustrative embodiment, the third group of vertices 170 comprises thirty-nine (39) vertices. This same process is repeated for each of the pairs of vertices previously defined such that the entire left side of the virtual surface 110 is defined as is shown in FIG. 9.

Figure 10:
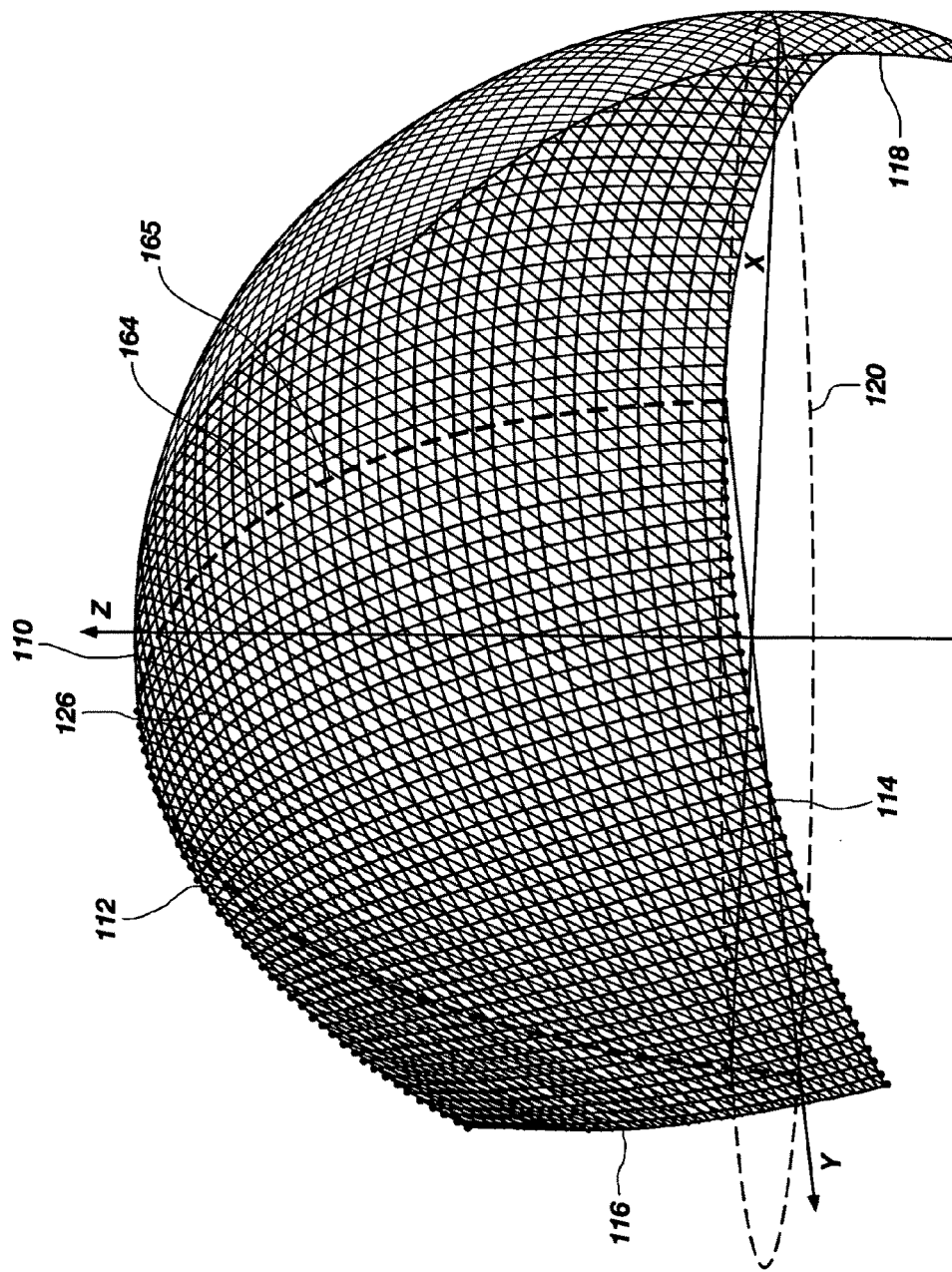
FIG. 10 is a diagram of the XYZ coordinate axis system and the formation of the entire virtual surface shown in FIG. 2.

Once the left side of the virtual surface 110 has been completed, the right side of the virtual surface 110 can easily be defined as a mirror of the left side of the virtual surface 110 across the YZ plane as can be seen in FIG. 10. The vertices distributed across the virtual surface 110, which comprises the vertices in the first group 163, the second group 168, and the third group 170 of vertices, are used to form the polygons 126 on the virtual surface 110. It will be noted that extending between the top edge 112 and the bottom edge 114 are a plurality of vertical columns of vertices. Each of the vertices in a given column is angularly spaced from adjacent vertices in the same column. It will be further noted that extending between the left edge 116 and the right edge 118 of the virtual surface 110 are a plurality of horizontal rows of vertices. Each of the vertices in a given row is angularly spaced from adjacent vertices in the same row.

The effect of the angular distribution of the vertices as described above, results in polygons 126 (FIG. 10) near a center 165 of the virtual surface 110 being proportionately larger than polygons 126 located near the left edge 116 and the right edge 118. Further, the angular distribution of the vertices in the vertical columns of vertices ensures that horizontal lines in the image appear horizontal on the curved viewing surface 102, while the angular distribution of the vertices in the rows of vertices ensures that vertical lines in the image appear vertical on the curved viewing surface 102.

Once the polygons 126 have been defined over the entire virtual surface 110, the desired image may be mapped to the virtual surface 110 as shown in FIGS. 11 and 12, using any suitable mapping technique that is known to one having ordinary skill in the art, to thereby form a textured virtual image. In one illustrative embodiment, the resulting virtual surface 110 is divided into 80 segments horizontally, and 40 segments vertically. The texture U coordinates are incremented by 0.0125 at each column of vertices, from 0.0000 at the left edge 116 to 1.0000 at the right edge 118, and texture V coordinates are incremented by 0.0250 at each row of vertices, from 0.0000 at the bottom edge to 1.0000 at the top edge 112. Other illustrative embodiments may vary texture values to produce desired zoom or distortion on the virtual image.

As can be observed from FIGS. 11 and 12, due to the fact that the underlying vertices, and hence the polygons 126, are angularly distributed across the virtual surface 110 from the perspective of the fixed virtual point 144, the image mapped onto the virtual surface 110 is correspondingly angularly distributed across the virtual surface 110 from the perspective of the fixed virtual point 144 in both the vertical direction (FIG. 11) and the horizontal direction (FIG. 12).

Figure 12A:
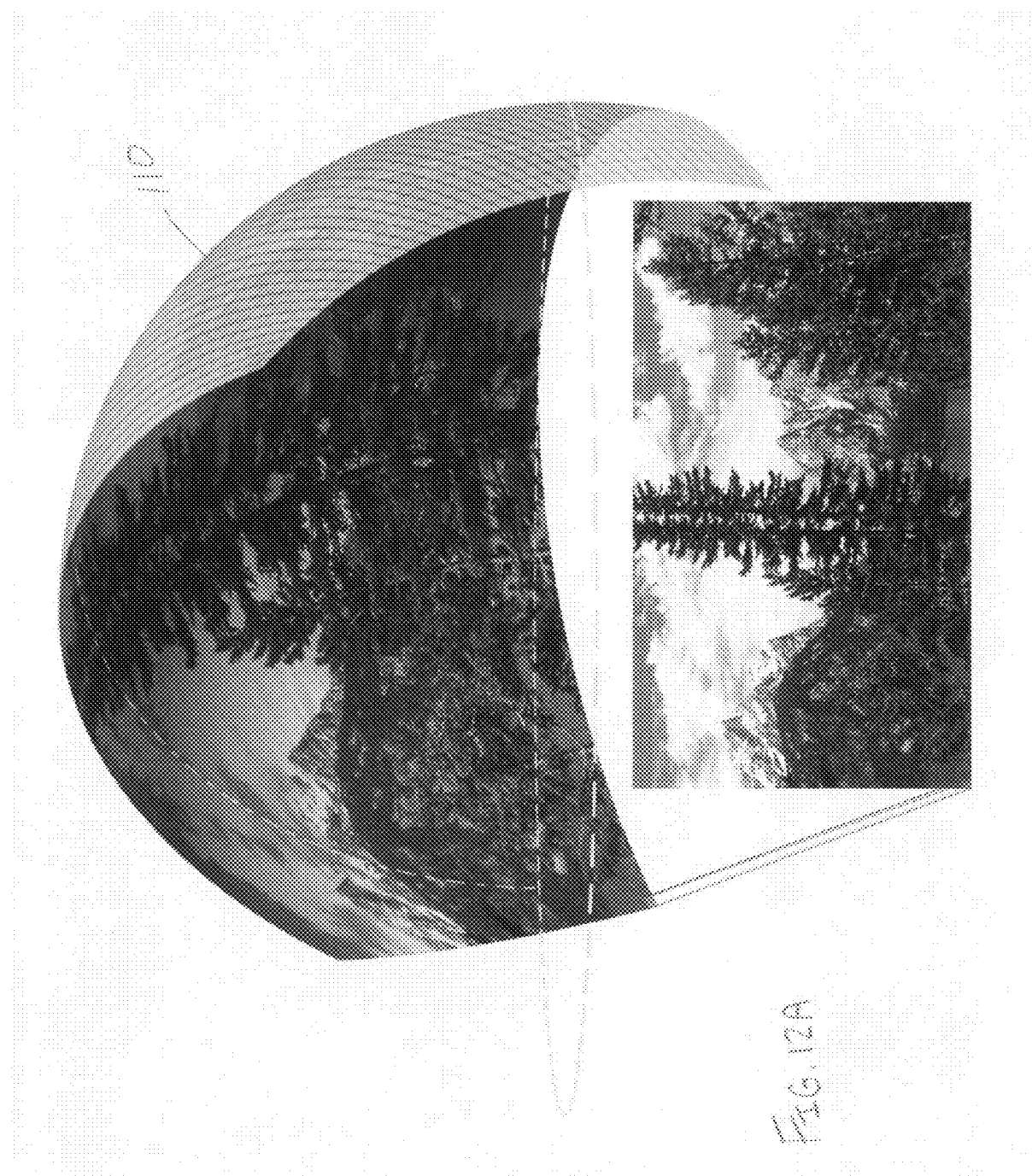
FIG. 12A depicts the manner in which a portion of a planar image is mapped onto a virtual surface.
Figure 12B:
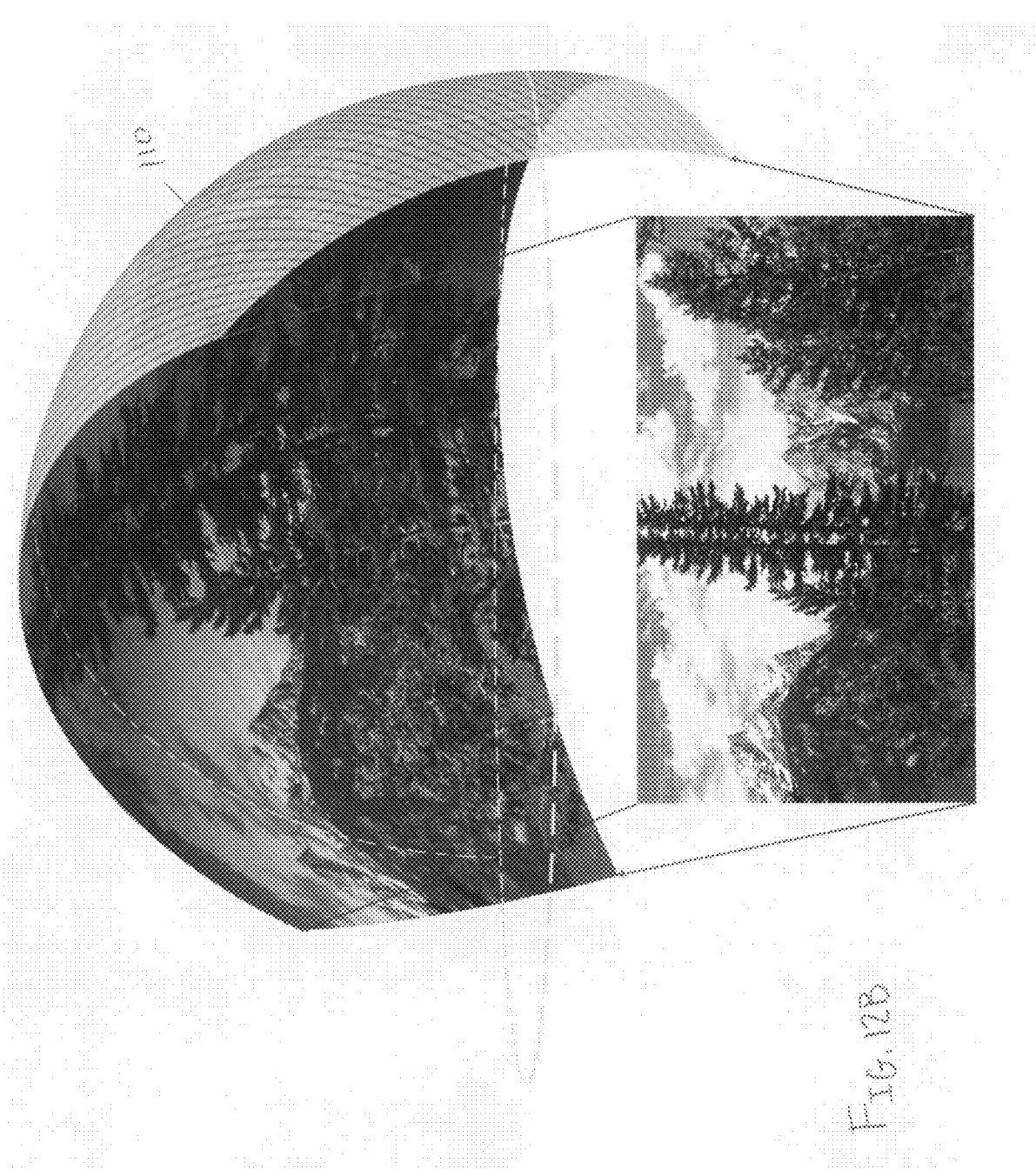
FIG. 12B depicts the manner in which the corners of a planar image are mapped onto a virtual surface.

As can further be observed from FIGS. 11 and 12, a lower left portion 180 and a lower right portion 182 of the virtual surface 110 falls below the circle 120. As the circle 120 corresponds to the spring line 108 of the dome 106 (see FIG. 1), it is likely that the portions of the image mapped to the lower left portion 180 and the lower right portion 182 of the virtual surface 110 will be clipped from view when the textured virtual image is projected onto the curved viewing surface 102. FIG. 12A depicts the manner in which a portion of a planar image is mapped onto the virtual surface 110. FIG. 12B depicts the mapping of the corners of the planar image onto the virtual surface 110.

Once the desired image has been mapped to the virtual surface 110, the resulting textured virtual image may be displayed as a still image or as a motion picture, in real time or as a pre-rendered video on the curved viewing surface 102 of the dome 106. The textured virtual image may be stored in a computer-readable storage medium for display at a later time. In one illustrative embodiment of the present disclosure, the above described process is suitable for use with images having an aspect ratio at or near 16×9, such as a high definition media.

Pursuant to another illustrative embodiment of the present disclosure, an image having an aspect ratio at or near 3×4, such as a large-format film, is also able to be displayed on the curved viewing surface 102 formed by the dome 106 with minimized distortion. Referring now to FIG. 13, the first step for displaying the image on the curved viewing surface 102 shown in FIG. 1 is to define, in a computer environment, a virtual surface 200 that is a representation or model of a portion of the curved viewing surface 102. Again, it will be appreciated that the virtual surface 200 need not correspond exactly in size or shape with the curved viewing surface 102 and may only be proportionately related to the curved viewing surface 102. The virtual surface 110 may lie within or extend beyond the curved viewing surface 102. As before, the circle 120 is a representation of the spring line 108 of the dome 106.

As before, the virtual surface 200 may include a top edge 202, a bottom edge 204, a left edge 206, a right edge 208 and a centerline 210. A left edge midpoint 207 and a right edge midpoint 209 may also be defined on the left edge 206 and the right edge 208, respectively. In addition, the virtual surface 200 may comprise a top left corner 212, a bottom left corner 214, a top right corner 216, and a bottom right corner 218.

The virtual surface 200 is formed from a plurality of polygons 220 that form a mesh-like structure. Thus, while the virtual surface 200 may conform to a generally spherical shape, the virtual surface 200 itself is formed from a plurality of planar elements, i.e., the polygons 220. Each of the polygons 220 is formed from a plurality of three (3) vertices and is, therefore, triangular in shape. It will be appreciated, however, that the polygons 220 may have any polygonal shape and any number of vertices. They may also be constructed of non-polygonal elements such as nurbs or splines.

A novel feature of the present invention is the manner in which the polygons 220 are distributed across the virtual surface 200. As will be explained in more detail below, in one illustrative embodiment of the present disclosure, the polygons 220 are distributed pursuant to an angular distribution onto the virtual surface 200. In another illustrative embodiment, the polygons 220 are distributed pursuant to a scaled angular distribution onto the virtual surface 200.

In regard to defining the bottom edge 204 of the virtual surface 200, as shown in FIG. 14, an origin of an XYZ coordinate axis is located at a center 130 of the circle 120, with the circle 120 lying on a plane 224 corresponding to the XY plane. Similar to before, the radius 134 of the circle 120 may be arbitrarily defined to extend 1000 units from the center 130. A bottom plane 226 is rotated downwards from the plane 224 along a line 228 that is tangent to a point 230 that lies at the intersection of the circle 120 and the Y-axis. It will be appreciated that the point 230 corresponds to the front center of the dome 106 (see FIG. 1) and the center of the virtual surface 200 (see FIG. 13). The intersection of the plane 224 and the bottom plane 226 forms an angle 232. In one illustrative embodiment, the angle 232 is in the range from about 0 degrees to about 30 degrees. In another illustrative embodiment, the angle 232 is about 7 degrees. As will be shown hereinafter, the bottom edge 204 of the virtual surface 200 will lie on the intersection of the bottom plane 226 and a sphere centered at the center 130, where the sphere has a radius equal to the radius 134 of the circle 120, i.e., 1000 units.

Figure 15:
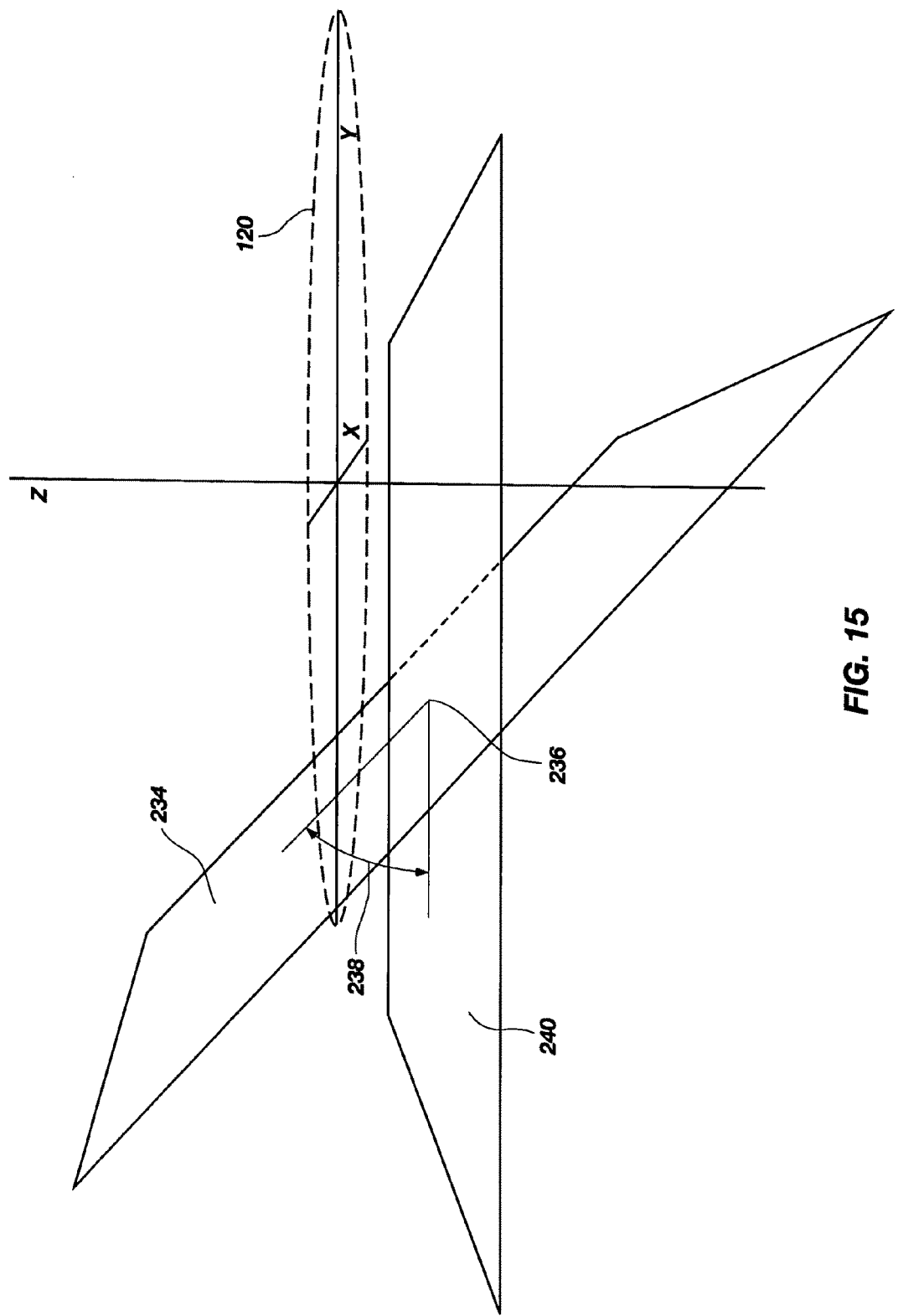
FIG. 15 is a diagram of the XYZ coordinate axis system and a top plane for defining a top edge of the virtual surface shown in FIG. 13.

Referring now to FIG. 15, the manner in which the top edge 202 of the virtual surface 200 is defined is represented. An arbitrary audience viewpoint is first defined as a fixed virtual point 236. The fixed virtual point 236 may define the most optimal viewing location in the theater 100, and can be chosen uniquely for each individual theater. The fixed virtual point 236 may be located anywhere within the theater 100. In one illustrative embodiment, the fixed virtual point 236 is defined at the XYZ coordinates (0,−500,−222).

A top plane 234 is defined to pass through the fixed virtual point 236, located at the XYZ coordinates (0,−500,−222), and is rotated at an angle 238 to a reference plane 240 that contains the fixed virtual point 236 and is parallel to the XY plane. In addition, the top plane 235 is parallel to the X-axis. In one illustrative embodiment, the angle 238 is in the range from about 5 degrees to about 80 degrees. In another illustrative embodiment, the angle 238 is about 43 degrees. As will be shown hereinafter, the top edge 202 (best represented in FIG. 13) of the virtual surface 200 will lie on the intersection of the top plane 234 and a sphere centered at the center 130 (best represented in FIG. 14), where the sphere has a radius equal to the radius 134 of the circle 120, i.e., 1000 units.

Figure 16:
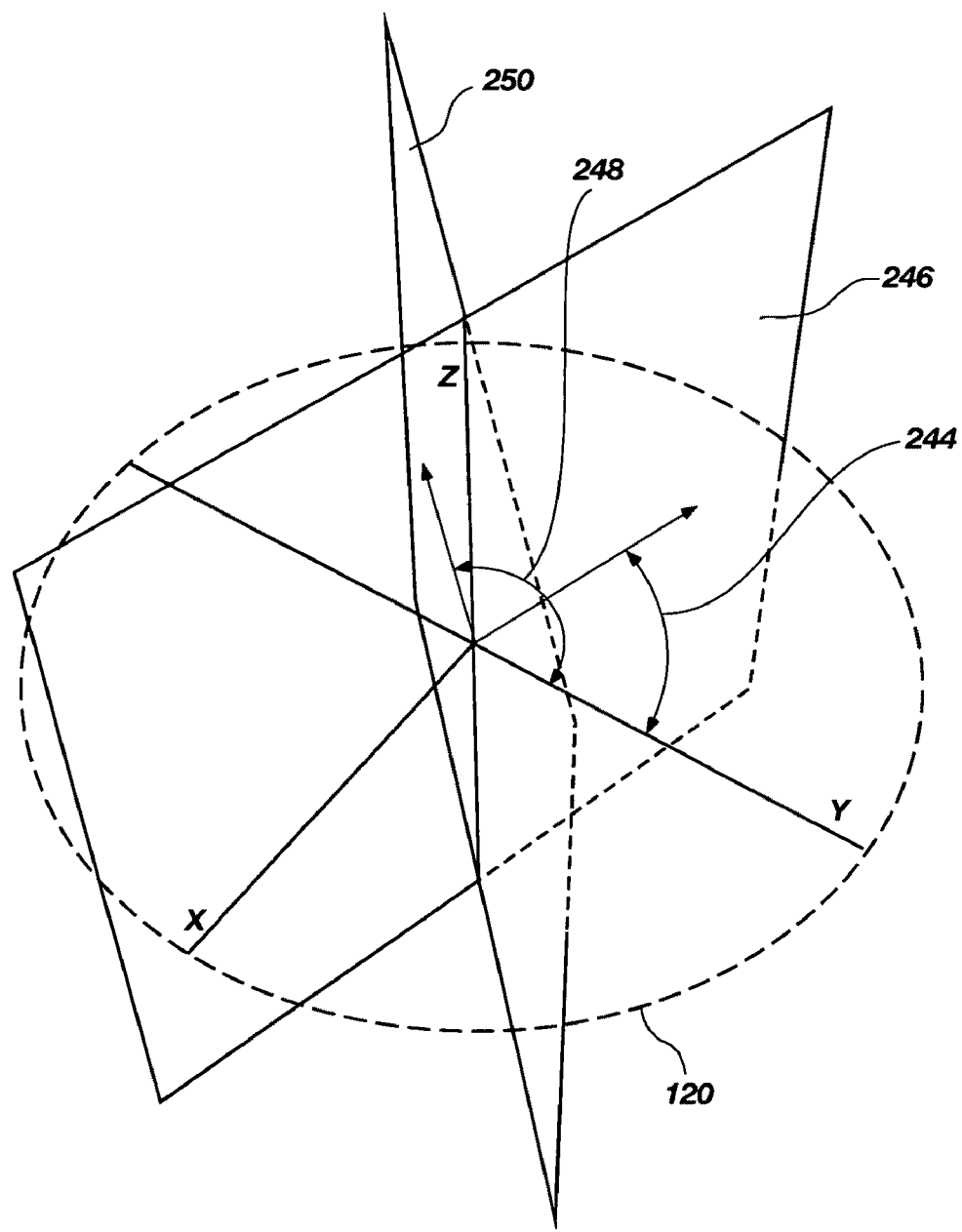
FIG. 16 is a diagram of the XYZ coordinate axis system and planes for defining a left edge of the virtual surface shown in FIG. 13.

Referring now to FIG. 16, the YZ plane is rotated about the Z-axis by an angle 244 to define a plane 246 which will contain the bottom left corner 214 of the virtual surface 200. In one illustrative embodiment the angle 244 is in the range from approximately 55 degrees to approximately 95 degrees. In another illustrative embodiment, the angle 244 is approximately 75 degrees. The YZ plane is rotated about the Z-axis by an angle 248 to define a plane 250 which will contain the top left corner 212 of the virtual surface 200. In one illustrative embodiment the angle 248 is in the range from approximately 115 degrees to approximately 165 degrees. In another illustrative embodiment, the angle 248 is approximately 135 degrees.

Figure 17:
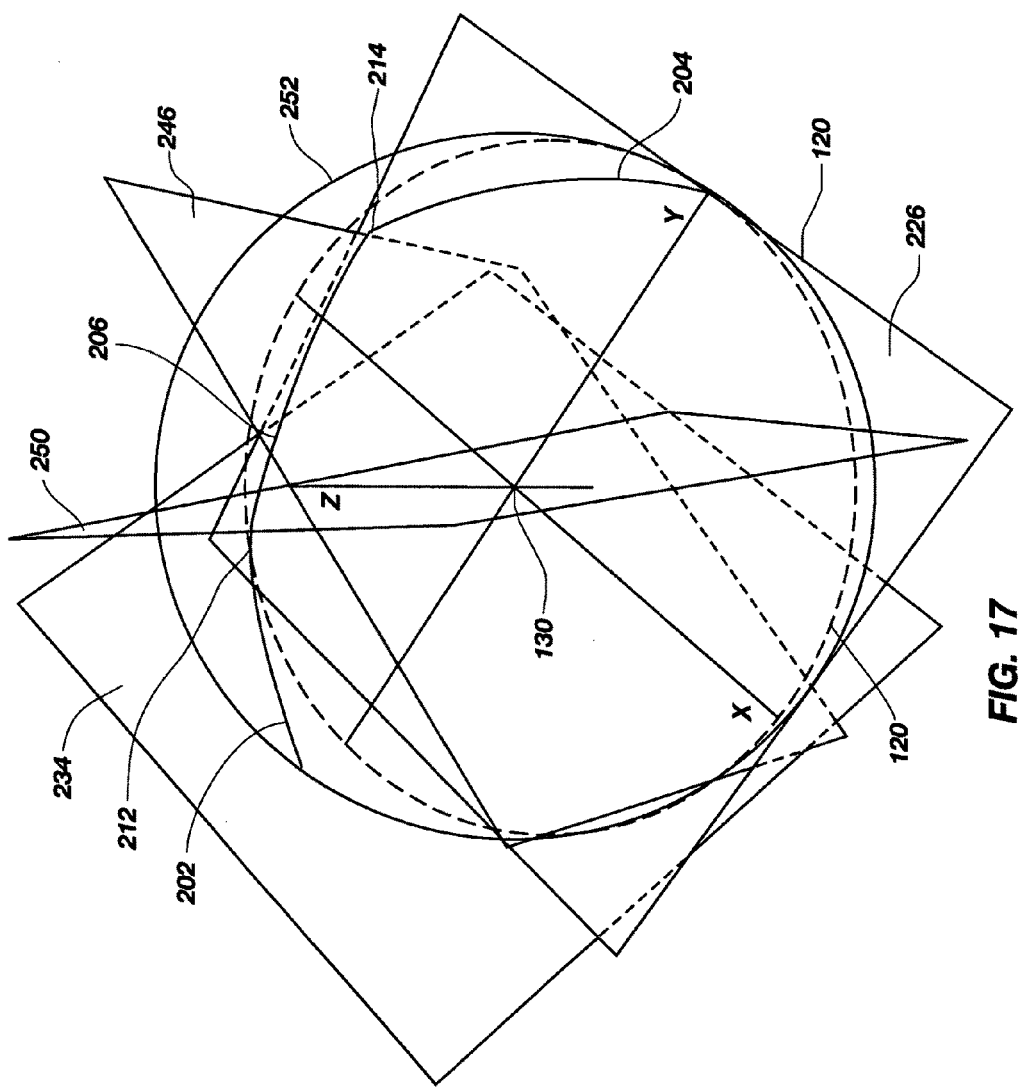
FIG. 17 is a diagram of the XYZ coordinate axis system and planes for defining a left edge, a left side of the bottom edge, and a left side of the top edge of the virtual surface shown in FIG. 13 in relation to a surface of a sphere.

Referring now to FIG. 17, the bottom left corner 214 of the virtual surface 200 is defined by the intersection of the plane 246, the bottom plane 226, and a sphere 252. The sphere 252 is centered at center 130 and has the same radius of the circle 120, i.e., 1000 units. The top left corner 212 of the virtual surface 200 is defined by the intersection of the plane 250, the top plane 234, and the sphere 252. The left lower left corner 214 of the virtual surface 200 is defined by the intersection of the plane 246, of the bottom plane 226, and the sphere 252. A left side of the bottom edge 204 is defined by the intersection of the bottom plane 226 and the sphere 252 between the bottom left corner 214 and the Y-axis. A left side of the top edge 202 is defined by the intersection of the top plane 234 and the sphere 252 between the top left corner 212 and YZ plane.

Figure 18:
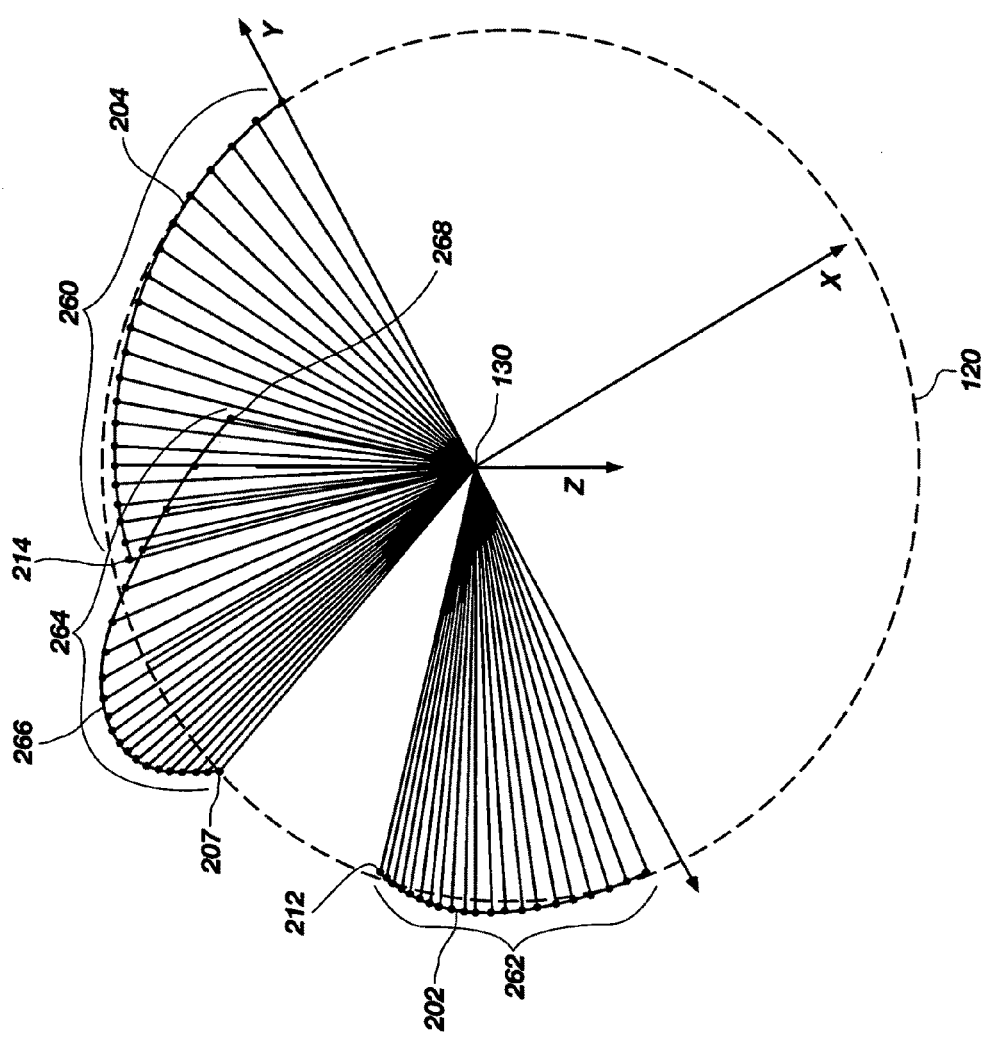
FIG. 18 depicts distributions of groups of vertices along a left side of the bottom edge, a left side of the top edge, and a horizontal midline of the virtual surface shown in FIG. 13.

Referring now to FIG. 18, a first group of vertices 260 is angularly distributed along the left side of the bottom edge 204 from the bottom left corner 214 to the Y-axis from the center 130. In one illustrative embodiment, there are twenty-one (21) vertices in the first group of vertices 260. The vertices in the first group of vertices 260 are distributed along the left side of the bottom edge 204 by angle from the center 130 of the circle 120. Thus, it will be noted that the vertices in the first group of vertices 260 are not evenly spaced from each other by distance along the left side of the bottom edge 204.

A second group of vertices 262 is angularly distributed along the left side of the top edge 202 from the top left corner 212 to the YZ plane. In one illustrative embodiment, there are twenty-one (21) vertices in the second group of vertices 262. In particular, the vertices in the second group of vertices 262 are distributed along the left side of top edge 202 by angle from the center 130 of the circle 120. Thus, it will be noted that the vertices in the second group of vertices 262 are not evenly spaced from each other by distance along the left side of the top edge 202.

A third group of vertices 264 is angularly distributed along a horizontal midline 266 of the virtual surface 200 from the left edge midpoint 207 to a vertical midpoint 268 of the virtual surface 200 lying in the YZ plane. In one illustrative embodiment, there are twenty-one (21) vertices in the third group of vertices 264. In particular, the vertices in the third group of vertices 264 are distributed along the horizontal midline 266 by angle from the center 130 of the circle 120. Thus, it will be noted that the vertices in the third group of vertices 264 are not evenly spaced from each other by distance along the horizontal midline 266.

Figure 19:
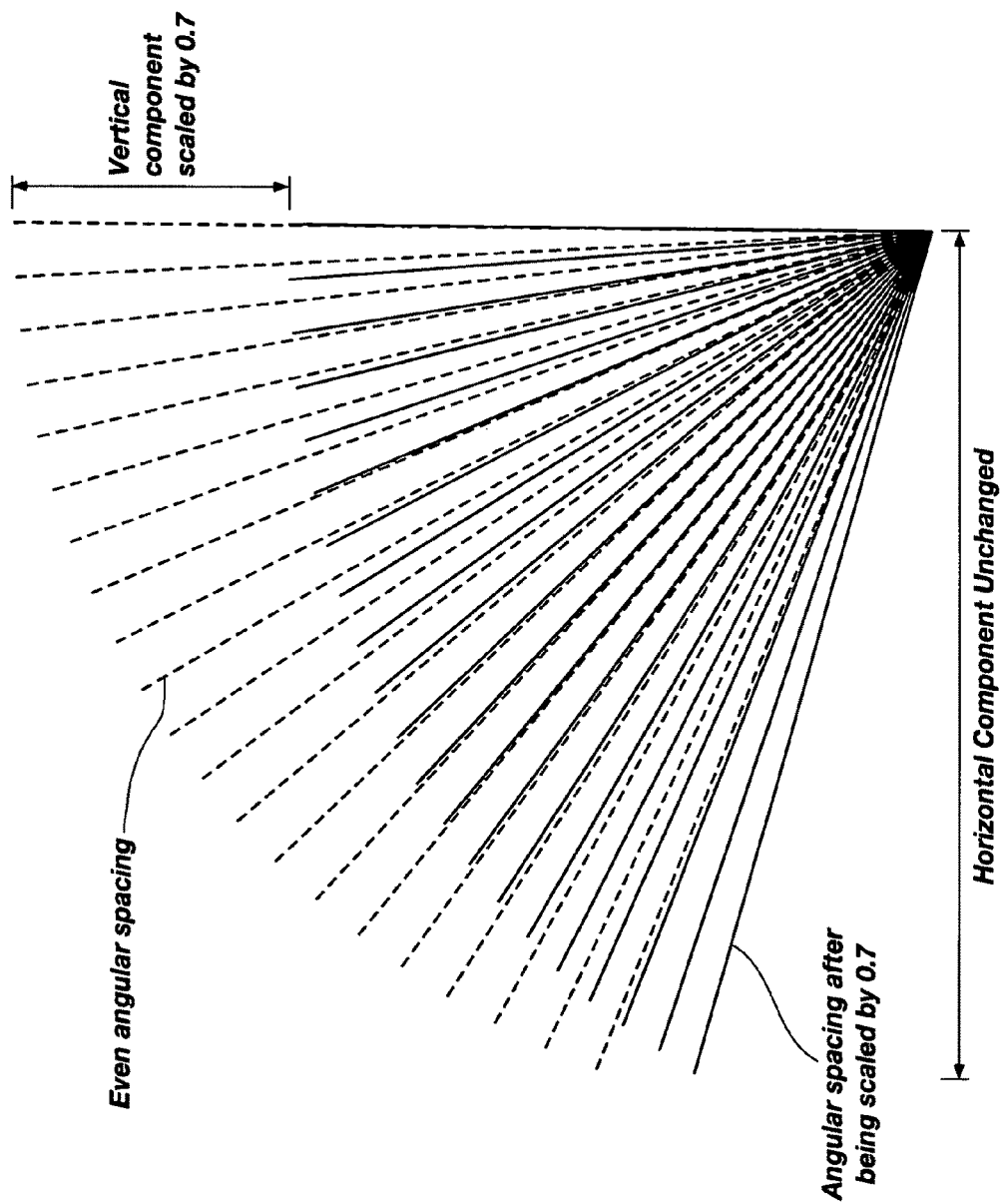
FIG. 19 depicts the scaling of a vertical component of an angular distribution.

It will be appreciated that as the image is spread across the dome 106 (FIG. 1), the vertical spacing of the image will be much greater in the center of the image than at the sides. In one illustrative embodiment of the present invention, in order to keep the height and width of the image somewhat proportional across the image, the horizontal spacing of the image is also varied to produce wider segments at the center of the image and narrower segments at the sides of the image. To vary the horizontal spacing of the image, the angular spacing of the first group 260, the second group 262, and the third group 264 of vertices is scaled by a scaling factor in the vertical dimension. In one illustrative embodiment, the scaling factor is less than about 0.95. In another illustrative embodiment, the scaling factor is in the range from about 0.5 to about 0.9. In still another illustrative embodiment, the scaling factor is about 0.7. An example of using a 0.7 scaling factor on the vertical component of an even angular distribution is represented in FIG. 19.

Figure 20:
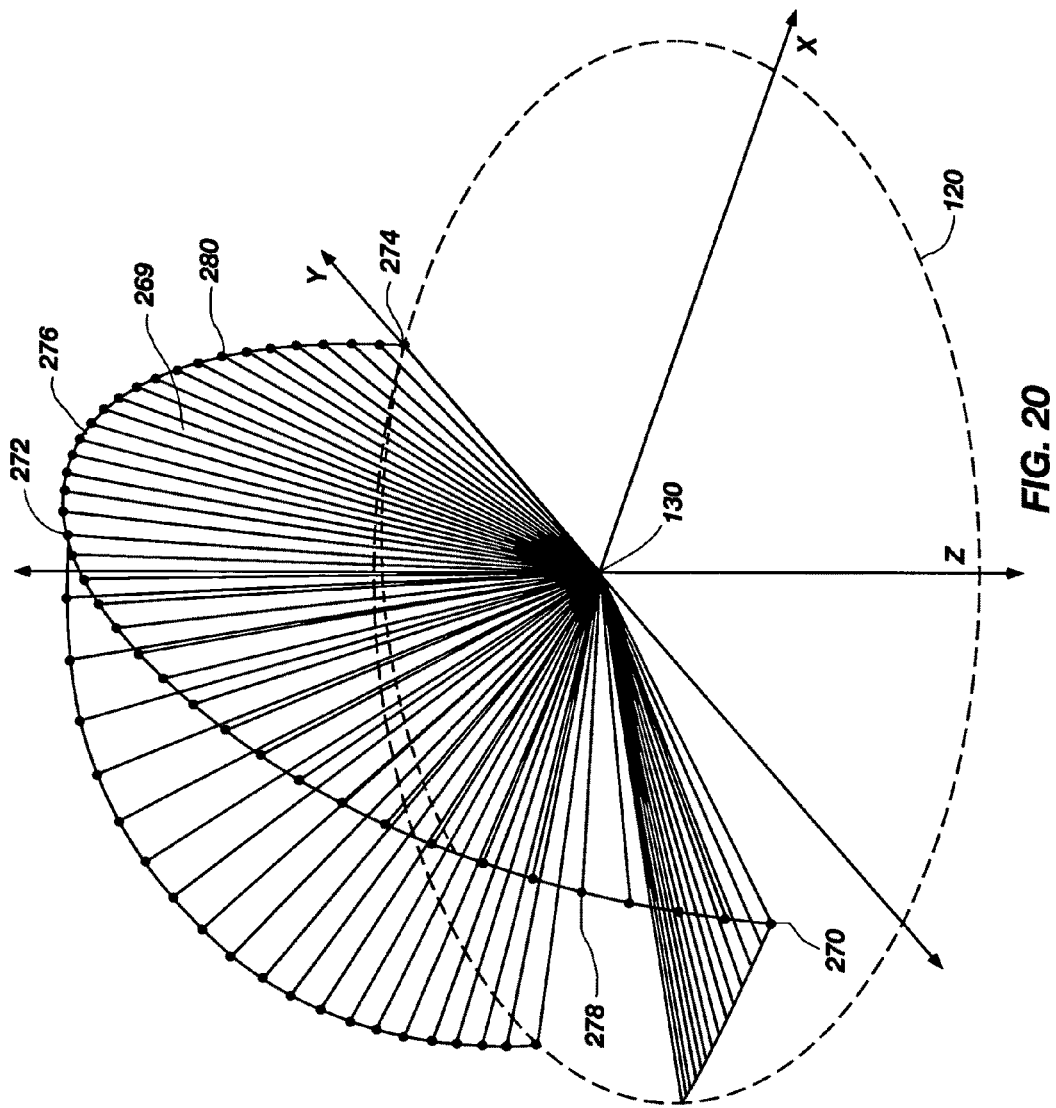
FIG. 20 depicts a distribution of a column of vertices between the top edge and the bottom edge of the virtual surface shown in FIG. 13.

Referring now to FIG. 20, the manner in which the internal vertices on the virtual surface 200 (FIG. 13) are defined between the top edge 202 the bottom edge 204, i.e., the vertical columns of vertices, will now be explained. A plane 269 is defined by a top center vertex 270, a mid center vertex 272 and a bottom center vertex 274. It will be appreciated that the top center vertex 270, the mid center vertex 272, and the bottom center vertex 274 all lie in the YZ plane and that the top center vertex 270 pertains to the second group of vertices 262, the mid center vertex 272 pertains to the third group of vertices 264, and the bottom center vertex 274 pertains to the first group of vertices 260.

A center column of internal vertices on the virtual surface 200 (FIGS. 13 and 21) lies along an intersection 276 of the plane 269 and the sphere 252 (not explicitly shown in FIG. 20). In particular, a group of internal vertices 278 is angularly distributed from the center 130 between the top center vertex 270 and the bottom center vertex 274. (It will be appreciated that the center 130 is a fixed virtual point with respect to the virtual surface 200.) In one illustrative embodiment, there are thirty-nine (39) vertices in the internal column of vertices 278. This same process is repeated for the each set of vertices to the left of the top center vertex 270, the mid center vertex 272 and the bottom center vertex 274 until all of the internal vertices have been defined between the top edge 202 and the bottom edge 204 for the entire left side of the virtual surface 200. Once all the vertices on the left side of the virtual surface 200 have been defined, the right side of the virtual surface 200 may be easily defined by a mirror image of the left side across the YZ plane. The vertices may then be grouped together into the polygons 220 as shown in FIGS. 13 and 21.

Referring back to FIG. 13, it will be noted that extending between the top edge 202 and the bottom edge 204 are a plurality of vertical columns of vertices. Each of the vertices in a given column is angularly spaced from adjacent vertices in the same column. It will be further noted that extending between the left edge 206 and the right edge 208 of the virtual surface 200 are a plurality of horizontal rows of vertices. Each of the vertices in a given row is angularly spaced from adjacent vertices in the same row.

The effect of the angular distribution of the vertices as described above, results in polygons 220 near a center 282 of the virtual surface 200 being proportionately larger than polygons 220 located near the edges of the virtual surface. The polygons 220 are proportionately larger in the vertical direction and the horizontal direction of the virtual surface 200. The polygons 220 are angularly distributed in both a vertical direction and a horizontal direction on the virtual surface 200. Further, the angular distribution of the vertices in the vertical columns of vertices ensures that horizontal lines in the image appear horizontal on the curved viewing surface 102, while the angular distribution of the vertices in the rows of vertices ensures that vertical lines in the image appear vertical on the curved viewing surface 102.

Figure 21:
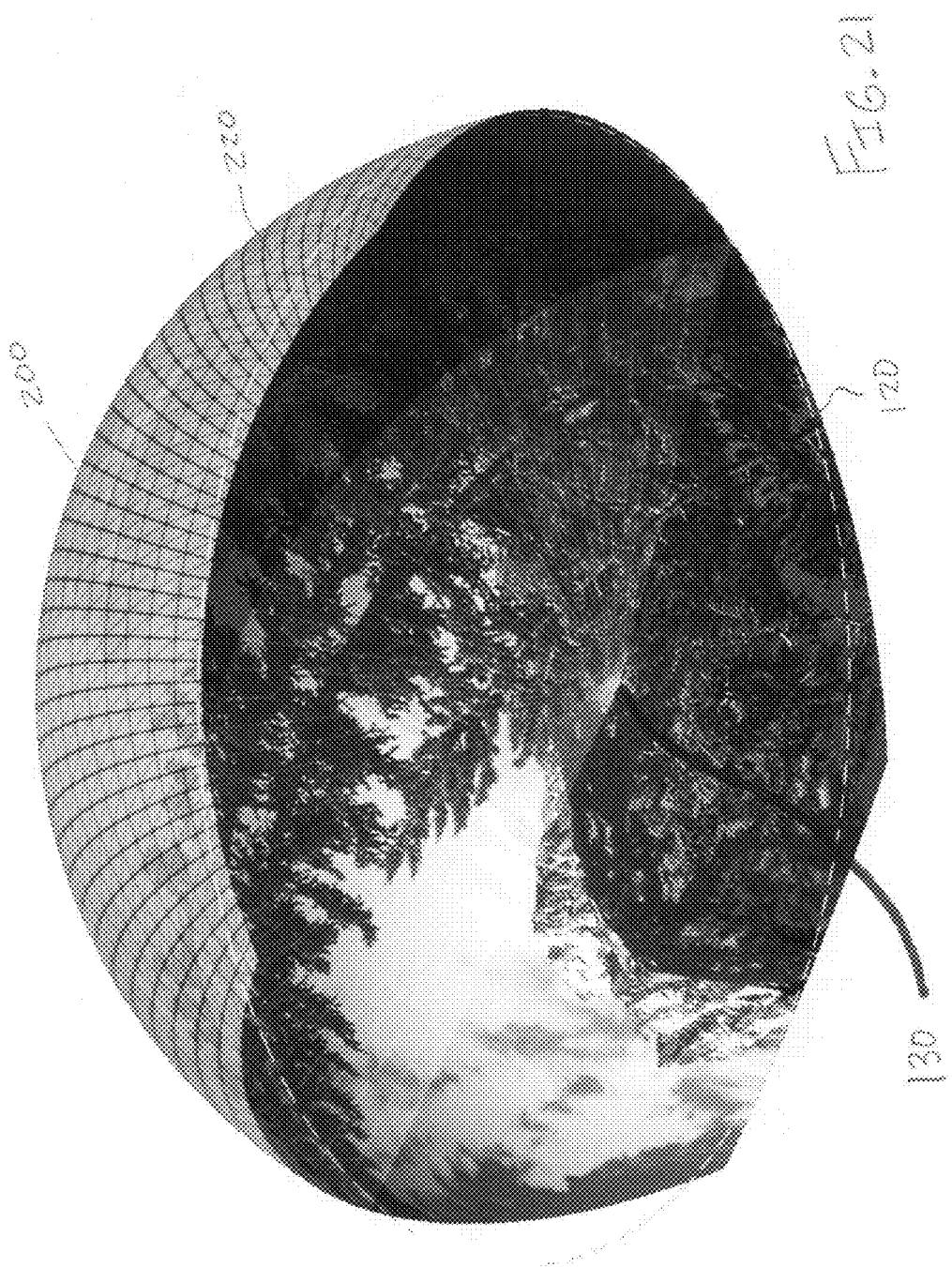
FIG. 21 depicts an image textured onto the virtual surface shown in FIG. 13.

Once the polygons 220 have been defined over the entire virtual surface 200, an image is mapped to the virtual surface 200 as shown in FIG. 21, using any suitable mapping technique that is known to one having ordinary skill in the art, to thereby form a textured virtual image. In one illustrative embodiment, the resulting virtual surface 200 is divided into 40 segments horizontally, and 40 segments vertically. The texture U coordinates are incremented by 0.025 at each column of vertices, from 0.000 at the left edge 206 to 1.000 at the right edge 208. The texture V coordinates are incremented by 0.025 at each row of vertices, from 0.000 at the bottom edge 204 to 1.000 at the top edge 202. Other illustrative embodiments may vary texture values to produce desired zoom or distortion on the virtual image.

Figure 21A:
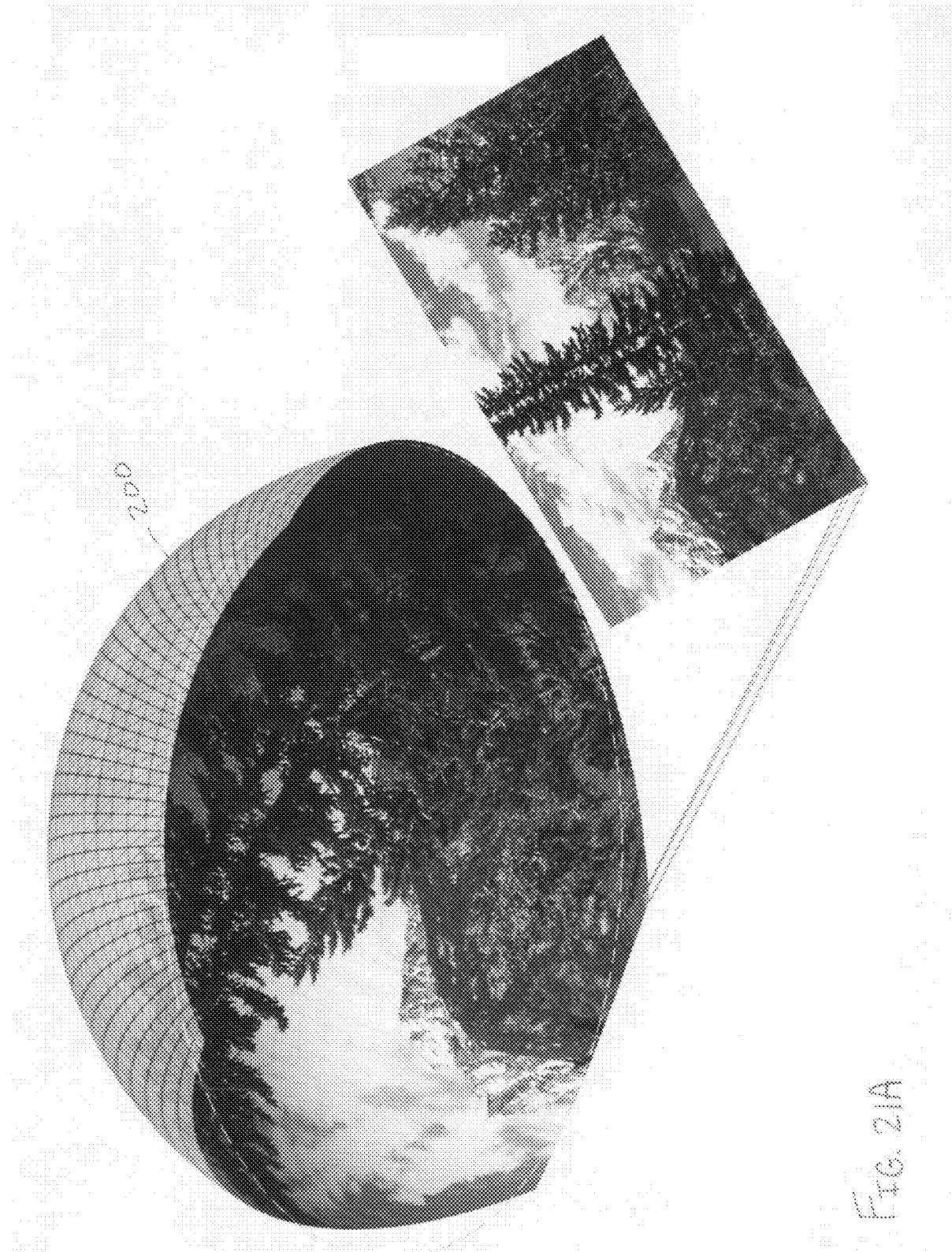
FIG. 21A depicts the manner in which a portion of a planar image is mapped onto a virtual surface.
Figure 21B:
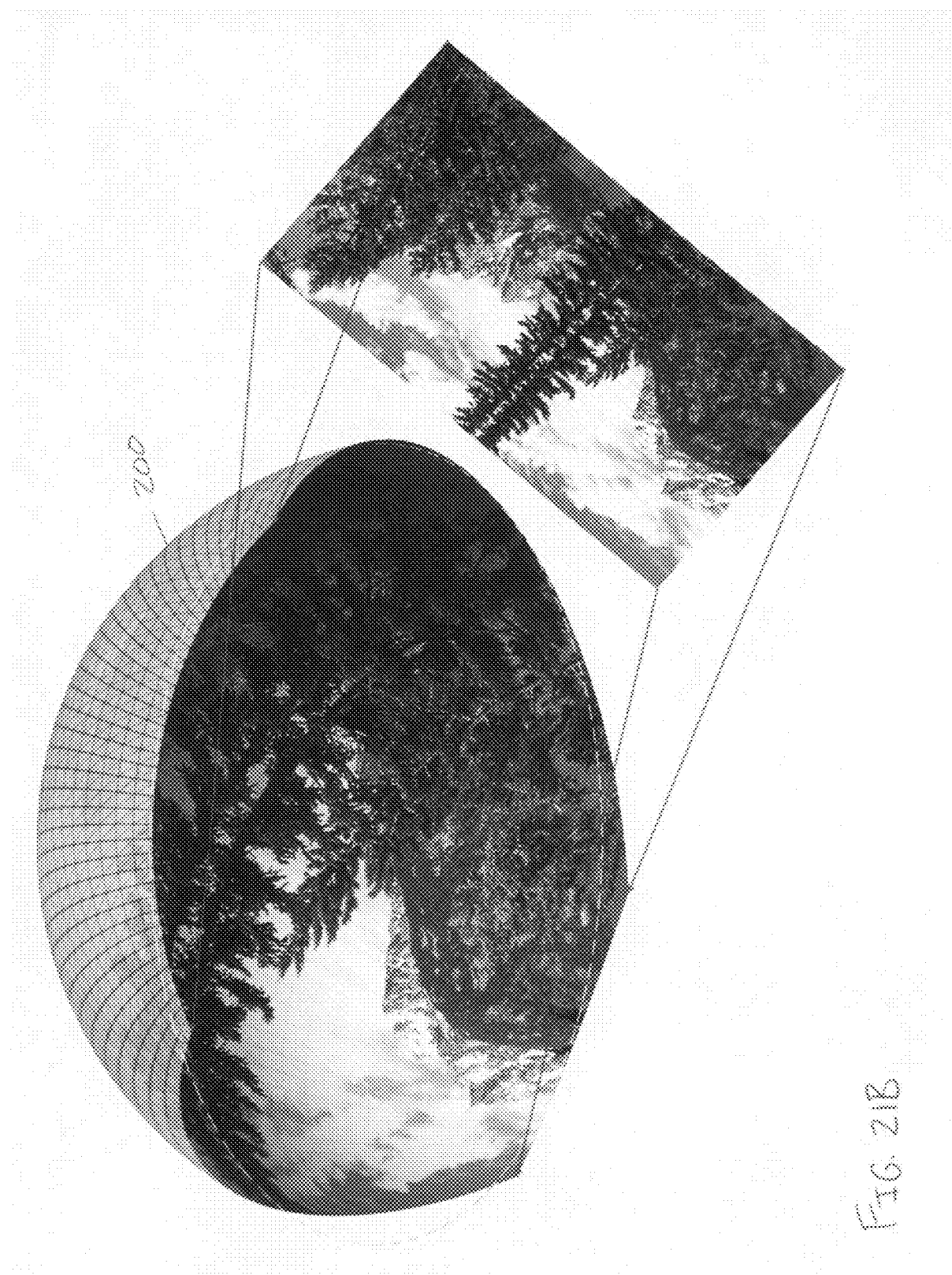
FIG. 21B depicts the manner in which the corners of a planar image are mapped onto a virtual surface.

As can be observed from FIG. 21, due to the fact that the underlying vertices, and hence the polygons 220, are angularly distributed across the virtual surface 200, the image mapped onto the virtual surface 200 is correspondingly angularly distributed across the virtual surface 200 from the center 130. Portions of the image may reside below the circle 120 and therefore may not fall onto the curved viewing surface 102. FIG. 21A depicts the manner in which a portion of a planar image is mapped onto the virtual surface 200. FIG. 21B depicts the mapping of the corners of the planar image onto the virtual surface 200.

Once the desired image has been mapped to the virtual surface 200, the resulting textured virtual image may be displayed as a still image or as a motion picture, in real time or as a pre-rendered video onto the curved viewing surface 102 (FIG. 1) of the dome 106. The textured virtual image may be stored in any type of machine-readable storage medium as can be selected by those skilled in the art.

Figure 22:
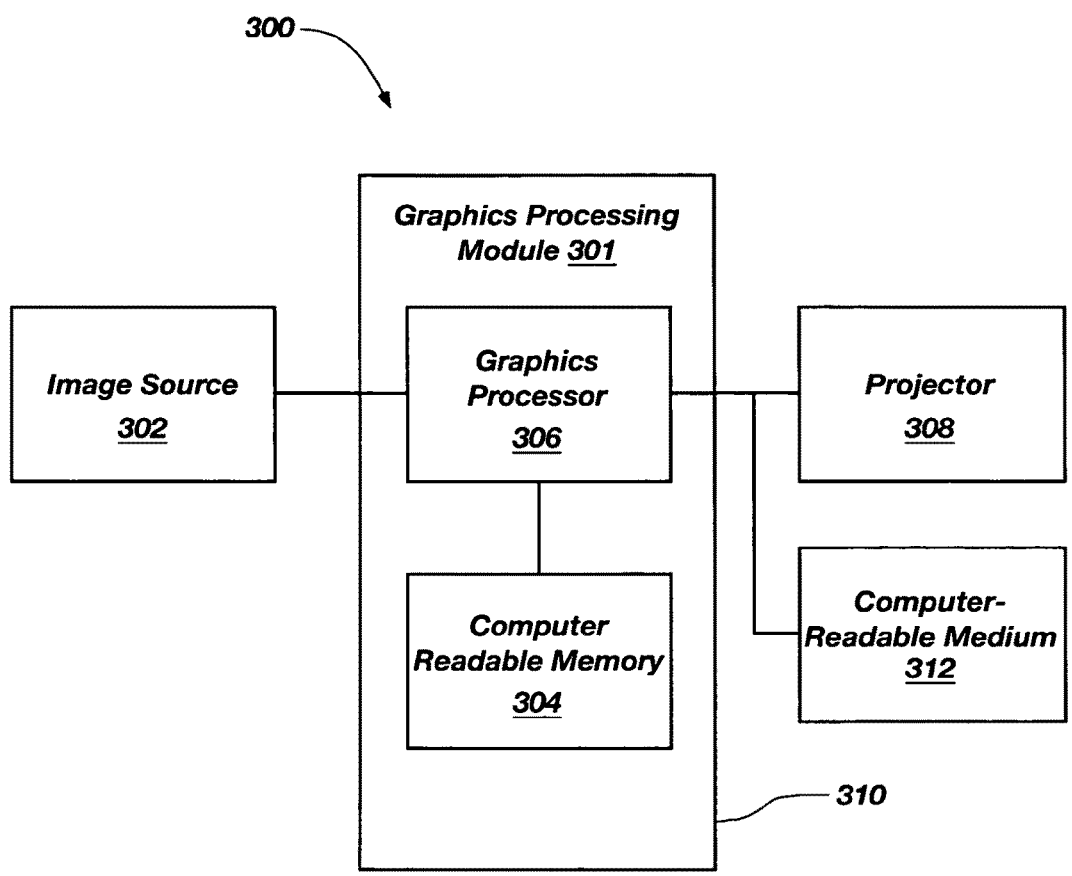
FIG. 22 depicts a system for displaying images on a non-planar surface according to one embodiment of the present invention.

Referring now to FIG. 22, there is depicted a system 300 pursuant to an illustrative embodiment of the present disclosure. It will be appreciated that the system 300 is able to display a rectangular image intended for viewing on a "flat" projection screen onto a curved viewing surface found in a domed theater with minimized distortion. The system 300 may comprise an image source 302, a graphics processing module 301 having a computer readable memory 304 and a processor 306, such as a graphics processor, and a display device 308. The video source 302 is operable to send image data in a signal to the graphics processor 304. Thus, the image source 302 may comprise any device capable of sending image data in a digital signal, including, but not limited to, the following: a DVD player, a digital video camera, an HD-DVD player, a BLU-RAY® Disc player, a digital video recording device, and a computer. The image data sent by the image source 302 may be physically embodied in a wide range of mediums, including, but not limited to, the following: optical storage mediums, hard drives, computer readable memory devices, magnetic tapes and the like. The image data may be a digitized version of a motion picture film, such as a motion picture film shot in a large film format, e.g., 3×4, or a high-definition video format, e.g., 16×9. The graphics processing module 301 may be integrated into the 3-D modeling computer 1000 (see FIG. 23).

The computer readable memory 304 may have stored therein a virtual surface that is a representation of the curved viewing surface. In particular, the virtual surface may be originally defined using a 3-D modeling computer running a software program or any suitable computer program for creating and a defining virtual surface. The 3-D modeling software program may be stored in a memory coupled to a processor. The 3-D modeling software, when executed by the processor, may allow a user to create a virtual representation of the curved viewing surface through one or more input devices coupled to the processor via a computer bus. This may entail the user obtaining the actual physical measurements of the real-life surface being modeled, including the location of a display device with respect to the real-life surface being modeled. The virtual surface may be defined by an angular distribution of a plurality of polygons from a fixed virtual point. The virtual surface may be defined by an angular distribution of vertices. It will be noted that the fixed virtual point may correspond to a real world viewing point for the curved viewing surface that is modeled by the virtual surface. Once defined, the virtual surface is loaded into the computer readable memory 304. The virtual surface that is stored in the computer readable memory 304 may take the form of the virtual surfaces represented in FIGS. 2-21, described above.

Loaded into the computer readable memory 304 may also be computer-readable program instructions for execution within the graphics processor 306. The program instructions, when executed by the graphics processor 306, may be operable to texture the virtual surface with an image from the image source 302 pursuant to an angular distribution from the fixed virtual point. The program instructions may be further operable, when executed, to texture the virtual surface in real time. The program instructions, when executed by a processor, may be operable for texturing a virtual surface with an image pursuant to an angular distribution.

The graphics processor 306 is a processor able to execute the necessary program instructions to texture the virtual surface with an image from the image source 302 to thereby form a textured virtual image. In an illustrative embodiment, the graphics processor 306 is able to provide successive textured virtual images to the display device 308 at a sufficient rate to provide smooth motion. The graphics processor 306 may output data containing the textured virtual image. In an embodiment of the present disclosure, the data representing the textured virtual image is provided to the display device 308 for immediate rendering. In an embodiment of the present disclosure, the data representing the textured virtual image is stored in a computer-readable medium 312 such that the textured virtual image may be displayed at a later date or transported to another location. It will be noted that the graphics processor 306 and the computer readable memory 304 may collectively form part of a graphics processing module 310.

The display device 308 may be any suitable projector or display technology for displaying the textured virtual image generated by the graphics processor 306 onto the curved viewing surface. The display device 308 may comprise a fisheye lens having a large field of view. The display device 308 may be located below a spring line of a domed theater, and the image projected onto the virtual surface may cover more than 50% of the curved viewing surface of a domed theater. The display device 308 may also comprise multiple projectors, or a self-luminant dome surface.

In the foregoing Detailed Description, the various features of the present disclosure are grouped together in a single exemplary illustrated embodiment for the purpose of streamlining the disclosure. This method of disclosure is not to be interpreted as reflecting an intention that the claimed disclosure requires more features than are expressly recited in each of the claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of generating an image for display on a curved viewing surface, said method comprising:
   providing a virtual surface in a computer-readable memory that is a representation of the curved viewing surface; and
   texturing said virtual surface with the image pursuant an angular distribution using a graphics processing module to thereby form a textured virtual image.

2. The method of claim 1, further comprising the step of displaying the textured virtual image on the curved viewing surface using a display device.

3. The method of claim 1, further comprising the step of displaying the textured virtual image or storing the textured virtual image in a computer-readable storage medium.

4. The method of claim 1, further comprising the step of texturing the virtual surface using the angular distribution originating from a fixed virtual point.

5. The method of claim 1, further comprising the step of texturing the virtual surface with the image pursuant to an angular distribution in both a first direction and a second direction onto the virtual surface.

6. The method of claim 1, wherein said virtual surface comprises a plurality of polygons.

7. The method of claim 6, wherein the plurality of polygons are angularly distributed over the virtual surface.

8. The method of claim 6, wherein the plurality of polygons are distributed over the virtual surface from a fixed virtual point.

9. The method of claim 6, wherein the plurality of polygons are proportionately distributed by angle over the virtual surface.

10. The method of claim 9, wherein the polygons are proportionately distributed by angle from a fixed virtual point in a first direction and a second direction.

11. The method of claim 1, further comprising the step of texturing the virtual surface proportionally, by angle, from a fixed virtual point.

12. The method of claim 1, wherein said virtual surface further comprises a plurality of rows of vertices, the vertices in each of the rows of vertices being angularly spaced from adjacent vertices.

13. The method of claim 12, wherein said virtual surface further comprises a plurality of columns of vertices, the vertices in each of the columns of vertices being angularly spaced from adjacent vertices.

14. A method of processing an image for display, said method comprising:
    defining a virtual surface using a 3-D modeling computer;
    defining a fixed virtual point with respect to said virtual surface using the 3-D modeling computer; and
    defining an angular image distribution on the virtual surface from said fixed virtual point using the 3-D modeling computer.

15. The method of claim 14, further comprising the step of texturing said virtual surface in accordance with said angular image distribution to thereby form a textured virtual image.

16. The method of claim 15, further comprising the step of displaying the textured virtual image on a curved viewing surface or storing said textured virtual image in a computer-readable storage medium.

17. The method of claim 14, wherein the step of defining the virtual surface comprises the step of defining a plurality of edges of the virtual surface on a surface of a virtual sphere.

18. The method of claim 17, wherein the plurality of edges comprises a top edge and a bottom edge, and wherein said top edge and bottom edge are non-parallel on the surface of the virtual sphere.

19. The method of claim 18, wherein said bottom edge lies on an intersection of a first plane with the virtual sphere.

20. The method of claim 19, wherein said top edge lies on an intersection of a second plane with the virtual sphere.

21. The method of claim 20, wherein the plurality of edges further comprises a first side edge and a second side edge, wherein said first side edge lies on an intersection of a third plane with the virtual sphere, and wherein said second side edge lies on an intersection of a fourth plane with the virtual sphere.

22. The method of claim 14, further comprising the step of defining a plurality of rows of vertices on said virtual surface, wherein the vertices in each of the rows of vertices are angularly distributed.

23. The method of claim 22, further comprising the step of defining a plurality of columns of vertices on said virtual surface, wherein the vertices in each of the columns of vertices are angularly distributed.

24. The method of claim 14, further comprising the step of angularly distributing a plurality of polygons on the virtual surface.

25. The method of claim 14, further comprising the step of proportionately distributing a plurality of polygons by angle on the virtual surface.

26. The method of claim 14, wherein said image has an aspect ratio selected from the group consisting of approximately 16×9 and approximately 3×4.

27. The method of claim 14, further comprising the step of texturing the image onto the virtual surface, wherein said image comprises a motion picture or a still image.

28. The method of claim 14, further comprising the step of proportionately distributing a plurality of polygons by angle on the virtual surface from a fixed virtual point in a first direction and a second direction.

29. A computer program product stored in a non-transitory computer-readable medium comprising computer-readable program instructions for execution within a processor, said program instructions comprising program instructions for texturing a virtual surface with an image pursuant to an angular distribution.

30. The computer program product of claim 29, wherein said program instructions further comprise program instructions for texturing the virtual surface with the image pursuant to an angular distribution from a fixed virtual point.

31. The computer program product of claim 29, wherein said virtual surface comprises a plurality of polygons.

32. The computer program product of claim 31, wherein the plurality of polygons are angularly distributed on the virtual surface from a fixed virtual point.

33. The computer program product of claim 29, wherein the virtual surface comprises a first edge and a second edge, said first edge having a first group of vertices distributed thereon and said second edge having a second group of vertices distributed thereon.

34. The computer program product of claim 33, wherein the first group of vertices are angularly distributed along the first edge and the second group of vertices are angularly distributed along the second edge.

35. The computer program product of claim 33, wherein the first group of vertices are angularly distributed along the first edge from a fixed virtual point and the second group of vertices are angularly distributed along the second edge from the fixed virtual point.

36. The computer program product of claim 33, wherein the virtual surface further comprises a third group of vertices angularly distributed between said first and second edges.

37. The computer program product of claim 29, wherein said program instructions further comprise program instructions for texturing the image to the virtual surface, wherein said image is one of a motion picture and a still image.

38. The computer program product of claim 29, wherein said virtual surface is a representation of a curved viewing surface.

39. A system for displaying an image on a curved viewing surface, said system comprising:
    a graphics processing module including a computer-readable memory for storing computer program instructions for execution by a processor within said graphics processing module, wherein said computer program instructions include program instructions for texturing a virtual surface with an image using an angular distribution from a fixed virtual point to thereby form a textured virtual surface; and a display device for displaying the textured virtual surface onto the curved viewing surface.

40. The system of claim 39, wherein said computer program instructions further comprise program instructions for texturing the virtual surface with the image using an angular distribution.

41. The system of claim 39, wherein said virtual surface comprises a plurality of polygons.

42. The system of claim 41, wherein the plurality of polygons are angularly distributed on the virtual surface from the fixed virtual point.

43. The system of claim 39, wherein the virtual surface comprises a first edge and a second edge, said first edge having a first group of vertices distributed thereon and said second edge having a second group of vertices distributed thereon.

44. The system of claim 43, wherein the first group of vertices are angularly distributed along the first edge and the second group of vertices are angularly distributed along the second edge.

45. The system of claim 43, wherein the first group of vertices are angularly distributed along the first edge from the fixed virtual point and the second group of vertices are angularly distributed along the second edge from the fixed virtual point.

46. The system of claim 43, wherein the virtual surface further comprises a third group of vertices angularly distributed between said first and second edges from the fixed virtual point.

47. The system of claim 39, wherein said computer program instructions further comprise program instructions for texturing the image to the virtual surface, wherein said image is a still image or a motion picture.

48. The system of claim 39, wherein said virtual surface is a representation of the curved viewing surface.

* * * * *